US009351282B2

United States Patent
Freda et al.

(10) Patent No.: US 9,351,282 B2
(45) Date of Patent: May 24, 2016

(54) SERVICE-BASED APPROACH TO CHANNEL SELECTION AND NETWORK CONFIGURATION FOR TELEVISION WHITE SPACE NETWORKS

(75) Inventors: Martino M. Freda, Laval (CA); Parul Mudgal, New Delhi (IN); Jean-Louis Gauvreau, La Prairie (CA); Athmane Touag, Laval (CA); Rocco DiGirolamo, Laval (CA); Amith V. Chincholi, West Babylon, NY (US); Joseph M. Murray, Schwenksville, PA (US); Chunxuan Ye, Wayne, PA (US); Scott Laughlin, Montreal (CA); Zinan Lin, Melville, NY (US); Alexander Reznik, Titusville, NJ (US); Saad Ahmad, Montreal (CA); Joseph A. Kwak, Momence, IL (US); Juan Carlos Zuniga, Montreal (CA); Angelo A. Cuffaro, Laval (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

(21) Appl. No.: 13/271,806

(22) Filed: Oct. 12, 2011

(65) Prior Publication Data
US 2012/0094681 A1   Apr. 19, 2012

Related U.S. Application Data

(60) Provisional application No. 61/392,350, filed on Oct. 12, 2010, provisional application No. 61/445,285, filed on Feb. 22, 2011, provisional application No. 61/470,914, filed on Apr. 1, 2011.

(51) Int. Cl.
*H04W 72/02* (2009.01)
*H04W 24/10* (2009.01)
*H04W 72/04* (2009.01)

(52) U.S. Cl.
CPC .............. *H04W 72/02* (2013.01); *H04W 24/10* (2013.01); *H04W 72/0406* (2013.01)

(58) Field of Classification Search
CPC ..... H04W 16/14; H04W 28/18; H04W 48/14; H04W 24/10; H04W 72/0453; H04W 84/12; H04W 48/16; H04W 72/04; H04W 72/1215; H04W 28/26; H04W 40/04; H04W 52/243; H04W 24/02; H04W 48/10; H04W 16/10; H04W 52/146; H04W 56/002
USPC .............. 455/517, 67.11, 509, 41.2; 370/281, 370/329, 338, 331, 328
See application file for complete search history.

(56) References Cited

U.S. PATENT DOCUMENTS 6,163,680 A    12/2000    Bridle et al.
2002/0082022 A1    6/2002    Johnson
(Continued)

FOREIGN PATENT DOCUMENTS

CN    1992978 A    7/2007

OTHER PUBLICATIONS

Amerisys, Inc. "Proposal for Wireless Coexistence Using an IEEE 802.19.1 Geographic Electromagnetic Radiation Domain Control System," IEEE P802.22.2/D1.0, Aug. 2010.
(Continued)

*Primary Examiner* — Kwasi Karikari
(74) *Attorney, Agent, or Firm* — Condo Roccia Koptiw LLP

(57) ABSTRACT

A method for managing channel selection in a dynamic spectrum management network includes receiving a spectrum allocation request; based on the source of the spectrum allocation request, checking for available channels; based on the source of the spectrum allocation request, collecting sensing and usage data for the available channels; providing the channel usage data to an entity that transmitted the spectrum allocation request.

22 Claims, 36 Drawing Sheets

(56) References Cited

U.S. PATENT DOCUMENTS

| | | | |
|---|---|---|---|
| 2007/0149230 A1 | 6/2007 | Song et al. | |
| 2007/0280334 A1 | 12/2007 | Lv et al. | |
| 2008/0137627 A1 | 6/2008 | Fischer et al. | |
| 2008/0299987 A1 | 12/2008 | Iyer et al. | |
| 2009/0109896 A1 | 4/2009 | Rashid et al. | |
| 2009/0135767 A1 | 5/2009 | Silk et al. | |
| 2009/0190541 A1 | 7/2009 | Abedi | |
| 2010/0034108 A1 | 2/2010 | Ode | |
| 2010/0081449 A1* | 4/2010 | Chaudhri et al. | 455/452.2 |
| 2010/0248631 A1 | 9/2010 | Chaudhri et al. | |
| 2011/0002314 A1* | 1/2011 | Choi et al. | 370/338 |
| 2011/0158147 A1* | 6/2011 | Li et al. | 370/312 |
| 2011/0250858 A1* | 10/2011 | Jain et al. | 455/120 |
| 2011/0286401 A1* | 11/2011 | Wijting et al. | 370/329 |
| 2011/0305206 A1* | 12/2011 | Junell et al. | 370/329 |
| 2012/0008604 A1* | 1/2012 | Kasslin et al. | 370/338 |

OTHER PUBLICATIONS

Baykas et al., "IEEE P802.19 Wireless Coexistence—System Design Document," IEEE 802.19-10/0055r3, Mar. 18, 2010.

European Telecommunications Standards Institute, "Reconfigurable Radio Systems (RRS); Use Cases for Operation in White Space Frequency Bands," ETSI TR 102 907 v0.1.7, Sep. 2011.

Filin et al., "Proposal to System Description and Reference Model Clauses," IEEE P802.19-10/114r1, Sep. 10, 2010.

Jo et al., "IEEE P802.19 Wireless Coexistence—Proposal on the System Description Clause and Reference Model Clause," Sep. 3, 2010.

Junell et al., "IEEE P802.19 Wireless Coexistence—System Description and Reference Model Proposal," IEEE 802.19-10/0110r0, Sep. 5, 2010.

Kang et al., "IEEE P802.19 Wireless Coexistence—System Description and Reference Model Proposal," IEEE 802.19-10/0113r2, Sep. 5, 2010.

Kwak et al., "IEEE P802.19.1 Wireless Coexistence Task Group—System Description and Reference Model Proposal," Sep. 15, 2010.

Takaharu Nakamura, "LTE-Advanced (3GPP Release 10 and Beyond)—RF Aspects," Beijing, China, Dec. 17-18, 2009.

Junell et al., "Proposal on System Description, Reference Model and Draft Outline", IEEE 802.19-10/0127r0, Nokia, Sep. 13, 2010, 22 pages.

Junell et al., "Resource Allocation Principles for 802.19.1Coexistence System", IEEE 802.19-10/0128r0, Nokia, Sep. 15, 2010, 14 pages.

Junell et al., "Proposal on Coexistence System Services and Protocols", IEEE 802.19-10/0156r0, Nokia, Nov. 2010, 46 pages.

* cited by examiner

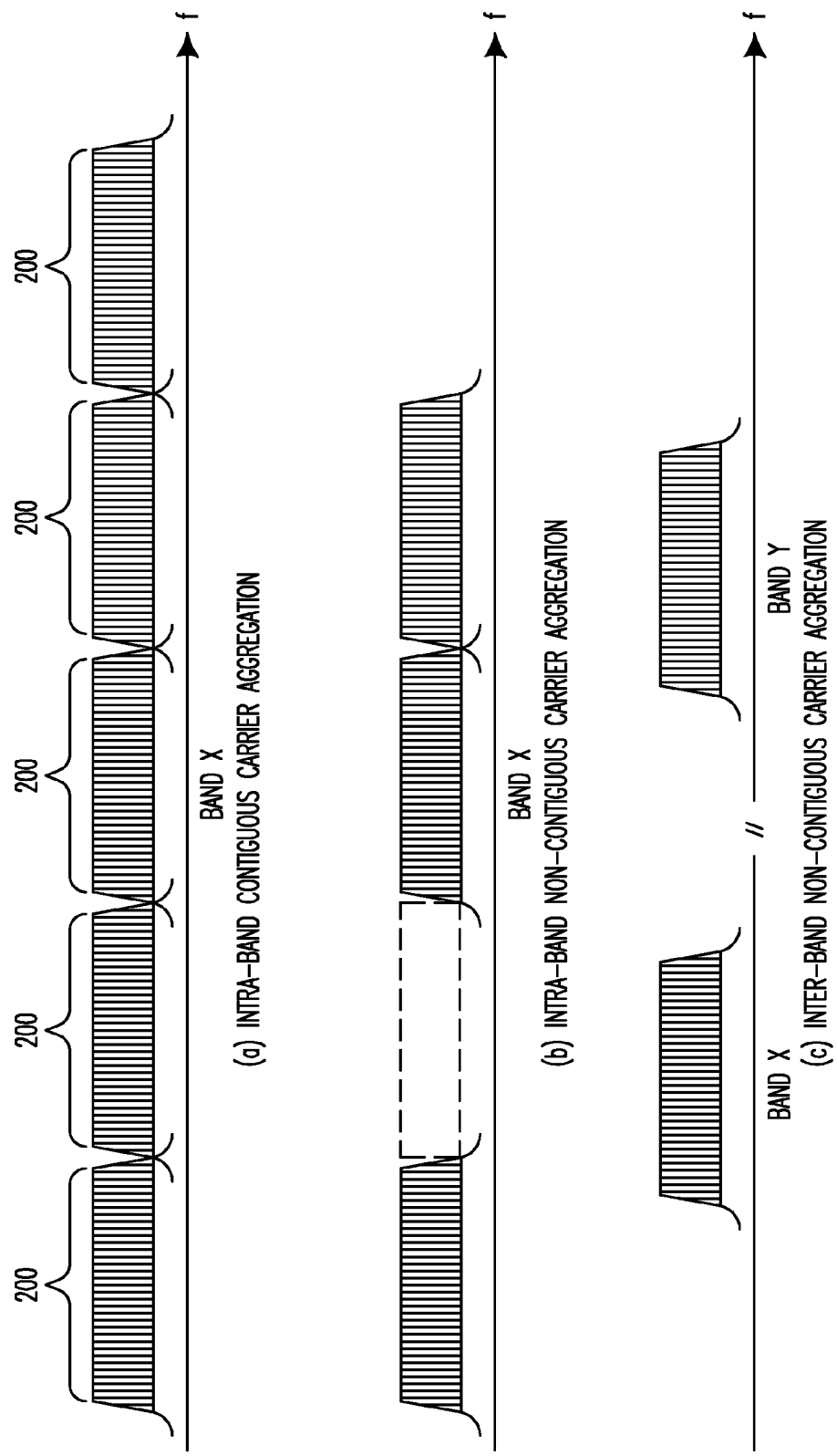

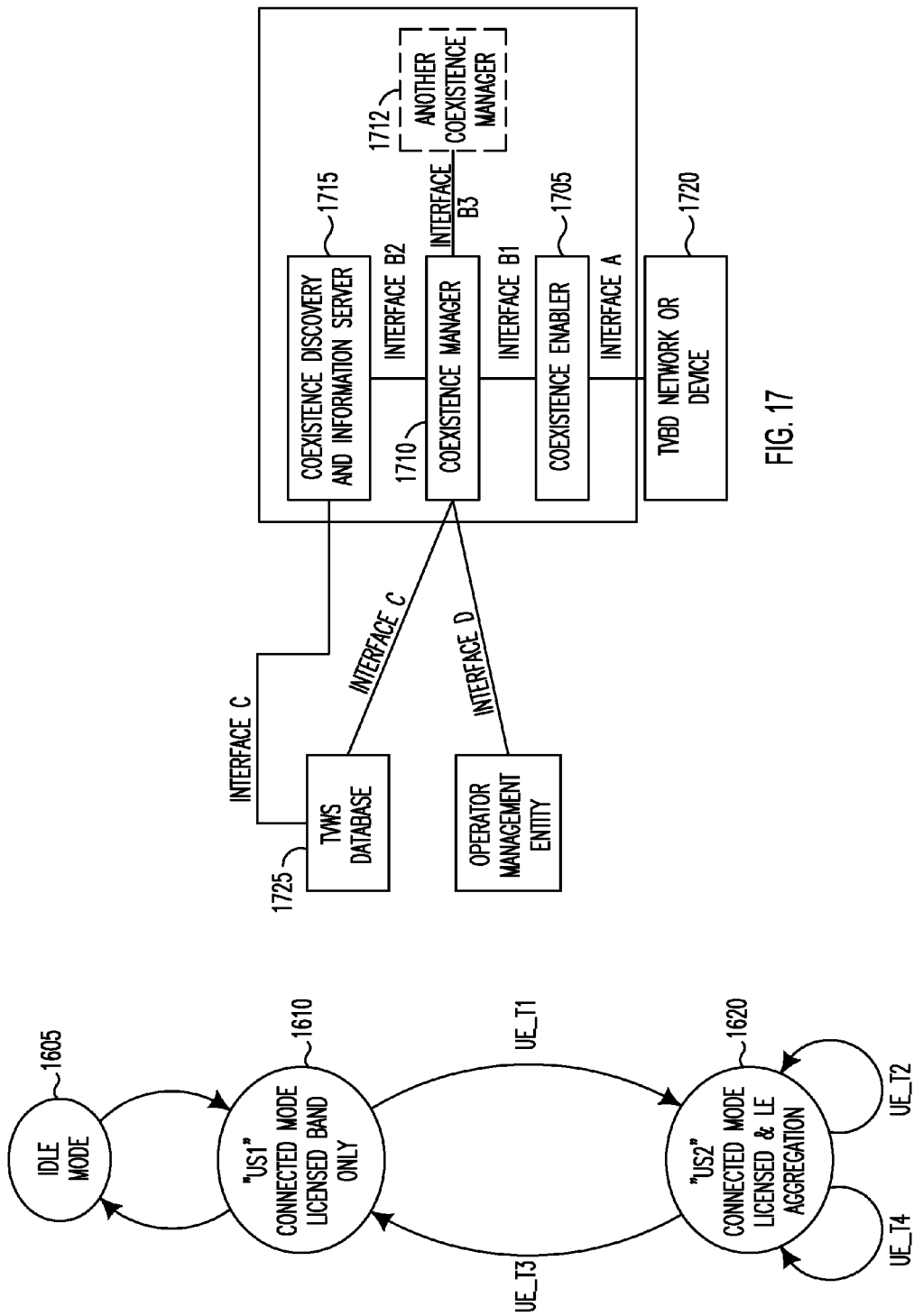

SERVICE-BASED APPROACH TO CHANNEL SELECTION AND NETWORK CONFIGURATION FOR TELEVISION WHITE SPACE NETWORKS

RELATED APPLICATIONS

This application claims the benefit of U.S. Provisional applications 61/392,350 filed Oct. 12, 2010; 61/445,285 filed Feb. 22, 2011; and 61/470,914, filed Apr. 1, 2011.

FIELD OF INVENTION

This application is related to wireless communications.

BACKGROUND

Coexistence between heterogeneous and independently operated networks in the television (TV) bands use unlicensed operation modes, also known as TV White Space (TVWS) networks. A single service access point (COEX_COMM_SAP) may support communication between the various system components when these are distinct. In particular, particular interfaces may all be supported by the single service access point (SAP).

SUMMARY

A method for managing channel selection in a dynamic spectrum management network includes receiving a spectrum allocation request; based on the source of the spectrum allocation request, checking for available channels; based on the source of the spectrum allocation request, collecting sensing and usage data for the available channels; providing the channel usage data to an entity that transmitted the spectrum allocation request.

BRIEF DESCRIPTION OF THE DRAWINGS

A more detailed understanding may be had from the following description, given by way of example in conjunction with the accompanying drawings.

FIG. 2 shows three carrier aggregation types.

FIG. 16 shows a WTRU state transition diagram.

FIG. 17 shows a logical coexistence-specific system architecture.

DETAILED DESCRIPTION

Introduction

Figure 1A:
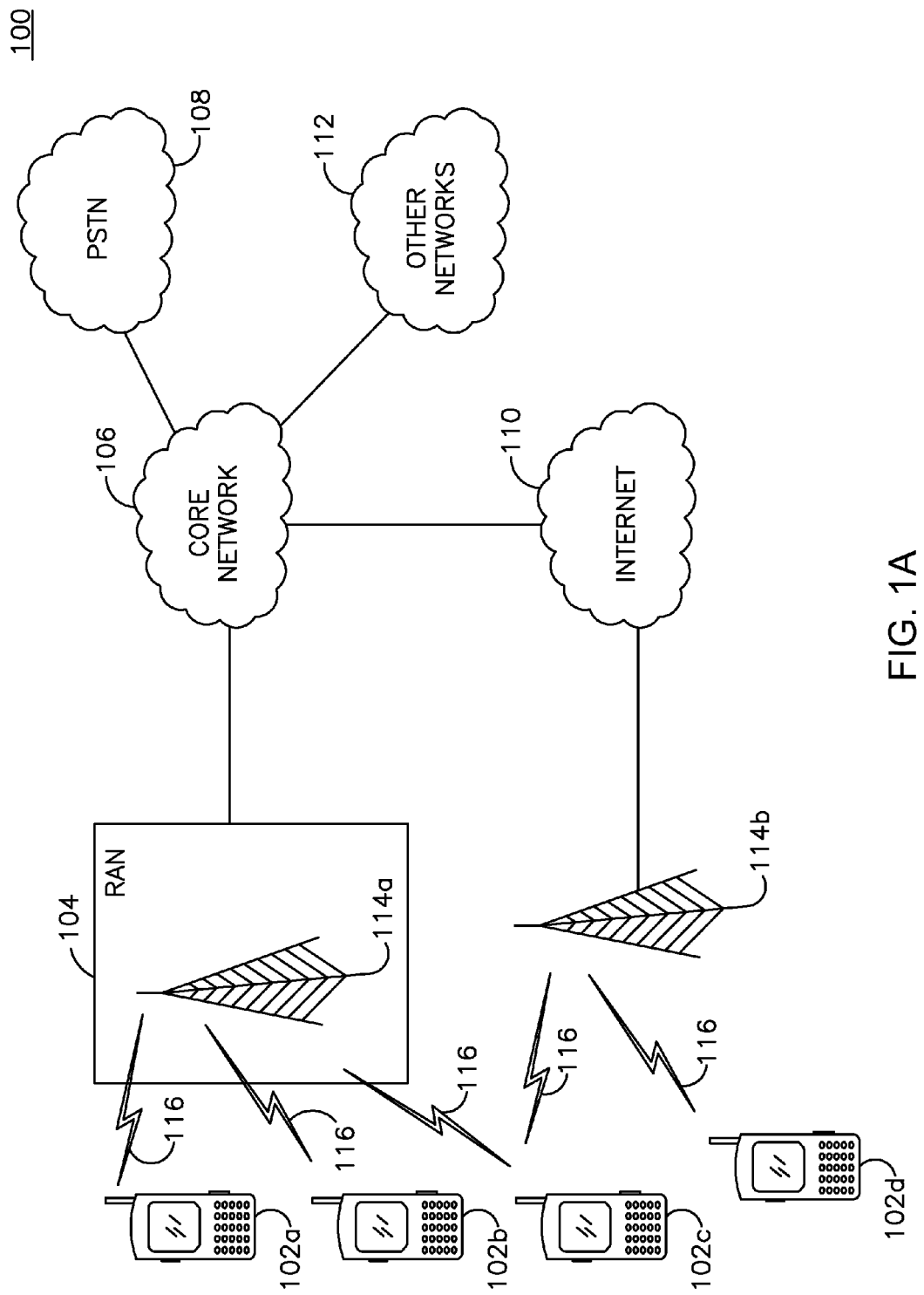
FIG. 1A is a system diagram of an example communications system in which one or more disclosed embodiments may be implemented.

As a result of the transition from analog to digital television (TV) transmissions in the 470-862 MHz frequency band, portions of the spectrum are no longer used for TV transmissions, though the amount and exact frequency of unused spectrum varies from location to location. The unused portions of the spectrum are referred to as TV White Space (TVWS). The Federal Communications Commission (FCC) is opening these TVWS frequencies for a variety of unlicensed uses, including use of WS in the 470-790 MHz bands. These frequencies may be exploited by secondary users for any radio communication given that it is not interfering with other incumbent and/or primary users. There may be licensed signals, other than TV signals, transmitted on these frequencies that are considered incumbents. For example, an incumbent signal may be Broadcasting Service (TBS) or Program Making and Special Event (PMSE) services, including radio microphones in particular. Primary users may register with the WS geolocation database. The WS geolocation database may provide up-to-date information on incumbent frequency usage to other entities.

In Long Term Evolution-Advanced (LTE-A), two to five component carriers (CCs) may be aggregated in order to support wider transmission bandwidths, up to 100 MHz. A wireless transmit/receive unit (WTRU), depending on its capabilities, may simultaneously receive or transmit on one or more CCs. A WTRU may also be capable of aggregating a number of differently sized CCs in an uplink (UL) or downlink (DL). Carrier aggregation (CA) may support both contiguous and non-contiguous CCs.

For example, FIG. 2 shows three different scenarios of CA, including: (a) intra-band contiguous CA where multiple adjacent CCs 200 are aggregated to produce contiguous bandwidth wider than 20 MHz; (b) intra-band non-contiguous CA where multiple CCs that belong to the same bands, but are not adjacent to one another, are aggregated and used in a non-contiguous manner; and (c) inter-band non-contiguous CA where multiple CCs that belong to different bands are aggregated.

LTE systems, and others that support CA (e.g. DC-HSPA), may take advantage of available license exempt (LE) or TVWS spectrum. LTE systems may use the available LE or TVWS spectrum to add new bands to existing LTE band use for CA to transmit to a WTRU in the DL direction, or to a base-station in the UL direction. Operation of systems in the TVWS bands may be done on an unlicensed, opportunistic basis. Therefore, methods of frequency planning may not be applied. As a result, frequency planning for any system operating in LE or TVWS may occur in real time. Due to frequency planning occurring in real time, for any system to perform CA between its licensed bands and the LE or TVWS bands, the system may need to select supplementary LE or TVWS channels with care to avoid interfering with incumbents and to ensure coexistence with other secondary users.

The dynamic nature of channel availability and/or quality in TVWS or LE spectrum may bring challenges in performing CA, as the channels to be aggregated may not always be available or may need to be abandoned to protect incumbents. There is a need for signaling between different entities involved (e.g. base stations, WS geolocation database etc.) to coordinate mechanisms such as activation and/or deactivation of operation in TVWS or LE bands, incumbent protection on TVWS or LE bands, or reconfiguration of TVWS or LE bands. For an LTE, or other, system operating in TVWS or LE bands, there may be a need for robust mechanisms that enable the reliable use of CA. As a result, procedures, such as the use of measurements, may need to be defined for the BS and the WTRU when a LE band is used.

In LTE-A, CA may be enabled by having a WTRU communicate to multiple cells, where each cell has its own physical cell identifier (PCI). For primary and secondary cells in the licensed bands, the PCIs may be managed (i.e. assigned to each cell) locally by each operator. Since each operator may have exclusive use of the frequency band over which it operates (in a specific area), there may be no risk of PCI collision or confusion. When multiple operators (each managed by a CCP) may coexist on the same set of LE frequencies, the problem of management of PCI may exist and procedures for allocating a PCI to each BS that operates in the LE band may be required.

Dual Cell-High Speed Packet Access (DC-HSPA) may also allow for CA.

By using the CA principle, LTE systems, and all other systems that support CA, may improve user peak-rates, network traffic offload, and in specific areas, provide coverage extension. In order for an LTE system to manage the aggregation of the licensed bands and opportunistic spectrum localized in the LE bands, there is a need for coordination between the LTE system and the users of the LE bands.

Network Components and Architecture

When referred to hereafter, the term "wireless transmit/receive unit (WTRU)" includes, but is not limited to, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the term "base station" includes, but is not limited to, a Node B, a site controller, an access point (AP), or any other type of interfacing device capable of operating in a wireless environment.

General Architecture

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it may be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it may be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114*a* may include three transceivers, i.e., one for each sector of the cell. In another embodiment, the base station 114*a* may employ multiple-input multiple output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102*a*, 102*b*, 102*c*, 102*d*. For example, the core network 106 may provide call control, billing services, mobile location-based services, pre-paid calling, Internet connectivity, video distribution, etc., and/or perform high-level security functions, such as user authentication. Although not shown in FIG. 1A, it may be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
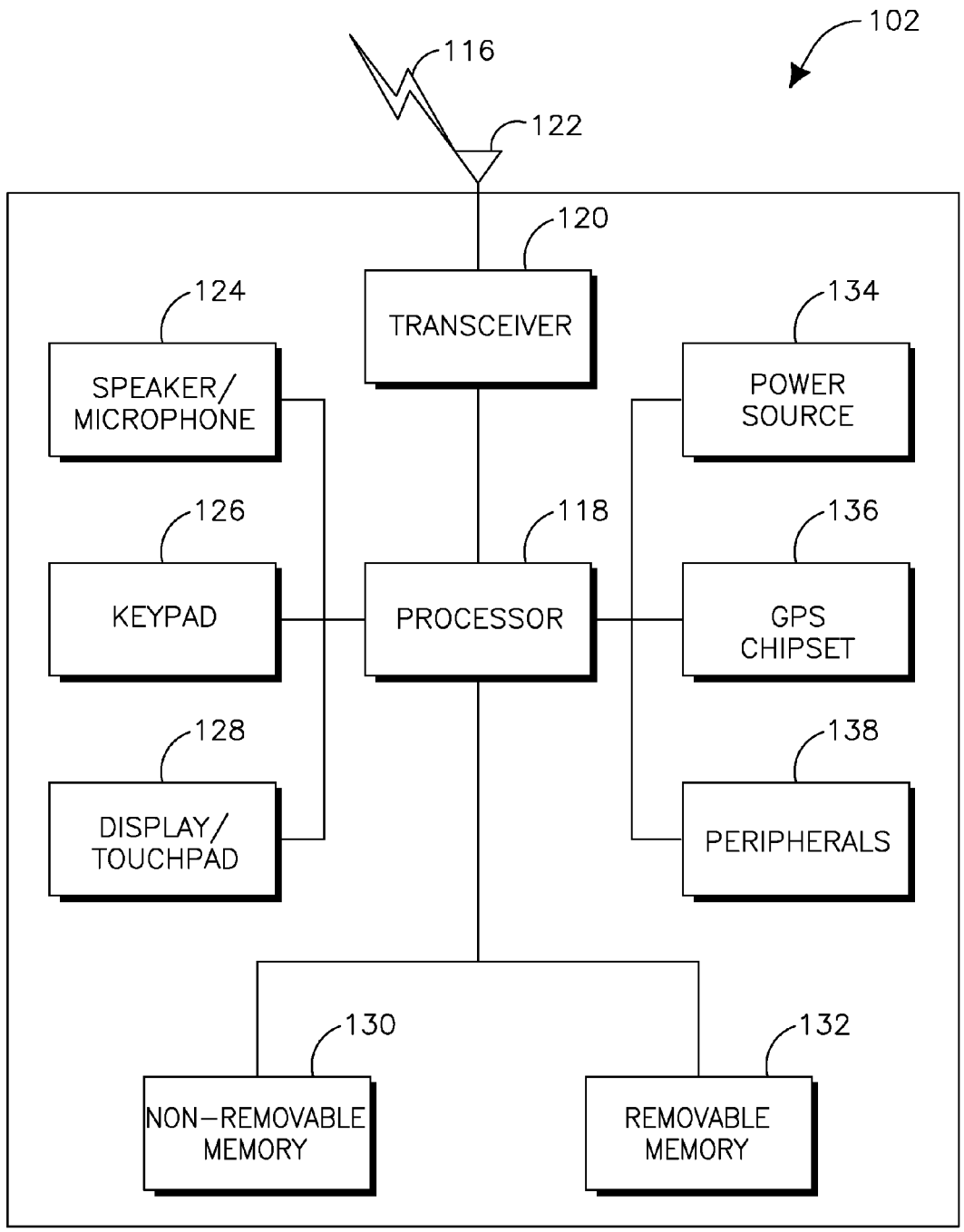
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It may be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It may be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It may be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
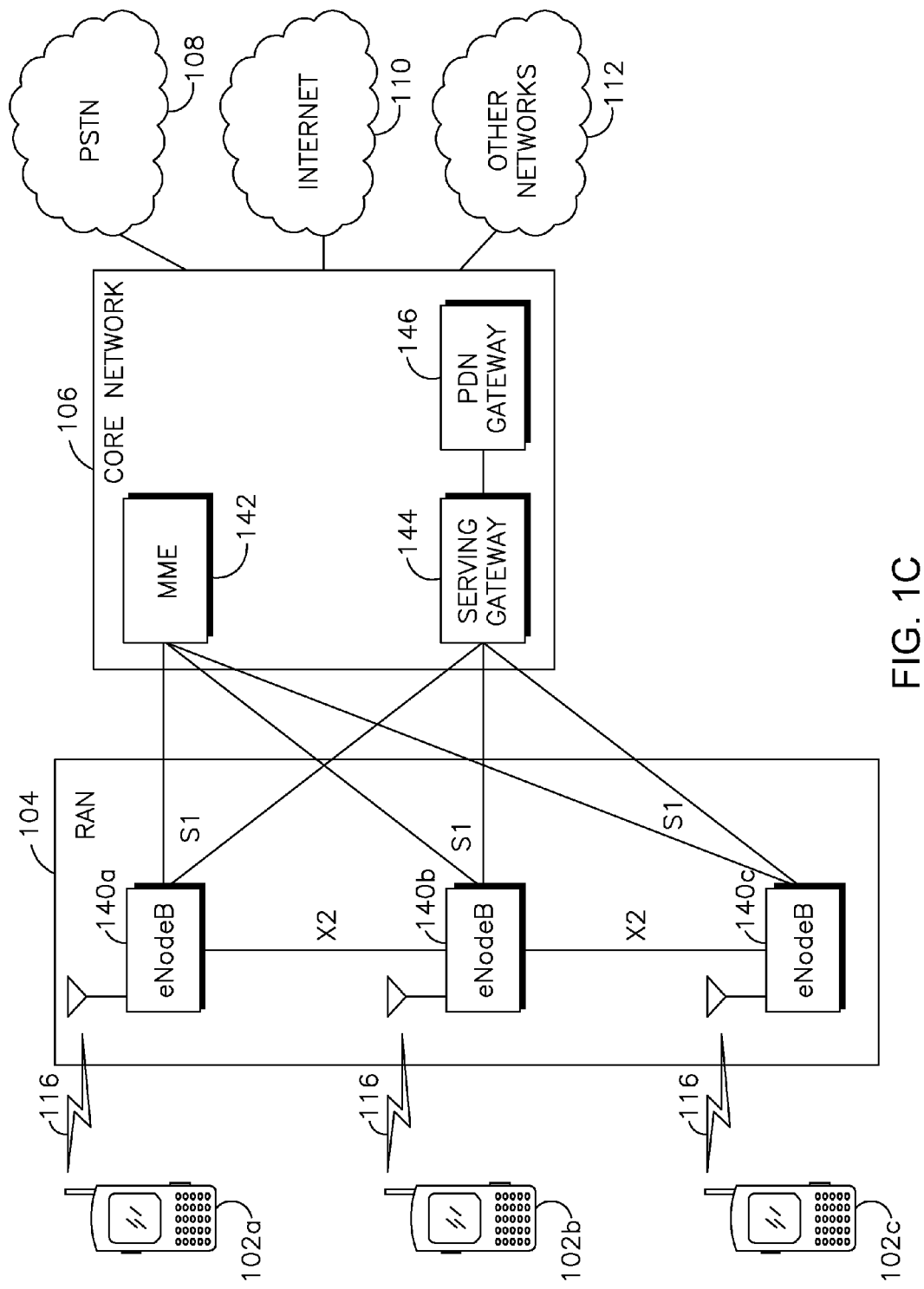
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it may be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it may be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

TVWS Potential Network Architectures

Figure 3:
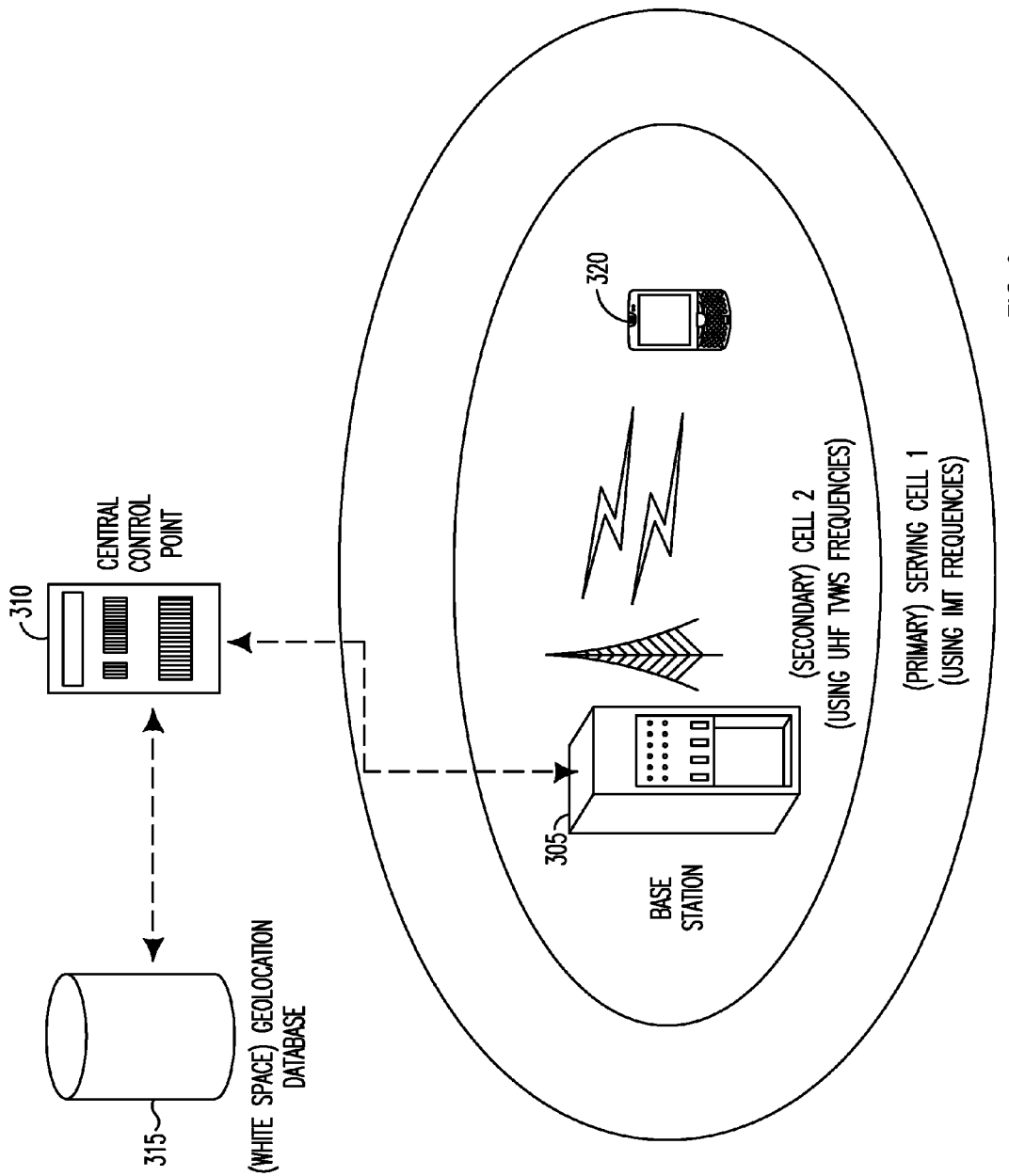
FIG. 3 shows carrier aggregation of IMT bands and TVWS bands.

FIG. 3 shows a carrier aggregation of IMT bands and TVWS bands and an architecture between three main entities: the Base Station (BS) 305, the Central Control Point (CCP) 310, and the WS geolocation database 315. The BS 305 may represent an evolved Node B (eNB) in the LTE standards. The BS 305 may make scheduling and resource allocation decisions for all WTRUs 320 connected to it. In FIG. 3, the BS 305 is connected to the CCP 310 for control of the unlicensed spectrum usage. The BS 305 may be capable of operating in licensed bands only or in both licensed and LE bands.

The availability and/or quality of an LE channel may not be guaranteed. Therefore, there may be a need to have an entity that provides up-to-date information on LE spectrum usage in a given area. This functionality may be provided by the WS geolocation database 315. The WS geolocation database 315 may contain information about the incumbent users in the LE bands.

The CCP 310 may be an enhanced BS 305 or a standalone node. The CCP 310 may be used to manage access of an LTE system to the LE bands. The CCP 310 may connect to the WS geolocation database 315 to receive information on LE spectrum usage. The CCP 310 may manage the LE spectrum allocation to the BSes 305, eliminating a need for negotiation between the BSes 305.

For secondary users to coexist in LE bands, communication between neighbor CCPs may be required to exchange information regarding the usage of LE bands by secondary users. The geolocation database 315 may help in providing incumbent protection, but may not provide information about secondary users to help with coexistence issues. Architecture with the inclusion of a coexistence database may be needed. The coexistence database may keep up-to-date information on which channels are being used by which secondary users, as well as, location information to help adjacent base stations (BSs) avoid the use of adjacent component carriers (CCs). The coexistence database may remove the need for signaling between multiple central control points (CCPs) and may provide a central information bank for a given geographical area.

Figure 4:
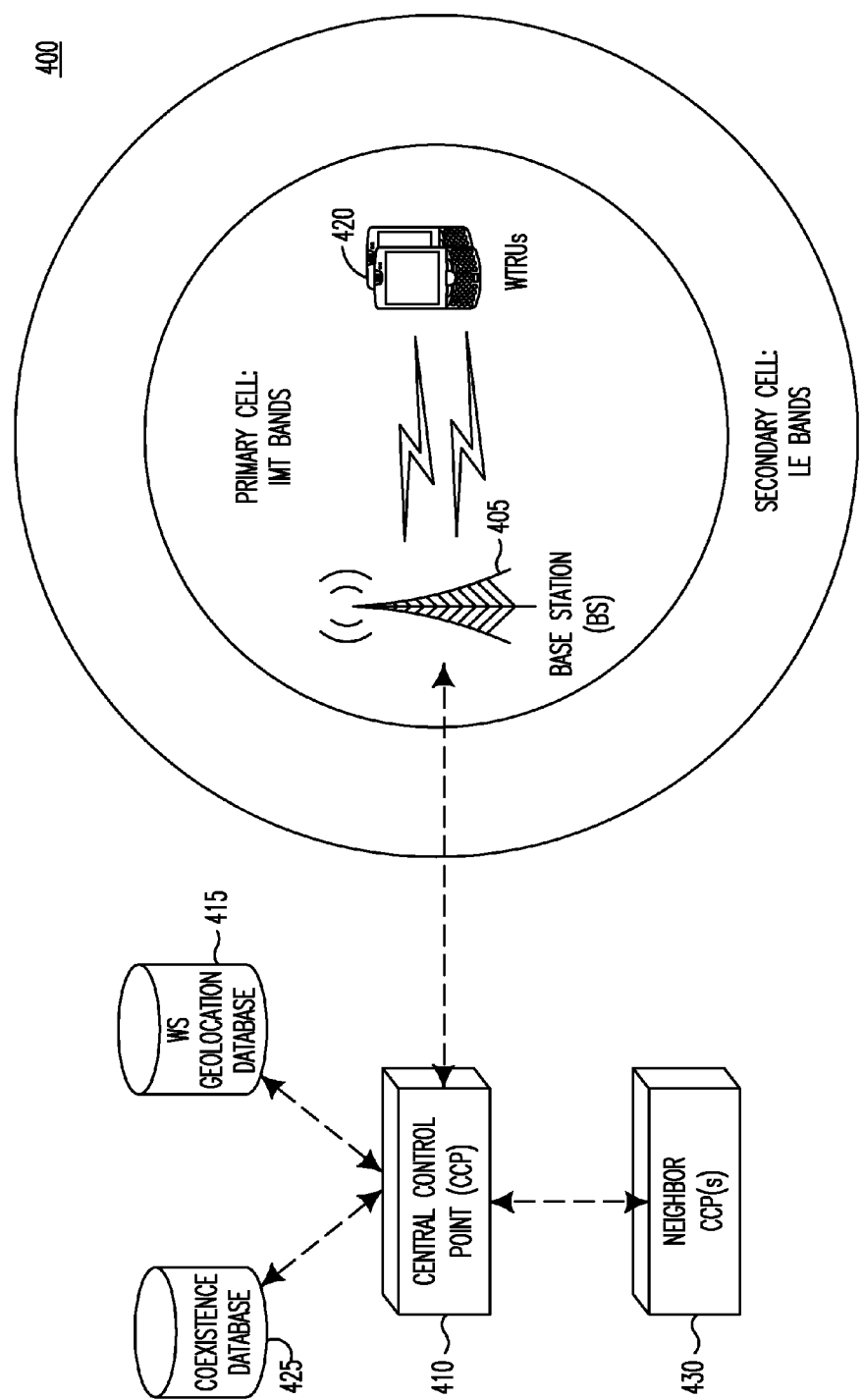
FIG. 4 shows carrier aggregation of IMT and LE bands.

FIG. 4 shows a carrier aggregation of IMT and license exempt (LE) bands. FIG. 4 demonstrates the use of the architecture 400 described above and shows links between the BS 405, a CCP 410, a WS geolocation database 415, at least one WTRU 420, a coexistence database 425 and at least one neighbor CCP 430 that may be necessary to perform carrier aggregation (CA) between the IMT and LE bands. The BS 405 may include an LTE macro cell or of a pico/femto/RRH cell used to provide hot-spot coverage that may aggregate licensed and LE bands.

When a BS 405 decides that it could use more bandwidth, it may inquire of the CCP 410 whether there are any available LE frequencies. The CCP 410 may query both the Geolocation 415 and the Coexistence 425 databases and may make a decision of which, if any, frequency to allocate to the BS 405. If allocated, the BS 405 may reconfigure itself with the new frequency. If not allocated, the BS 405 may continue to operate in the licensed LTE bands.

This additional carrier may be used for scheduling of downlink or uplink traffic to and/or from any or all of the WTRUs 420 currently connected to the BS 405. The BS 405 may also have the capability of sensing the LE spectrum and may transmit the sensing results to the CCP 410.

In a first example, a BS 405 may move from operation in a licensed band to operation in both licensed and LE bands through CA. Several events may trigger a decision to move from operation in a licensed band to operation in both licensed and LE bands. For example, the BS 405 may make use of the LE bands to increase peak data rate of the network. Another example of an event that may trigger a decision to move, the BS 405 may provide network traffic offload by utilizing additional available bandwidth in the LE bands. Another example of an event that may trigger a decision to move, the BS 405, via the radio resource management (RRM), may react to the load and bandwidth requirements (either uplink or downlink) of each of the WTRUs 420 that the BS 405 is serving when making the decision to move.

The BS 405 may decide to start operation in both licensed and LE bands by adding a component carrier in the LE bands. Once this component carrier is added, resources may be scheduled for certain or all WTRUs on the LE carrier.

Coexistence architecture may configure a single service access point (COEX_COMM_SAP) to support channel assignments and network configuration services. With reference to a proposed coexistence architecture, the focus of the proposed service-based approach to channel selection and network configuration may be at interfaces B1, B2 and B3 between coexistence servers, managers, and enablers, for example. It should be noted, however, that the definition of a joint single access point (SAP) permits multiple variations on the architecture, and the architecture disclosed herein need not be so limited. The SAP may define the protocol used by physically distinct elements of an actual system for interoperability and cooperation in the scope of coexistence.

Furthermore, although a primary target of the proposed service-based approach is the coexistence of the television white spaces (TVWS) devices and networks, a proposed approach may be used in other spectra where operation by multiple operators or operation of distinct technologies is supported (e.g. the unlicensed industrial, scientific and medical (ISM) spectra).

FIG. 17 shows a logical coexistence-specific system architecture that defines without limitation, the system entities, which may be the core of providing the coexistence for the TV band networks, and external entities that provide information to the coexistence system. The coexistence system may include three logical entities, Coexistence Enabler (CE) 1705, Coexistence Manager (CM) 1710, and Coexistence Discovery and Information Server (CDIS) 1715.

The CE 1705 may request and obtain information from the TV Band Device (TVBD) 1720 and send resource request to the CM 1710. It may also configure the TVBD's operational parameters, based on the resource allocations from the CM.

The CM 1710 may provide spectrum management service to CEs 1705, and discover and solve coexistence conflicts of the TVBD networks 1720 operating in the same area, and may obtain information from the TVWS database 1725 and CMs 1712 of the neighbor networks.

The CDIS 1715 may provide neighbor discovery service to CMs 1710 and keep records of the registered CMs 1710 and the information of the TVBD networks 1720.

Coexistence Management Examples

The coexistence services may include both information based coexistence service and management based coexistence service. In the coexistence information service, the coexistence system provides TVWS channel usage information and sensing data to secondary-user networks (i.e., LTE HeNB/eNB networks), and lets the latter make informed decisions on operational parameters. In the coexistence management service, the coexistence system may make the channel selection decision (which may include coordination, negotiation or reservation kinds of efforts) for secondary-user networks. Hence, the coexistence management service could be considered as an advanced version of the coexistence information service as described herein regarding negotiation.

Figure 18:
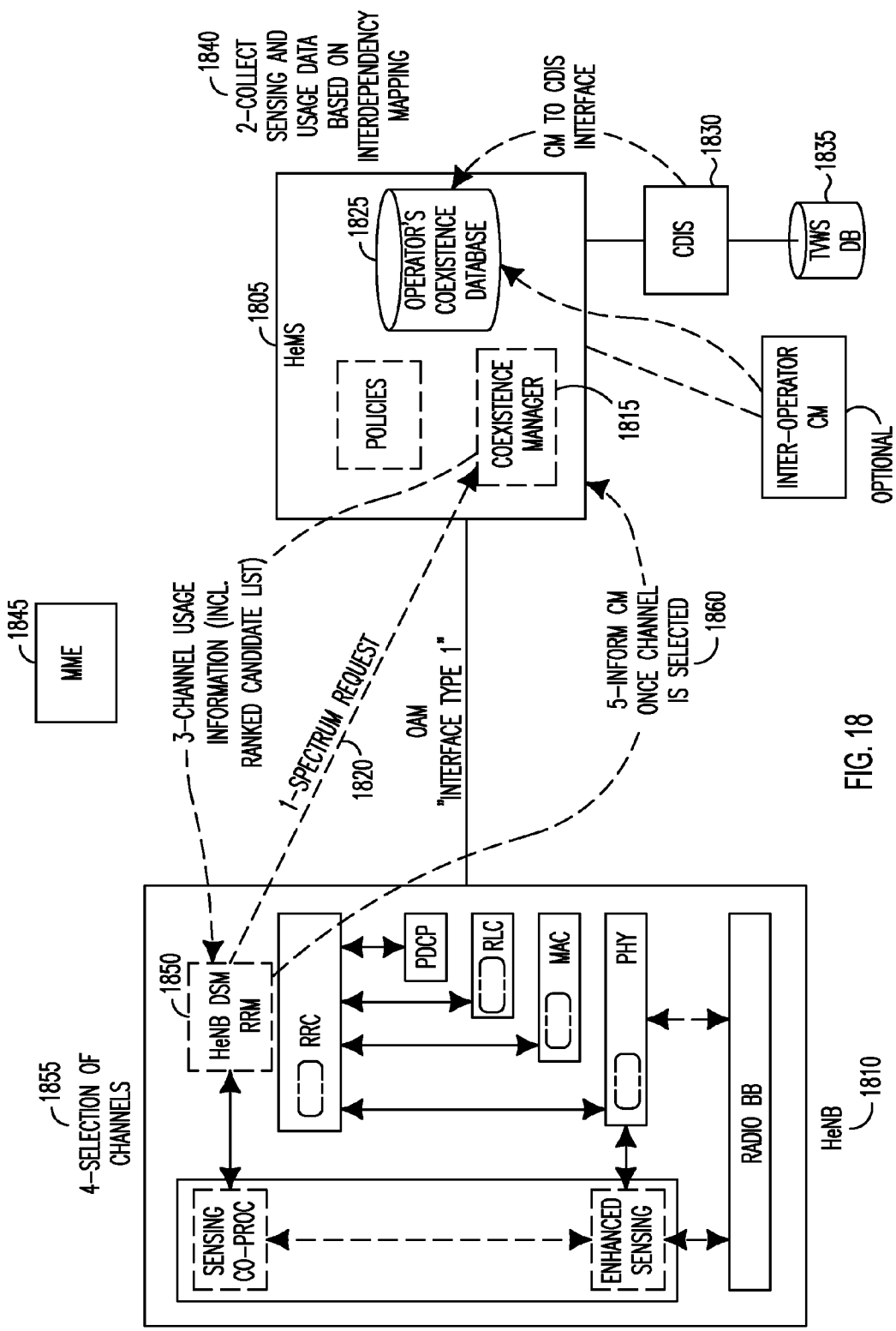
FIG. 18 shows a channel selection procedure in coexistence information services for LTE systems.

FIG. 18 describes how channel assignment may be done in the context of informative coexistence services. Once the CM 1815 within the base station management system (HeMS) 1805 receives spectrum request or spectrum adjustment 1820 from a NodeB 1810, the CM 1815 may, based on the HeNB 1810 geographical location, check the downloaded TVWS database (which can be downloaded from a remote TVWS database 1835) and the operator coexistence database 1825 to get the list of available channels at that location. It may get the contact information of networks operating near the requesting HeNB network from the CDIS 1830.

For each HeNB, the CM 1815 may build an interdependency mapping, so that HeNB 1810 and APs of the operator's network as well as other network registered in the CDIS 1830 potentially interfering or impacted by the given HeNB may be identified. Based on the interdependency mapping, the CM 1815 may collect updated sensing and usage data with pertinent neighbor networks (via their associated CM) 1840. The CM 1815 may then process this information and provide the channel usage information 1845 which may include a ranked and processed candidate list of available channels and pertinent associated TVWS channel usage information to the requesting HeNB network 1810.

Some operator-wise policies may be applied in determining the available TVWS channels. These policies may include regulatory rules as well as other operator-specific policies such as co-channel sharing rules. Similarly, an operator-specific policy could specify the distance range between the HeNBs to which the frequency (channel) re-use policy could be applied. For example, if the distance between two HeNBs is larger than certain threshold, they could use the same channel without any extra limitations (e.g., the maximum transmission power).

Once the HeNB 1810 receives the channel usage information 1845, the Spectrum Allocation function within the DSM radio resource manager (RRM) 1850 may make the channel selection decision 1855 and inform the CM 1860 so that the operator's coexistence database 1825 can be updated.

Within this architecture, consider without limitation the two LTE coexistence systems that follow. For each of these architectures, there is a focus on LTE networks (especially HeNB networks), but other network technologies or different types of network such as enterprise network should also be possible. This assumes the HeNB networks have the capabilities of operating on TVWS channels, as well as on ISM band. As discussed herein, devices capable of operating on TVWS channels are called TVBD, but may also be called WTRUs or mobile stations. Moreover, a TVDB could be a UE, a HeNB or a WiFi device could be a UE, a HeNB or a WiFi device.

Coexistence System with Direct Mutual Communication

Architecture of Coexistence System with Direct Mutual Communication

Figure 19:
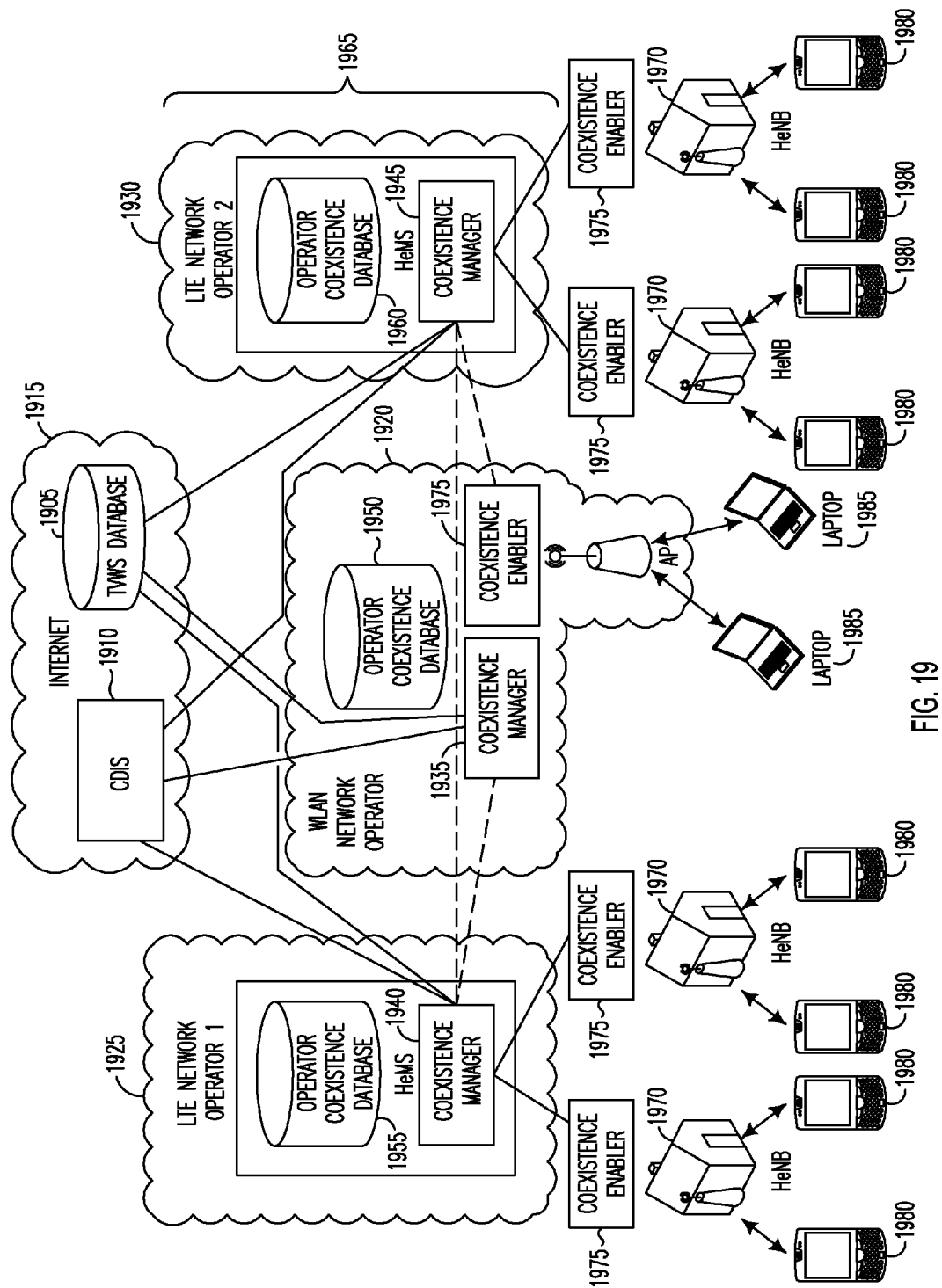
FIG. 19 shows an exemplary deployment of a centralized coexistence entity with Inter-CM communication.

A deployment example based on a centralized coexistence entity with direct inter-CM communication is shown in FIG. 19. In this deployment, the TVWS database 1905 and the coexistence discovery and information server (CDIS) 1910 are located on internet 1915. Each LTE network operator 1920, 1925, 1930 may have its own coexistence manager (CM) 1935, 1940, 1945 and operator coexistence database 1950, 1955, 1960 residing on the core network and in particular in the HeNB Management System (HeMS) 1965. Each network, e.g., HeNB 1970 may have its own coexistence enabler (CE) 1975 and be connected to handsets 1980, laptops 1985, or other devices. Note that for the information coexistence service, the channel selection functionality may be done in the HeNB 1970, while for the management coexistence service, the channel selection functionality may be done at the CM 1935, 1940, 1945.

Although FIG. 19 shows only a single TVWS database 1905 and a single CDIS 1910, there could be multiple entities in the system. Furthermore, an LTE core network could have multiple CMs and operator coexistence databases. The separation of the CMs and operator coexistence databases may depend on locations. In other words, the core network may have several regional CMs and regional operator coexistence databases. For some networks (e.g., WLAN), CM, CE, and operator coexistence database could reside on the same device as the AP may not support the type of higher layer functionalities required for a CE.

The CDIS 1910 may provide the neighbor discovery service to CMs 1935, 1940, 1945. Based on the location that a CM 1935, 1940, 1945 indicates, the CDIS 1910 could respond by a list of networks around that location, as well as the contact information of those networks.

The operator coexistence database 1950, 1955, 1960 may contain the TVWS usage information of all secondary networks within the network operator, also referred to as sensing and usage data. The operator coexistence database 1950, 1955, 1960 may reside in the HeMS 1965 next to the CM and contains a number of entries, each one corresponding to one HeNB entity or AP operating on TVWS bands.

A CM function may be located in the HeMS 1965. It may be responsible to manage inter-HeNBs as well as inter-operator coexistence operation. The functions that CM hosts may include:

(1) Maintain the operator coexistence database 1950, 1955, 1960;

(2) Update CDIS and TVWS database 1905, 1910 about the networks within the operator;

(3) Acquire sensing and usage data including information from neighbor CMs and construct and maintain an interdependency mapping for each HeNB 1970 under its supervision;

(4) Process and forward the TVWS channel usage information to requesting HeNB 1970 which could include some initial ranking of the available channels as well as proposing non conflicting physical Cell ID for each channel frequency (information service only);

(5) Allocate TVWS resources to the HeNB networks 1970 within the operator (management service only);

(6) Coordinate the TVWS usage between multiple HeNB networks 1970 within the operator (management service only); and (7) Negotiate the TVWS usage between multiple HeNB networks beyond the operator (management service only).

If a HeNB 1970, associated with an LTE core network, is capable of operating in TVWS band, then it may support the CE function. The CE 1975 may collect information of the HeNB network capabilities and resource needs. The CE 1975 may provide this information to the CM 1935, 1940, 1945, which may reside on the associated LTE core network 1920, 1925, 1930. For the information based coexistence service, the CE 1975 may receive the spectrum usage information from the CM 1935, 1940, 1945. It may pass this information to HeNB 1970. It may also forward the resource allocation decisions from the HeNB 1970 to the CM 1935, 1940, 1945. For the management based coexistence service, the CE 1975 may receive the resource allocation decisions from the CM 1935, 1940, 1945. It may configure the HeNB operation accordingly.

Figure 20:
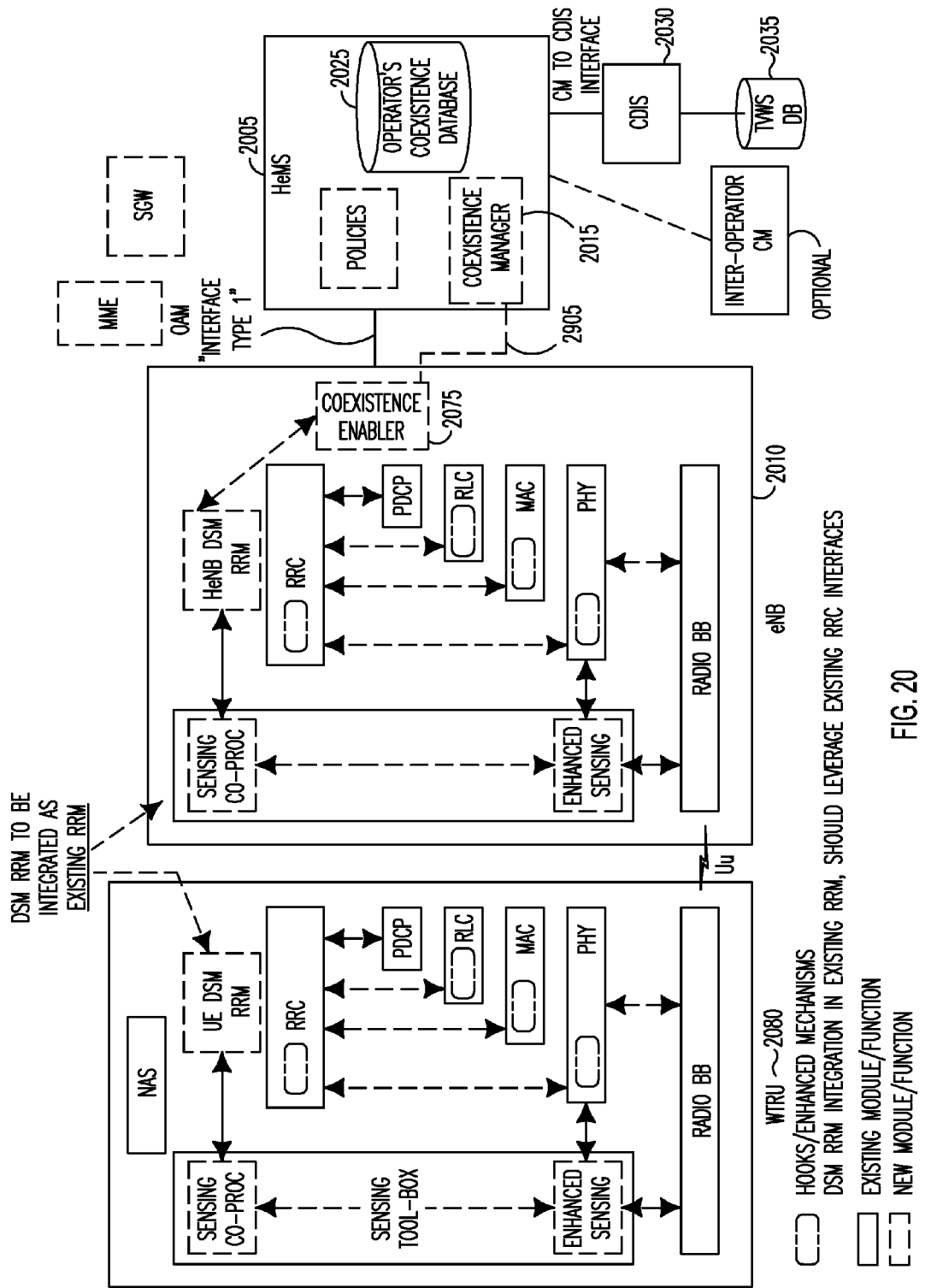
FIG. 20 shows an exemplary implementation of the centralized coexistence entity approach in LTE HeNB system.

FIG. 20 shows an exemplary implementation of the centralized coexistence entity approach in LTE HeNB system, using elements and numbering similar to FIGS. 18 and 19. As shown, the CM 2015 and the operator's coexistence database 2025 may be located at the HeMS 2005. The CDIS 2030 is co-located with the TVWS database 2035. The CE 2075 may be contained in the HeNB 2010, which also communicates with the WTRU 2080.

Operations for Information Service

Figure 21:
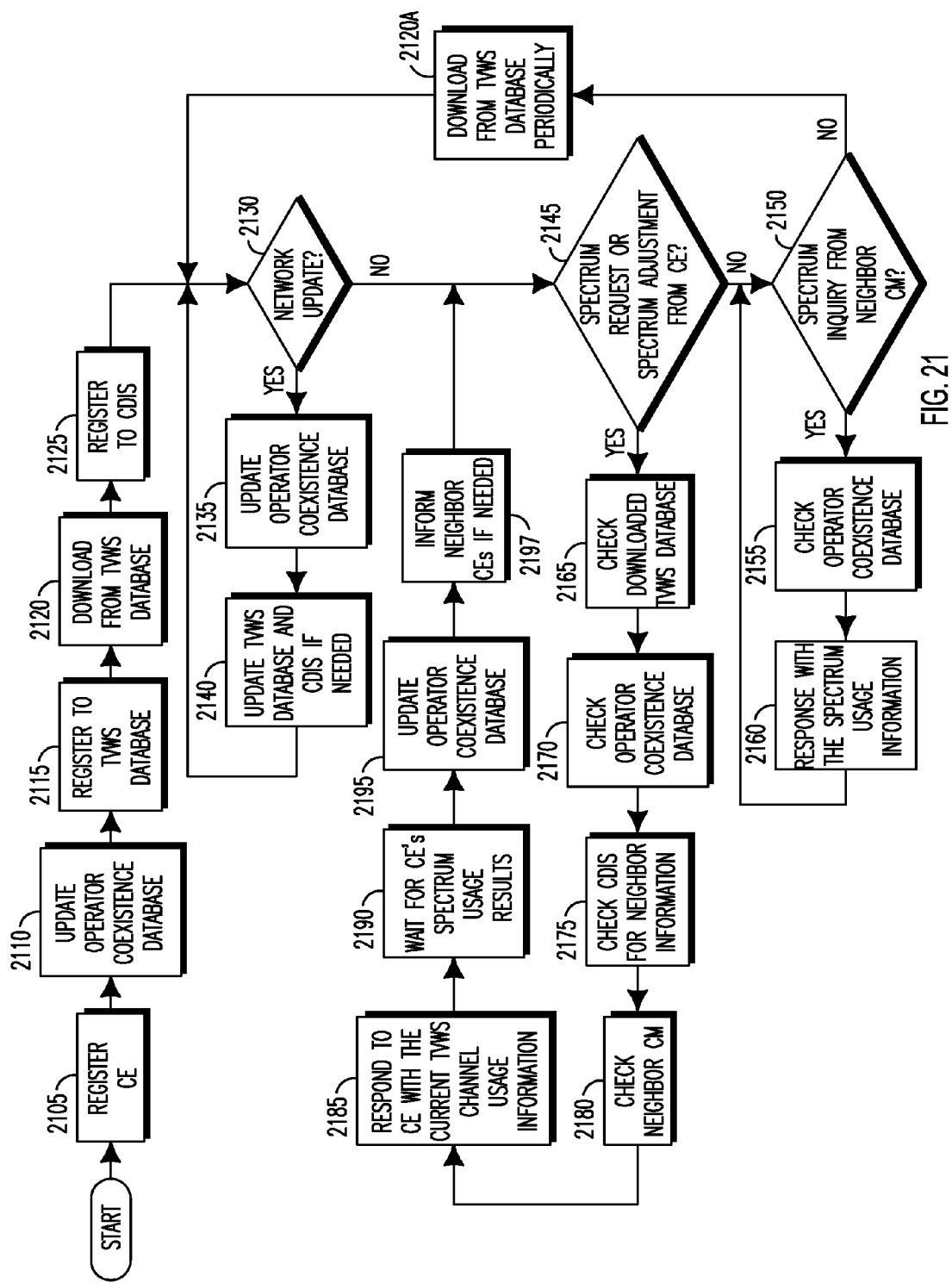
FIG. 21 shows the CM's operations for the information coexistence service.

FIG. 21 shows potential CM's operations for the information coexistence service. In this case, when a HeNB/CE capable of operating in TVWS band is activated, it may first send a registration request to the CM 2105, followed optionally by an update of the operator coexistence database 2110. The HeNB, as a Mode II TVBD in the context of the FCC regulation, may register directly or indirectly to the TVWS database 2115. In this registration, the CM may collect the HeNB network information, such as network ID, network administrator contact information and possibly the information of all TVBD devices within the HeNB (e.g., device ID, device type, device serial number, location, transmission antenna height, etc.). Such information is stored in the operator coexistence database.

Then, the CM may register all the fixed or Mode II TVBDs on their behalf (e.g., the HeNB in LTE system) to the TVWS database 2115, by providing certain TVBD information, e.g., HeNB device ID, device type, serial number, device location, contact information, etc. The CM may also register all the HeNB networks to the CDIS 2125, by providing certain HeNB network information, e.g., network location, network coverage area, network operator contact information.

After the registration process is completed, the CM may acquire TVWS usage information from the TVWS database 2120 related to primary users within the coverage areas of the registering HeNBs. This information may be used to construct the inter-dependency mapping for the particular HeNB. The TVWS database information download could occur in a frequency required by FCC rule, e.g., every day.

The CM may also receive HeNB network update from a CE 2130. In this case, it could update the operator coexistence database 2135. In some cases, like the location change of a Mode II TVBD device (e.g., the HeNB), the CM may also update the TVWS database and CDIS 2140. The network update may also include the release of certain TVWS channel resources by a HeNB network, or as shown in step 2120a, in a periodic download from the TVWS database.

Once a CM receives the spectrum inquiry 2145 from a neighbor CM 2150, it may check the operator coexistence database 2155 to see if at a specific location, this operator has networks operating on the TVWS channels of interest. It could respond with such spectrum usage information 2160.

Once the CM receives spectrum request or spectrum adjustment from a HeNB network (via its associated CE) 2145, the CM may, depending on that HeNB network location, check the downloaded TVWS database 2165 and the operator coexistence database 2170 to see the list of available channels at that location. Then it may check the CDIS for the contact information of networks near the requesting HeNB network 2175. In case there are neighbor networks, the CM may check the neighbor networks (via their associated CM) and other HeNBs under its supervision to acquire pertinent sensing and usage data based on the inter-dependency mapping 2180.

It may then process and forward the TVWS channel usage information to a requesting HeNB which could include some initial ranking of the available channels as well as proposing non conflicting physical Cell ID for each channel frequency 2185. The channel usage information could be provided as a ranked channel list. There are different ways of ranking available channels. One criterion may be based on the users of the channel. For example, the users of a channel could be 1) primary user; 2) friendly secondary user; 3) non-friendly secondary user. Another criteria may based on the interference level between the networks. The channel usage information could also indicate the operating mode the LTE system should operate in. For example, there could be 3 types of operating modes:

(1) Sublicensed: TVWS channel sublicensed to an operator or user for a specific geographical area and for a specific time which are not used by any primary user and other secondary users (i.e. typically a channel originally owned by DTV broadcast station but was made available—through agreement and/or brokerage).

(2) Available: TVWS channel that is free from primary user but could be used by any secondary users.

(3) PU assigned: TVWS channel used by primary user which requires secondary users to leave the channel if primary user is detected.

The CM may wait for the spectrum allocation decision from the requesting HeNB network 2190, and updates its operator coexistence database accordingly 2195. The CM may also inform a neighbor HeNB network (within the same operator) if the requesting HeNB network uses (or used) the same TVWS channel as the neighbor HeNB network 2197.

Some operator-wise policies may be applied in determining the available TVWS channels. These policies include FCC rules which every TVBD has to follow, as well as other operator-specific policies like co-channel sharing rules. The co-channel sharing policy may state:

(1) Whether a HeNB of this operator could share the same channel with another HeNB i) of the same operator, ii) of a friendly neighbor CM, iii) or of an unreliable CM.

(2) In case of the co-channel sharing is supported, what types of co-channel sharing is allowed. The co-channel sharing schemes include TDM, FDM and interference management. The co-channel sharing schemes may be related to serving CMs for these HeNBs. For example, a HeNB could have TDM, FDM and interference management types of co-channel sharing with a HeNB of the same operator, could have FDM and interference management types of co-channel sharing with a HeNB of a different friendly operator, and could only have interference management type of co-channel sharing with a HeNB of an unreliable CM.

(3) In case of the co-channel sharing is supported, what is the distance range between the HeNBs to which the co-channel sharing schemes could be applied.

Similarly, an operator-specific policy could specify the distance range between the HeNBs to which the frequency (channel) reuse policy could be applied. For example, if the distance between two HeNBs is larger than certain threshold, they could use the same channel without any extra limitations (e.g., the maximum transmission power).

The above co-channel sharing policy and channel re-use policy could be extended to adjacent channel usage (or second adjacent channel usage, etc). For example, if HeNB_1 of an operator is using a TVWS channel, HeNB_2 of the same operator could use the adjacent channel if its distance from HeNB_1 is larger than certain threshold. The maximum transmission power of HeNB_2 may also be restricted. On the other hand, HeNB_3 of a friendly operator (CM) could use the adjacent channel if its distance from HeNB_1 is larger than another threshold, and the maximum transmission power of HeNB_3 may be restricted by a different value than HeNB_2.

Although most of the above policies are based on the locations of the HeNBs, other factors may also be taken into account. For example, a $3^{rd}$ party may perform the radio environment measurement over city-range areas. Such measurement may cover the TVWS channels. Hence, the operator policy could specify whether and how such measurement information could be used. Another policy example could be whether certain rules could be applied to mobile HeNBs.

Figure 22:
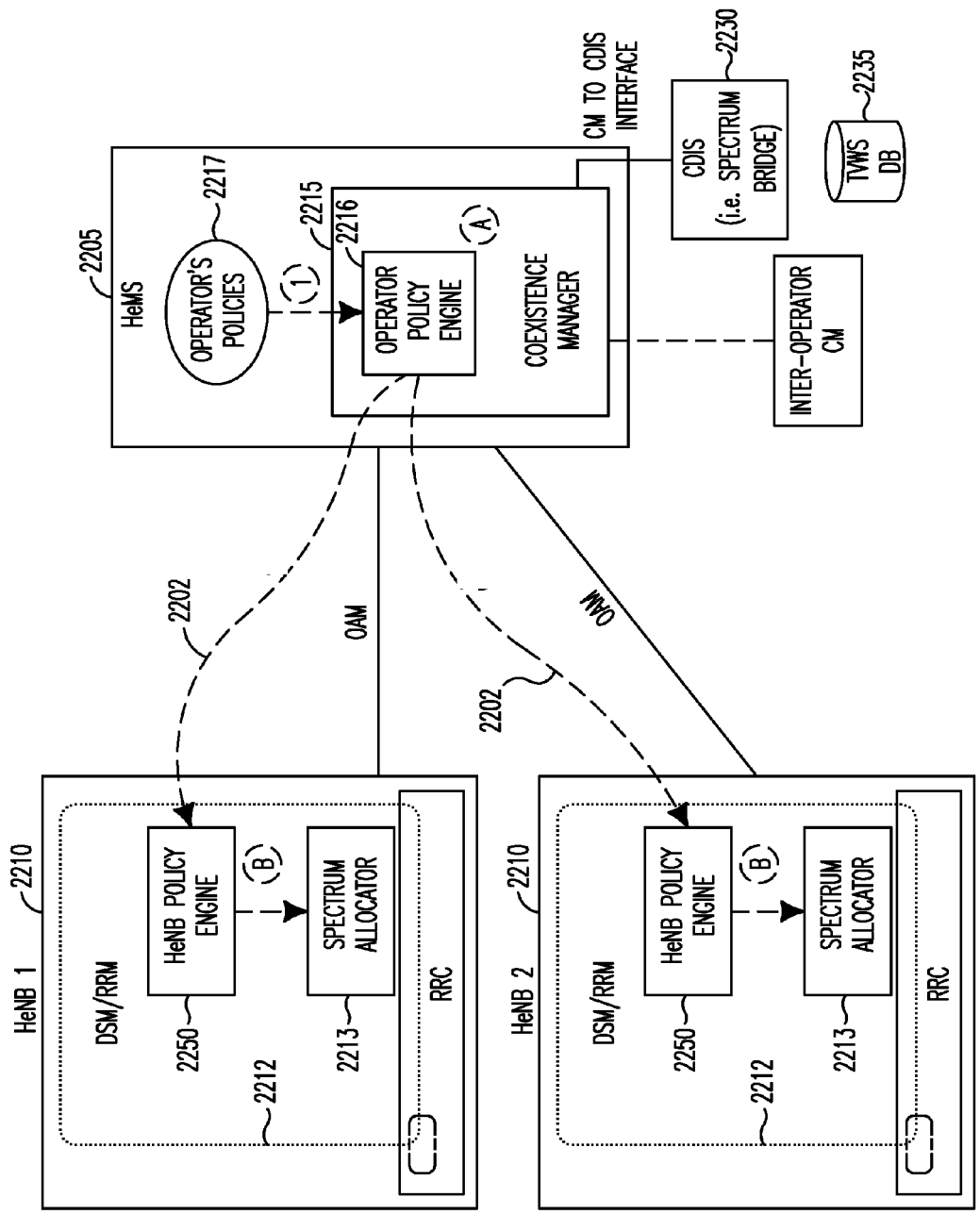
FIG. 22 illustrates the different acting functions related to the operating policies over the different LTE system nodes.

FIG. 22 illustrates the different acting functions related to the operating policies over the different LTE system nodes such as the HeNB 2210, HeMS 2205, the CDIS 2230, and TVWS database 2235.

The Operator Policy Engine at the HeMS 2205 may be responsible for:

(1) providing constraints and preferences based on the operator policies 2217 from which the CM 2215 derives the processed channels candidates list sent to the HeNB 2210, illustrated by the circled 1.

(2) Managing the transfer of operator policies to the HeNB Policy Engine 2216 at initialization of the HeNB 2210 as well as during operation (ex: at a change of a policy) as illustrated by the circled 2.

The HeNB policy engine 2216 may be part of the HeNB DSM RRM 2212 responsible for: receiving, as an input, the operator policies 2217, and issuing constraints and preferences to the Spectrum Allocation function (SA) 2213 in the DSM RRM 2212 at initialization as well as during operation (ex: at a change of a policy), as illustrated by the circled B. The HeNB Policy Engine 2216 could constrain other functions within the HeNB 2210 like power control, RAC, ICIC, etc.

The Coexistence Manager 2215 in the HeMS 2205 may use the constraints provided by the Operator policy engine 2216 as an input in constructing the processed channels candidates list sent to the HeNB 2210.

The Spectrum Allocation in the HeNB DSM RRM 2212 uses the constraints and preferences provided by the HeNB policy engine 2216 as an input to the channel selection algorithm.

CE Operations for Information Service

Figure 23:
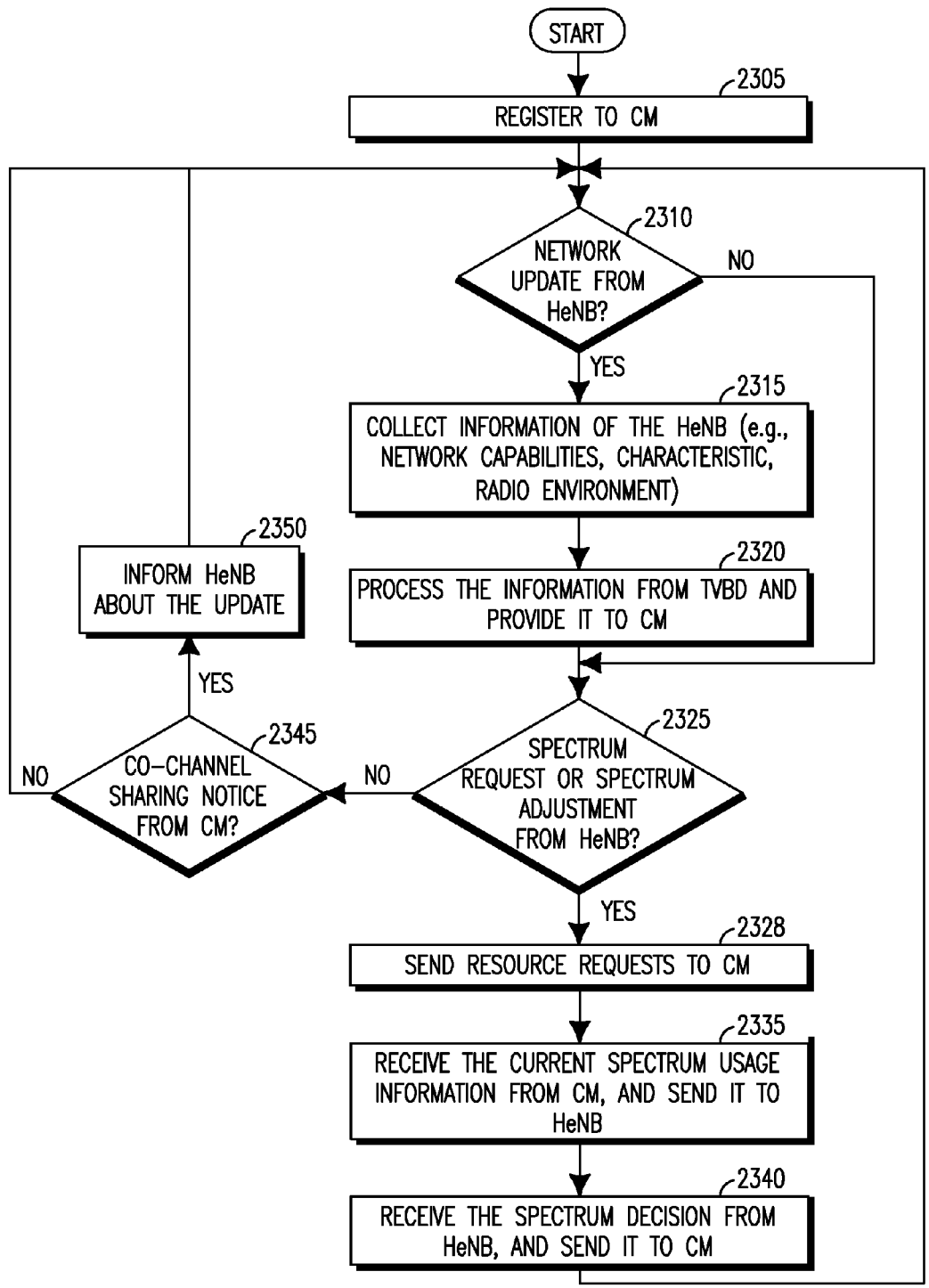
FIG. 23 shows a flowchart of coexistence enabler's operations for information service.

A CE may resides on a HeNB and be the main interface with the CM to allow for the HeNB to benefit from the coexistence service. The operations of a CE for information service are shown in FIG. 23.

Initially, the CE on behalf of the HeNB registers to a CM 2305 which may then register the CE to the TVWS database on its behalf to ensure that the HeNB complies as a Mode II TVDB. Once the HeNB (via the CE) is registered, it may collect, from the TVBD, the information required for coexistence (e.g. network capabilities, resource needs and radio environment) 2315. The CE may process the information and delivers a subset to its serving CM 2320. If there is any network update 2310, the CE may inform the CM about this change. The network update may include (1) some changes on the properties of the network, e.g., the location or the transmit power of the HeNB is changed, (2) some changes on the network QoS requirement, (3) some changes on the network radio environment, and (4) the network stops using some TVWS channels.

A CE may send the spectrum request or the spectrum adjustment message to the CM upon the reception of the TVWS service request from its associated HeNB 2325, and send the resource requests to the CM 2328. The spectrum request from the HeNB could be triggered by various factors. Some factors are initiated by HeNB, while others are initiated by UE. The HeNB initiated factors include (1) Network degradation detection (congestion/high retransmissions . . . ), (2) Higher buffer occupancy for downlink, and (3) UE at a cell edge with a restricted increase of licensed cell power.

The UE initiated factors include (1) UE detects the need for higher bandwidth (starting high QoS application, high size of uplink buffer) and (2) UE is interfered in licensed bands.

The CE receives the current spectrum usage information from its serving CM 2335. It then passes this information to the HeNB, for the latter to perform the spectrum allocation decision. Once it receives the spectrum decision from HeNB, it sends it to CM 2340.

If the CE receives a co-channel sharing notice (for information service) or a spectrum allocation update (for management service) from CM 2345, it informs the HeNB about this update 2350.

Coexistence System Procedures

Registration Procedure

A HeNB may register to a coexistence system before it uses the coexistence service. The registration procedure may be used by CE to update information of its HeNB network or devices to CM. Basically, the CE collects from the HeNB about the information required for coexistence. The CE processes the information and delivers it to its serving CM. Then the CM updates its coexistence database and registers the HeNB to the TVWS database and the CDIS.

Figure 24:
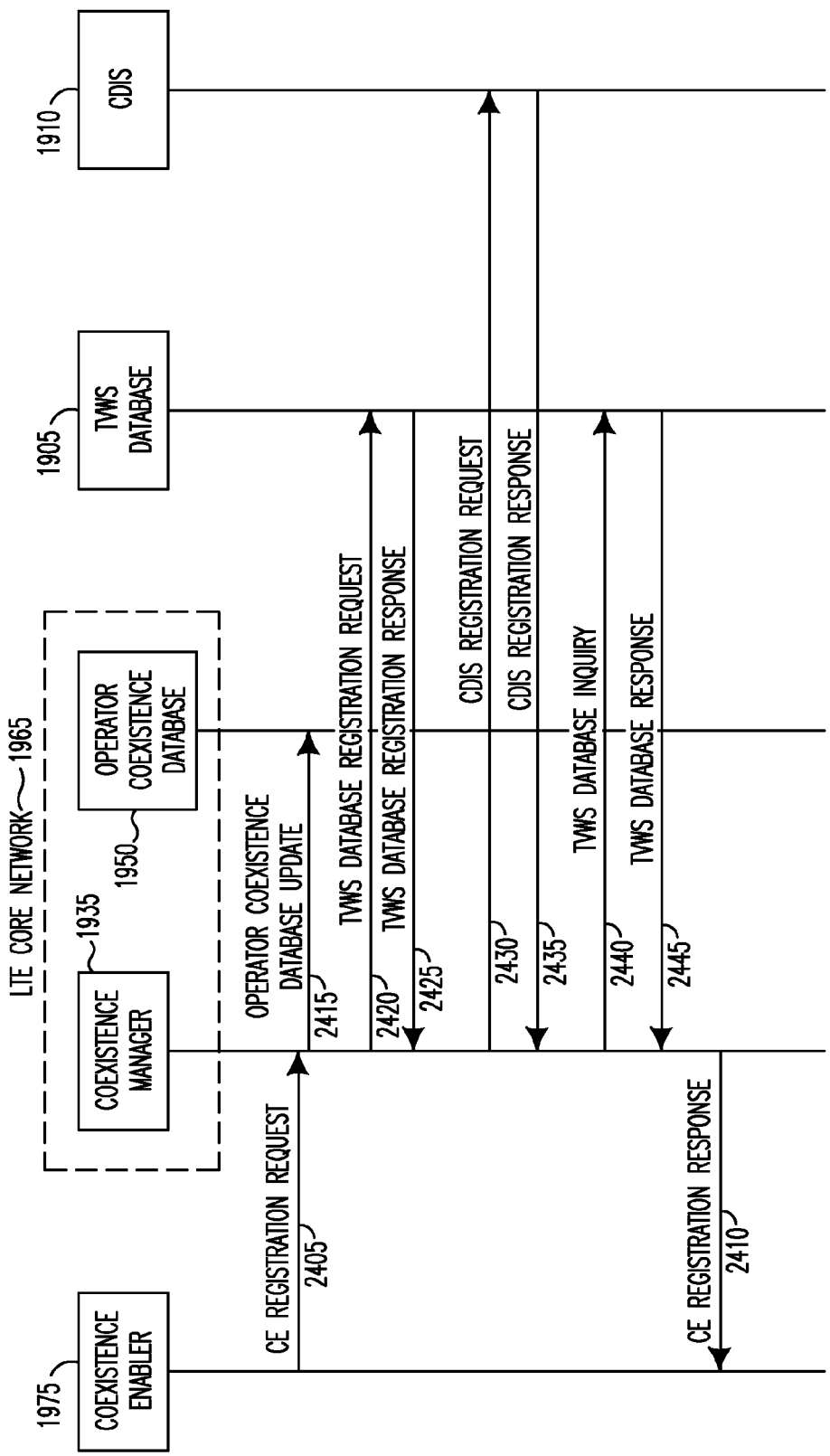
FIG. 24 shows an exemplary CE registration procedure.

The exemplary call flows of the registration procedure are shown in FIG. 24, with the contents of the messages described below.

CE Registration Request 2405: This is the message sent from the CE 1975 to its serving CM 1935. This message 2405 may register a HeNB network, to the CM 1935 in the LTE core network 1965. The contents of the message could be 1) HeNB network general information (e.g., network ID, network access point location including geo-location, network administrator contact information); 2) HeNB network detailed information (e.g., network coverage area, network QoS requirement, network radio environment, all the associated TVBD's information, some policies to follow).

CE Registration Response 2410: This is the message that may be sent from the CM 1935 to the CE 1975, as a response to the "CE Registration Request" message 2405. It informs the CE 1975 whether the registration is successful or not.

Operator Coexistence Database Update 2415: This may be the message sent from CM 1935 to operator coexistence database 1950. It may modify the operator coexistence database 1950 on the HeNB network information within the area covered by the LTE network for the same operator. The contents of this message are a subset of the items stored in the operator coexistence database. They include 1) network identification information (e.g., network ID and type, identification address of HeNB networks, geo-locations of the HeNB); 2) TVWS usage information of each associated HeNB network (e.g., the TVWS channels occupied by the HeNB network, time duration of the TVWS channel used by the HeNB network, antenna height and transmission power of the HeNB network central controller); 3) network operation information (e.g. network coverage area, interference area related information, devices information, network QoS requirement, network radio environment information, policy information)

TVWS database Registration Request 2420: This may be the message sent from the CM 1935 to the TVWS database 1905. This message may register the CE 1975 on behalf of the HeNB as a Mode II TVDB to the TVWS database 1905. The contents of the message could be 1) TVBD ID; 2) TVBD type (i.e., fixed device or Mode II portable device); 3) TVBD antenna height; 4) TVBD location; 5) other capabilities of the TVBD; 6) some contact information, etc. Such a message could be one per a single TVBD.

TVWS database Registration Response 2425: This may be the message sent from TVWS database 1905 to CM 1935, as a response to the "TVWS database Registration Request" message 2420. It may tell the CM 1935 whether the registration of the Mode II TVDB (e.g. HeNB) is successful or not.

CDIS Registration Request 2430: This is the message that may be sent from CM 1935 to CDIS 1910. This message 2430 is to register all the HeNB networks served by the CM 1935 to the CDIS 1910. The contents of the message may be a subset of the items in the CDIS 1910. The message 2430 contains 1) geo-locations of HeNB networks; 2) transmission power classes; 3) identification addresses of HeNB networks; 4) radio technology used in the HeNB network; 5) operator information.

CDIS Registration Response 2435: This is the message sent from CDIS 1910 to CM 1935, as a response to the "CDIS Registration Request" message 2430. It informs the CM 1935 whether the registration of a HeNB network is successful or not.

TVWS database Inquiry 2440: This is the message that may be sent from the CM 1935 to the TVWS database 1905. It may acquire the usage information of TVWS channels from primary users in the coverage area of a certain network. The contents of this message may include 1) HeNB location and the HeNB network coverage area; 2) TVWS channels of interest.

TVWS database Response 2445: This is the message that may be sent from the TVWS database 1905 to the CM 1935, as a response to the "TVWS Database Inquiry" message 2440. The contents of this message may be a list of primary user networks which are located near the location indicated in the "TVWS Database Inquiry" message 2440. The detailed information of these primary user networks may also be provided, e.g., the location, occupied TVWS channels, occupation duration, transmission power level and antenna height, etc.

Network Update Procedure

Figure 25:
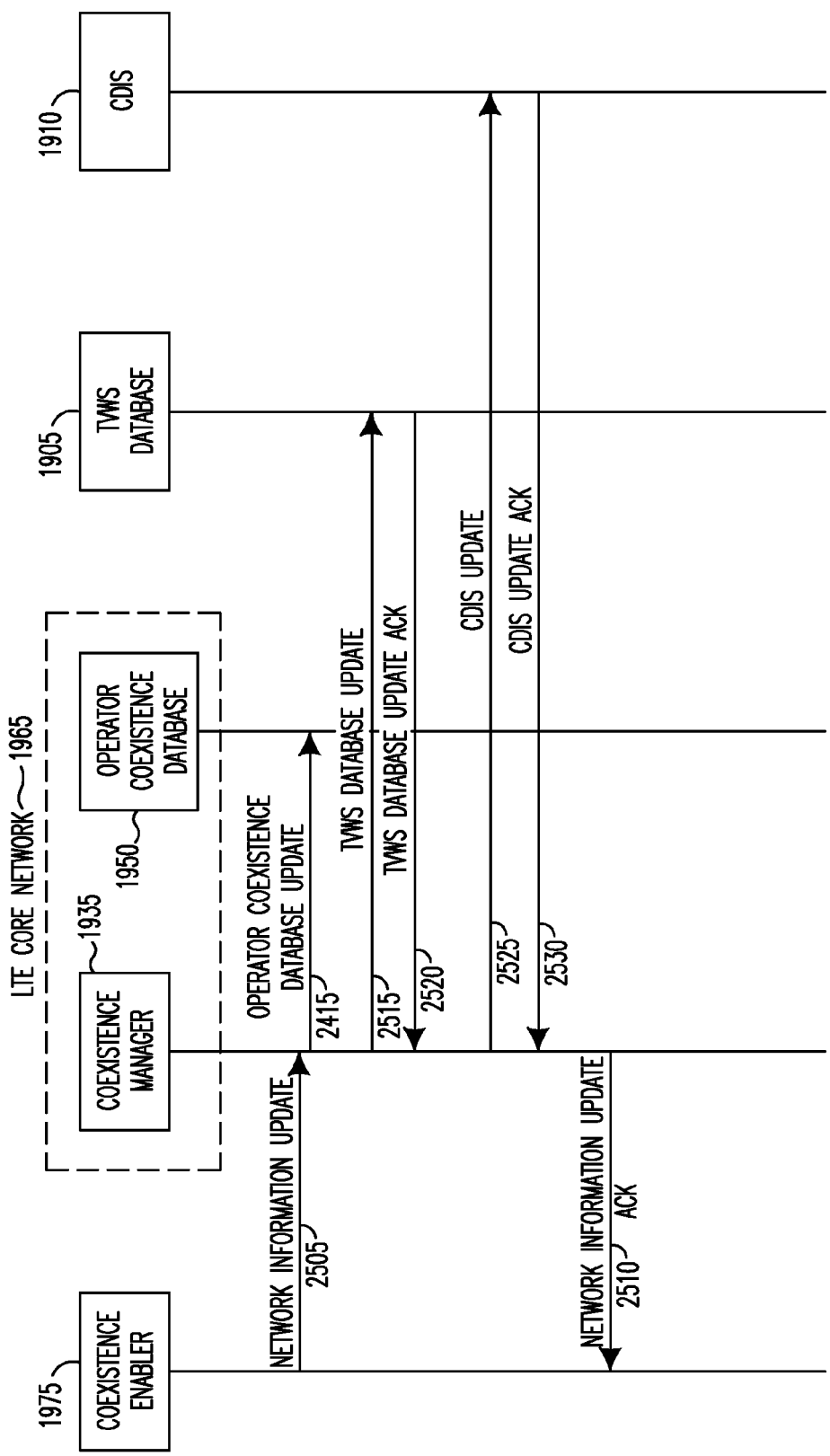
FIG. 25 shows an exemplary network update procedure.

In case a HeNB network has any updates, the CE 1975 may inform the CM 1935. Correspondingly, the CM 1935 may update the operator coexistence database. If needed, it may also update the TVWS database 1905 and the CDIS database 1910. The exemplary call flows of the network update procedure are shown in FIG. 25, with the contents of the messages described below.

Network Information Update 2505: This is the message sent from CE 1975 to CM 1935. It may inform the CM 1935 about the HeNB network information update 2505. The contents of this message are a subset of the item in the operator coexistence database 1950, which may include 1) network administrator contact information update; 2) network central controller (e.g. access point, HeNB) location update; 3) network devices information update; 4) network QoS requirement update, etc.

Network Information Update ACK 2510: This may be the message sent from CM 1935 to CE 1975, as an acknowledgement of the "Network Information Update" message.

TVWS database Update 2515: This may be the message sent from CM 1935 to TVWS database 1905. It modifies the TVWS database 1905 about the updates on TVBDs. It may include the updates of the geo-location of its associated HeNB network, Tx power class, etc. This may be needed in the event of a fast channel switch. i.e the HeNB may want to change channels before receiving CM information. The CE could be able to simply inform the CM of its decision.

TVWS database Update ACK 2520: This may be the message sent from TVWS Database 1905 to CM 1935, as an acknowledgement of the "TVWS Database Update" message 2515.

CDIS Update 2525: This is the message sent from the CM 1935 to the CDIS 1910. It may update the CDIS 1910 about the HeNB network change, e.g. updated geo-location of the HeNB network, new Tx power of its central controller (e.g. access point, HeNB), etc.

CDIS Update ACK 2530: This is the message sent from CDIS 1910 to CM 1935, as an acknowledgement of the "CDIS Update" message 2530.

Spectrum Request Procedure

In case a HeNB network has a new spectrum request, the CE 1975 sends a spectrum request message to the CM 1935. The CM 1935 may check the downloaded TVWS database 1905, the operator coexistence database and its neighbor CM 1935 to acquire the sensing and usage data based on the inter-dependency mapping of the HeNB. The CM 1935 may then process this information and provide back to the CE 1975 on behalf of the HeNB, the channel usage information which should include a list of available channels for the HeNB. This list of available channels may be ranked according to certain criteria. Additional information may be provided as part of the list.

The information about the channel type (Sublicensed, Available, PU assigned) should also be provided. The HeNB selects one from this available channel list, based on the local radio environment and other factors. The CE 1975 may notify this spectrum allocation decision to the CM 1935, which subsequently updates its coexistence database. In case of the co-channel sharing, i.e., the HeNB may use the same channel as its neighbor HeNB, the CM 1935 may inform the corresponding neighbor HeNB.

Figure 26:
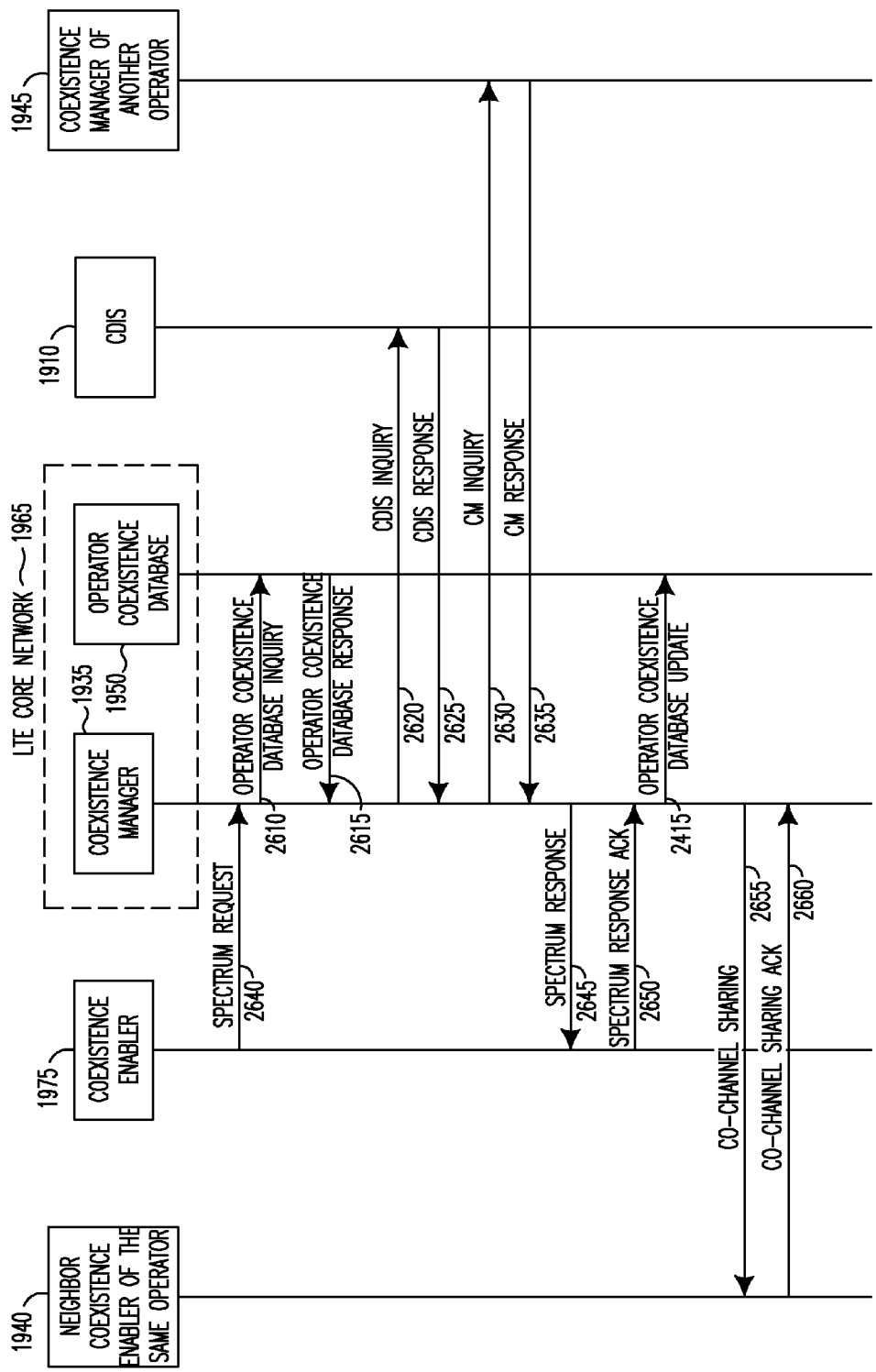
FIG. 26 shows an exemplary spectrum request procedure for information service.

The exemplary call flows of the spectrum request procedure for information service are shown in FIG. 26, with the contents of the messages described below.

Operator Coexistence Database Inquiry 2610: This message may be sent from CM 1935 to operator coexistence database 1950. It may acquire the usage information of TVWS channels from secondary users within the operator. The contents of this message may include a) geo-location of inquiring HeNB network and the network coverage area; b) TVWS channels of interest.

Operator Coexistence Database Response 2615: This message may be sent from operator coexistence database 1950 to CM 1935, as a response to the "Operator Coexistence Database Inquiry" message 2610. This message may include the information on the networks whose coverage area overlaps the coverage area of the HeNB network in the "Operator Coexistence Database Inquiry" message 2610, and which are operating on TVWS channels of interest. The message 2615 provides the network information and TVWS usage information, which may include 1) Tx power class and interference level of the TVWS channels of interest; 2) the identification address of the network; 3) geo-location of the network, etc.

CDIS Inquiry 2620: This message may be sent from CM 1935 to CDIS 1910. It may acquire the neighborhood network information at certain location. The contents of this message may include 1) location and coverage area of interest; 2) TVWS channels of interest; 3) network operator; 4) interference level, etc.

CDIS Response 2625: The message may be sent from CDIS 1910 to CM 1935, as a response to the "CDIS 1910 Inquiry" message 2620. This message 2625 may include the information regarding networks i) whose coverage areas overlap the coverage area of the inquiring HeNB network, ii) which are operating on TVWS channels of interest, and iii) whose operator is different from that of the inquiring HeNB network. The contents of this message may include 1) list of neighbors of the inquiring HeNB network; 2) each neighbor network information (e.g., geo-location, Tx power class, identification address); 3) each neighbor network operator information.

CM Inquiry 2630: The message may be sent from a CM 1935 to its neighbor CM 1945. It may acquire the TVWS channel usage information within the networks associated with the neighbor CM 1945. The contents of this message may include 1) location and coverage area of interest; 2) TVWS channels of interest; 3) network information; 4) tolerant interference level, etc.

CM Response 2635: The message may be sent from the neighbor CM 1945 to the CM 1935, as a response to the "CM Inquiry" message 2630. This message includes the information on the networks i) whose coverage areas overlap the coverage area of the inquiring HeNB network, ii) which is operating on TVWS channels of interest, and iii) whose operator is different from that of the inquiring HeNB network. The contents of this message 2635 may include 1) geo-location and coverage area of the network; 2) transmission power level operated in the TVWS channels of interest; 3) interference level of the TVWS channels of interest; 4) usage time of the TVWS channels of interest, etc.

Spectrum Request 2640: The message may be sent from CE 1975 to CM 1935. It may acquire available TVWS channels at the location of the network. The contents of this message may include 1) TVWS channels of interest; 2) bandwidth requirement; 3) duration of the TVWS channels; 4) HeNB cell ID; or 5) network contact information.

Spectrum Response 2645: The message may be sent from CM 1935 to CE 1975, as a response to the "Spectrum Request" message 2640. This message may contain the channel usage information which includes the information of the list of sublicensed/available/PU assigned channels for a certain network. The contents of the message may include 1) TVWS channels allocated; 2) duration of the channel usage; 3) some detailed TVWS usage information, e.g. the transmission power, antenna height, etc.

Spectrum Response ACK 2650: The message may be sent from CE 1975 to CM 1935, as a response to the "Spectrum Response" message 2645. This message may include the assigned channel information for a certain network. The contents of the message may include: 1) TVWS channels used; 2) Duration of the TVWS channels: 3) some detailed TVWS usage information, e.g., the transmission power, antenna height, ranked channel list, etc.

Co-channel Sharing 2655: The message may be sent from CM 1935 to a neighbor CE 1940. It may inform the neighbor CE 1940 that its neighbor network is using the same channel as it. The message may include the information on the interfering network. The contents of this message may include 1) Geo-location and coverage area of the network; 2) transmission power level operated in the TVWS channel; 3) interference level of the TVWS channel; 4) usage time of the TVWS channel; 5) QoS requirements.

Co-channel Sharing ACK 2660: The message may be sent from the neighbor CE 1940 to CM 1935, as an acknowledgement of the "Co-channel Sharing" message 2655.

Figure 27:
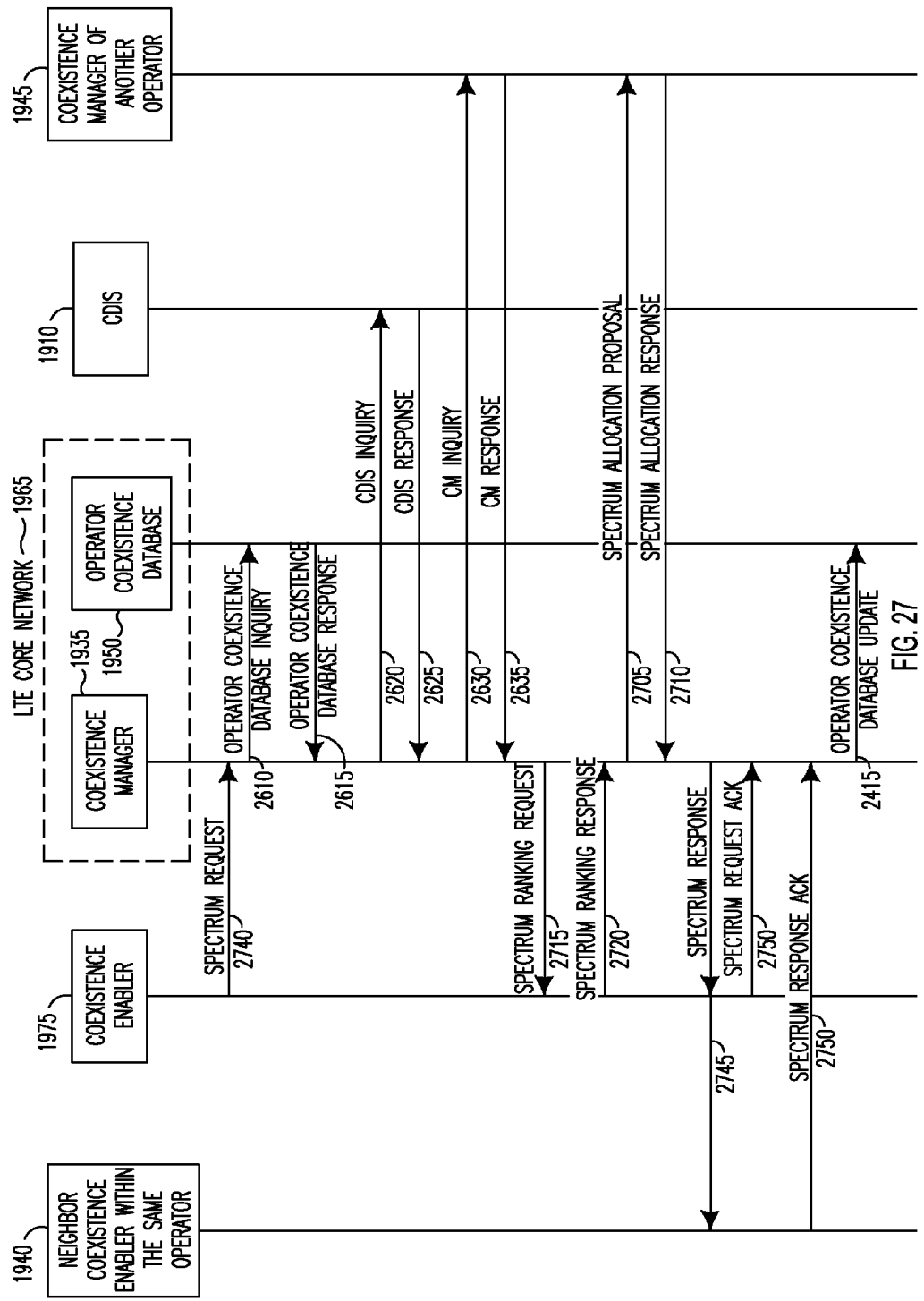
FIG. 27 shows exemplary spectrum request procedure for management service.

The exemplary call flows of the spectrum request procedure for the management service are shown in FIG. 27. Comparing with FIG. 26, there are several more messages for the management service.

Spectrum Allocation Proposal 2705: The message may be sent from a CM 1935 to its neighbor CM 1945. The content of this message may be a spectrum allocation usage proposed by the CM 1935 of TVWS channels for certain duration. It may acquire agreement from its neighbor CM 1945. The contents may include: 1) network ID (or HeNB network ID); 2) HeNB network: HeNB's Tx power class, antenna height and location; 3) TVWS channels to be occupied by the HeNB network; 4) Duration to be occupied by the HeNB network; 5) Negotiation method specific information such as bidding process information.

Spectrum Allocation Proposal Response 2710: The message may be sent from the neighbor CM 1945 to the CM 1935, as a response to the "Spectrum Allocation Proposal" message 2705. This message is to reply the CM 1935 which proposed the TVWS usages, whether or not the spectrum allocation proposal is approved. In case the spectrum allocation proposal is disapproved, the suggested modifications are contained in this message as well and also may contain negotiation method specific information.

Spectrum Ranking Request 2715: The message may be sent from CM 1935 to CE 1975. The contents of this message may include 1) a list of available TVWS channels at certain location; 2) some restrictions of using these channels, etc. This message is aimed to get the priorities of using these available channels. Such rank may be based on the local radio environment.

Spectrum Ranking Response 2720: The message may be sent from CE 1975 to CM 1935. The contents of this message may include 1) A list of ranked available TVWS channels; 2) Some details of using these channels.

Furthermore, the contents of the following messages for the management service are different from those for the information service.

Spectrum Request 2740: The message may be sent from CE 1975 to CM 1935. It may acquire available TVWS channels at the location of the network. The contents of this message may include 1). TVWS channels of interest; 2). bandwidth requirement; 3) duration of the TVWS channels, etc.

Spectrum Response 2745: The message may be sent from CM 1935 to the CE 1975 and/or a neighbor CE 1940, as a response to the "Spectrum Request" message 2740. This message includes the assigned channel information for a certain network. The contents of the message include: 1). TVWS channels assigned to the network; 2). duration of the TVWS channels; 3). transmission power of the access point or HeNB, etc.

Spectrum Response ACK 2750: The message may be sent from the CE 1975 to the CM 1935 and/or from the neighbor CE 1940 to the CE 1935, as an acknowledgement of the "Spectrum Response" message 2745.

Spectrum Adjustment Procedure

If a HeNB network already occupies a TVWS channel, but it detects the channel quality is low, the CE 1975 may send a spectrum adjustment message to the CM 1935. Like the spectrum request procedure, the CM 1935 may check the downloaded TVWS database 1905, the operator coexistence database and its neighbor CM 1945 to acquire the sensing and usage data based on the inter-dependency mapping of the HeNB. The CM 1935 may then process this information and provide back to the CE 1975 on behalf of the HeNB 1970, the channel usage information which should include a list of available channels for the HeNB 1970. This list of available channels may be ranked according to certain criteria. Additional information may be provided as part of the list. The information about the channel type (Sublicensed, Available, PU assigned) should also be provided. The HeNB selects one from this available channel list, based on the local radio environment and other factors. The CE 1975 notifies this spectrum allocation decision to the CM 1935, which subsequently updates its coexistence database. In case of the co-channel sharing, i.e., the HeNB uses the same channel as its neighbor HeNB, the CM 1935 informs the corresponding neighbor HeNB.

Figure 28:
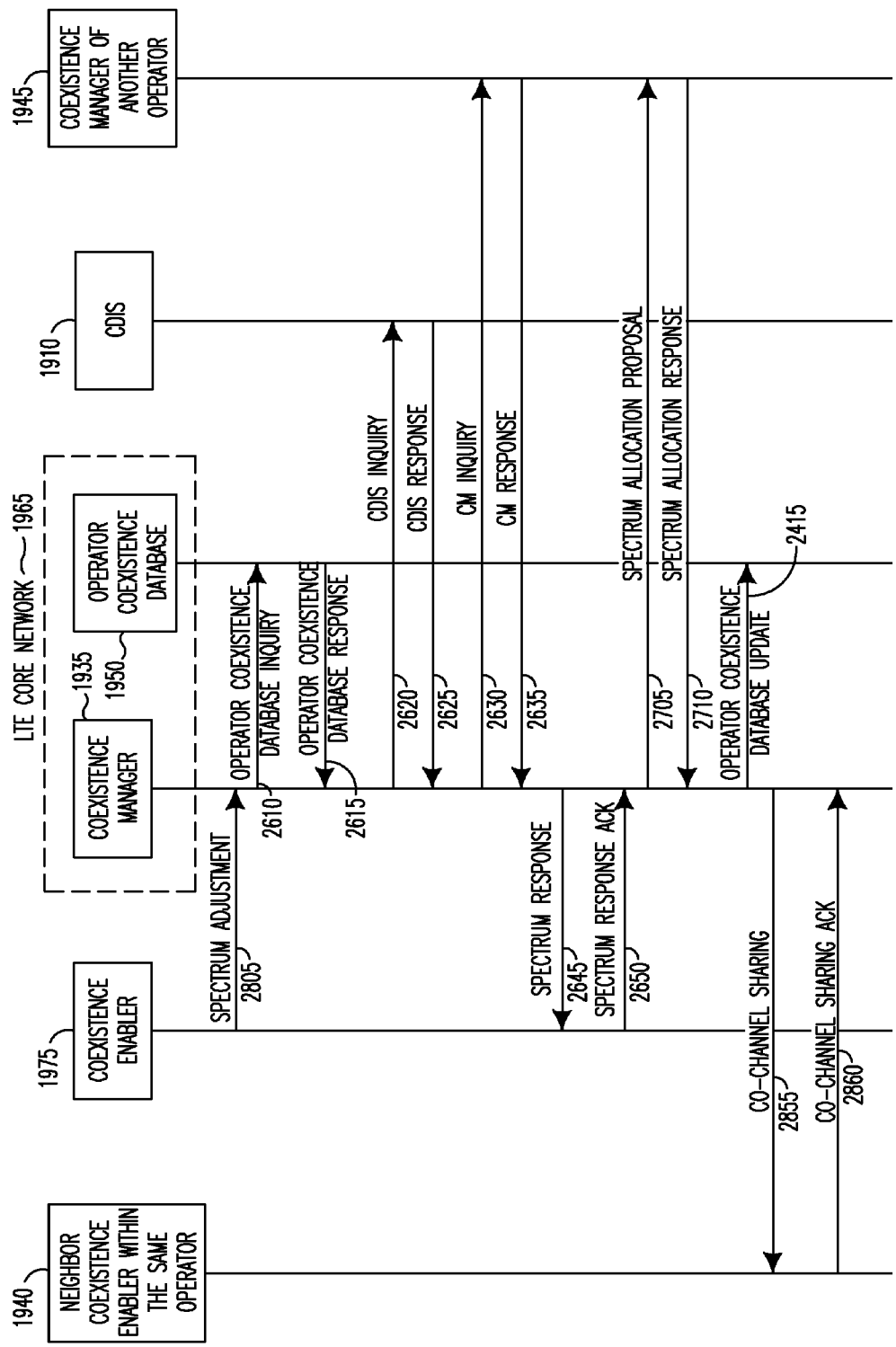
FIG. 28 shows exemplary spectrum adjustment procedure for information service.

The exemplary call flows of the spectrum request procedure for information service are shown in FIG. 28. Comparing FIG. 27 with FIG. 25, a difference lies in the spectrum adjustment message and the contents of the co-channel sharing message.

Spectrum Adjustment 2805: The message may be sent from CE 1975 to CM 1935. It may inform the CM 1935 that the current occupied channel has low quality, and the HeNB tries to acquire available TVWS channels (beyond the current channel) at the location of the network. The contents of this message may include 1) the currently occupied TVWS channel and its quality level; 2) TVWS channels of interest; 3) bandwidth requirement; 4) duration of the TVWS channels, etc.

Co-channel Sharing 2855: The message may be sent from CM 1935 to a neighbor CE 1940. It may inform 1). the neighbor CE 1940 that its neighbor network is using the same channel as it; 2). The neighbor CE 1940 that its neighbor network was using the same channel as it, but is using a different channel now. The message includes the information on the interfering network. The contents of this message may include 1). Geo-location and coverage area of the network; 2) Tx power level operated in the TVWS channel; 3) interference level of the TVWS channel; 4) usage time of the TVWS channel; 5) coexistence information, like the RAT of the co-shared secondary network; 6) sharing mode (e.g., use channel when available or use channel for a maximum of certain percentage).

Co-channel Sharing ACK 2860: The message may be sent from the neighbor CE 1940 to CM 1935, as an acknowledgement of the "Co-channel Sharing" message 2855.

The call flows of the spectrum adjustment procedure for management service are similar to FIGS. 26 and 27. A difference is to replace the "Spectrum Request" message by the "Spectrum Adjustment" message.

Policy-Related Messages on OAM Type 1 Interface

The OAM Interface type 1 is used to transfer the operator policies from HeMS to-HeNBs. Here, the operator policy engine 2216 may send certain operator policies to the HeNB policy engine 2250, as illustrated by 2202 in FIG. 22.

The operator policies transfer could be initiated by HeMS (or its operator policy engine) 2205. This could occur periodically or be event-triggered. For example, the HeMS 2205 could synchronize with all its connected HeNB 2210 about the operator policies once every day or in case of there is any change on the HeMS's operator policies. The HeMS-initiated policy transfer is usually in the form multicast/broadcast, i.e., the policies may be multicast to all the connected HeNB's. The HeMS-initiated policy transfer could be implemented by the HeMS 2205 sending a TR-069 "SetParameterValues" message. Once the HeNB 2210 receives this message, it may send a TR-069 "SetParameterResponse" message to HeMS 2205. Another pair of TR-069 messages "SetParameterAttributes" and "SetParameterAttributesResponse" could also be used. An alternative way for the operator policies transfer is through file download. The operator policy engine saves all the operator policies as a single file, and uses the TR-069 "Download" message to transmit. The HeNB 2210 replies with a TR-069 "DownloadResponse" message.

The operator policies transfer could also be initiated by HeNB 2210. One exemplary condition is that a HeNB 2210 registers to the HeMS 2205, and has no information about the operator policies. The HeNB-initiated policy transfer could be implemented by the HeNB 2210 sending a TR-069 "InformationRequest" message to HeMS 2205. One parameter of this message is the operator policies. The HeMS 2205 sends a TR-069 "InformationResponse" message to HeNB 2210, by including all the operator policies in the message. An alternative way is through file download. The HeNB 2210 sends a TR-069 "TransferComplete" message to the HeMS 2205, asking for the file of operator policies. The HeMS 2205 could send a TR-069 "Transfer CompleteResponse" message with the operator policies file attached.

CE-CM Messages on S1 Interface

An ongoing assumption is to connect the CE with the CM through the OAM type 1 interface terminated to the HeMS. However, regular eNB may not benefit from a standard OAM interface and may have to rely on the S1 interface to communicate with the CM function. The usual connection between HeNB and LTE core network (specifically, the MME (Mobility Management Entity) or the S-GW (Serving GateWay)) may be through S1 interface. The S1 interface includes S1-U interface for user plane and S1-MME interface for control plane as reflected in FIG. 29. The S1-MME interface may pass the HeNB GW (GateWay).

Figure 29:
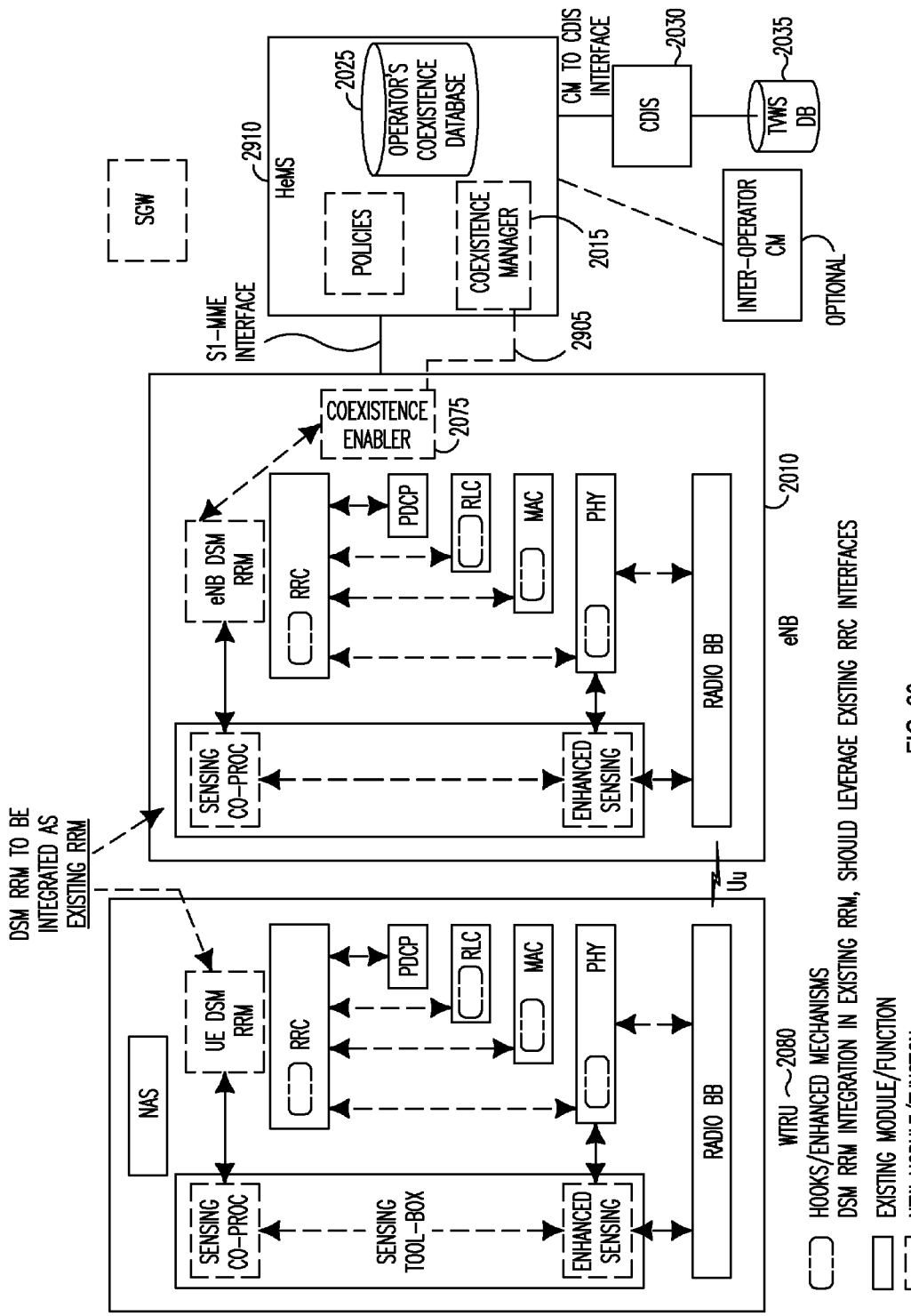
FIG. 29 shows an exemplary alternative centralized coexistence architecture in an LTE system.

Consider mapping each of the CE-CM messages defined above to the S1-MME interface messages. The corresponding architecture, similar to that shown in FIG. 20, and using similar numbering, is shown in FIG. 29.

The CE-CM messages 2905 may include CE Registration Requests and Responses.

CE Registration Request/Response: The CE Registration Request message may contain the information for the registration of TVBDs in the HeNB 2010 to the CM 2015. The CE Registration Response message is a response to the CE Registration Request message.

These two high level messages are related to the following S1 messages:

i). S1 setup procedure: to exchange application level data needed for the eNB and MME to interoperate correctly on the S1 interface. The procedure uses non-UE associated signaling. The messages include: a). S1 SETUP REQUEST: The HeNB sends this message to the MME, including the appropriate data. b). S1 SETUP RESPONSE: Upon receiving the S1 SETUP REQUEST message, the MME sends this message to the HeNB, including the appropriate data. This message implies a successful S1 setup procedure. c). S1 SETUP FAILURE: Upon receiving the S1 SETUP REQUEST message, the MME sends this message to the HeNB. This message implies an unsuccessful S1 setup procedure.

ii). Initial context setup procedure: to establish the necessary overall initial UE context including E-RAB context, security key, handover restriction list, UE radio capability and UE security capabilities, etc. The procedure uses UE-associated signaling. The messages may include: a). INITIAL CONTEXT SETUP REQUEST: The MME sends this message to the HeNB, It may contain the trace activation IE; the handover restriction list IE; the UE radio capability IE; the subscriber profile ID for RAT/frequency priority IE; the CS fallback indicator IE; the SRVCC operation possible IE; the CSG membership status IE; the registered LAI IE, the GUMMEI IE; the MME UE S1AP ID 2 IE, b). INITIAL CONTEXT SETUP RESPONSE: Upon receiving the INITIAL CONTEXT SETUP REQUEST message, the HeNB executes the requested operations, and sends this message to MME. This message implies all the required operations are successful. c). INITIAL CONTEXT SETUP FAILURE: Upon receiving the INITIAL CONTEXT SETUP REQUEST message, the HeNB may send this message to the MME, implying the required operations are unsuccessful.

iii). E-RAB setup procedure: to assign resources on Uu and S1 for one or several E-RABs and to setup corresponding data radio bearers for a given UE. The procedure may use UE-associated signaling. The messages may include: a). E-RAB SETUP REQUEST: The MME sends this message to the HeNB. The message contains the information required by the HeNB to build the E-RAB configuration consisting of at least one E-RAB and, for each E-RAB to setup, includes an E-RAB to be Setup Item IE. b). E-RAB SETUP RESPONSE: Upon receiving the E-RAB SETUP REQUEST message, the HeNB shall execute the requested E-RAB configuration, and respond with this message.

iv). UE capability information indication procedure: the HeNB controlling a UE-associated logical S1-connection may initiate the procedure by sending a UE CAPABILITY INFO INDICATION message to the MME including the UE capability information.

v). eNB direct information transfer procedure: to transfer RAN information from the HeNB to the MME in unacknowledged mode. This procedure uses non-UE associated signaling. The corresponding message is named ENB DIRECT INFORMATION TRANSFER.

vi). eNB configuration transfer procedure: to transfer RAN configuration information from the HeNB to the MME in unacknowledged mode. This procedure uses non-UE associated signaling. The corresponding message may be named ENB CONFIGURATION TRANSFER.

2. Network Information Update/Update ACK: The Network Information Update message may contain the HeNB network information update. The Network information update ACK message may be an ACK message. These two high level messages may be related to the following S1 messages:

i). UE capability information indication procedure: the HeNB controlling a UE-associated logical S1-connection initiates the procedure by sending a UE CAPABILITY INFO INDICATION message to the MME including the UE capability information.

ii). eNB configuration update procedure: to update application level configuration data needed for the HeNB and MME to interoperate correctly on the S1 interface. This procedure does not affect existing UE-related contexts. The messages may include: a). ENB CONFIGURATION UPDATE: The HeNB sends this message to MME, including an appropriated set of update configuration data that it has just taken into operational use. b). ENB CONFIGURATION UPDATE ACKNOWLEDGE: Upon receiving the ENB CONFIGURATION UPDATE message, the MME replies by this message to acknowledge that it successfully updated the configuration data. c). ENB CONFIGURATION UPDATE FAILURE: If the MME cannot accept the update, it shall respond with an ENB CONFIGURATION UPDATE FAILURE message and appropriated cause value.

3. Spectrum Request: This message is for the HeNB to request additional spectrum from the MME. This high level message may be related to the following S1 messages:

i). If the spectrum request results from the cell traffic load, then this high level message is related to the cell traffic trace procedure: This procedure is to send the allocated trace recording session reference and the trace reference to the MME. The procedure uses UE-associated signaling. The HeNB sends the CELL TRAFFIC TRACE message to the MME.

ii). If the spectrum request results from other reasons, e.g., primary user detection, interference level increase, etc, then this high level message is related to the S1-U message.

4. Spectrum Ranking Request/Response: These two messages are used for the HeNB to provide the priorities of the available channels to the MME, for its spectrum allocation decision making. These two high level messages may be related to the following S1 messages.

i). MME direct information transfer procedure: to transfer RAN information from the MME to the HeNB in unacknowledged mode. The MME sends the MME DIRECT INFORMATION TRANSFER message to the HeNB.

ii). eNB direct information transfer procedure: to transfer RAN information from the HeNB to the MME in unacknowledged mode. The HeNB sends the ENB DIRECT INFORMATION TRANSFER message to the MME.

5. Spectrum Response/Response ACK: The Spectrum Response Message contains the MME commands on the channel usage. The Spectrum Response ACK message is an ACK message. These two messages may be related to the following S1 messages.

i). MME configuration transfer procedure: to transfer RAN configuration information from the MME to the HeNB in unacknowledged mode. The MME sends the MME CONFIGURATION TRANSFER message to the HeNB.

ii). MME configuration update procedure: to update application level configuration data needed for the HeNB and the MME to interoperate correctly on the S1 interface. This procedure does not affect existing UE-related contexts. The messages include: a). MME CONFIGURATION UPDATE: The MME sends this message to HeNB, including the appropriate updated configuration data to the HeNB. b). MME CONFIGURATION UPDATE ACKNOWLEDGE: Upon receiving the MME CONFIGURATION UPDATE message, the HeNB replies by this message to acknowledge that it successfully updated the configuration data. c). MME CONFIGURATION UPDATE FAILURE: If the HeNB cannot accept the update, it shall respond with an MME CONFIGURATION UPDATE FAILURE message and appropriated cause value.

iii). E-RAB modification procedure: to enable modifications of already established E-RABs for a given UE. This procedure uses UE-associated signaling. The messages include: a). E-RAB MODIFICATION REQUEST: MME sends this message to HeNB. The message may contain the information required by the HeNB to modify one or several E-RABs of the existing E-RAB configuration. b). E-RAB MODIFICATION RESPONSE: Upon receiving the E-RAB MODIFICATION REQUEST message, the HeNB shall execute the modification of the requested E-RAB configuration, and reply with the E-RAB MODIFICATION RESPONSE message.

iv). E-RAB release procedure: to enable the release of already established E-RABs for a given UE. This procedure uses UE-associated signaling. The messages include: a). E-RAB RELEASE COMMAND: The MME sends this message to the HeNB. It contains the information required by the HeNB to release at least one E-RAB in the E-RAB To Be Released list IE. b). E-RAB RELEASE RESPONSE: Upon receiving the E-RAB RELEASE COMMAND, the HeNB shall respond with this message, showing the result for all the E-RABs to be released.

CM-CM Interface

There are several inter-CM messages that may be transmitted. According to the overall architecture (cf. FIG. 20), each LTE network operator may have its own CM residing on the LTE core network. However, the CM of the operators other than the LTE networks could reside at different places. For example, the CM for a WLAN network could be located at AP. Hence, the connections between CMs could be of different types. Messages exchanged between CMs could be categorized to 2 types: (1) Spectrum information inquiry messages: This type of message involves the transmission of spectrum usage information. It facilitates the spectrum allocation decision making. The CM inquiry and CM Response messages belong to this type. (2) Spectrum solution messages: This type of messages involves the negotiation process between the CMs on the final spectrum allocation solution. The Spectrum Allocation Proposal and the Spectrum Allocation Response messages belong to this type.

Although there may be another type of message between CMs, this type of message is related to the link setup or dismissal between CMs. As discussed, a CM may get its neighbor CM contact information from the CDIS. Then, it tries to set up the link with its neighbor CM before they exchange spectrum usage information and spectrum solution messages. Note that two CMs may set up the link only if their serving networks have overlaps.

The link setup process could be done via the "CM Registration Request" message and the "CM Registration Response" message. The initiating CM sends the "CM Registration Request" message, trying to set up the connection with its neighbor CM. This message contains the identification information and the operation information of its serving network(s) which have coverage overlaps with the network(s) served by the neighbor CM. Such information is contained in the operator's coexistence database. Upon receiving this message, the neighbor CM may reply with the "CM Registration Response" message, containing the identification information and the operation information of its serving network(s) which have coverage overlaps with the network(s) served by the initiating CM. After the message exchange, the CMs could save the relevant information in their respective operator's coexistence database. The authentication and encryption operations are necessary before or during the message exchange. For example, the Public Key Infrastructure (PKI) could be applied for the security purpose. The link dismissal process could be done via the "CM Deregistration Request" message and the "CM Deregistration Response" message.

The spectrum information inquiry messages may include the "CM Inquiry" message and the "CM Response" message. The initiating CM sends the CM Inquiry messages in order to obtain the TVWS channel usage information at a specific location. This facilitates its serving HeNB network operation on TVWS channels. Hence, the contents of this message include:

(1) The location and coverage area of interest: This is based on the coverage area of the HeNB network that makes requests for TVWS channel operations.

(2) The TVWS channels of interest: This is the list of potential channels that the HeNB network could or want to use. It may depend on the device capability in the HeNB network.

(3) The network information: This gives some specifications of the HeNB network, mainly, the radio access technologies of the HeNB network. For example, the HeNB network is using LTE technologies. This information may be useful in the spectrum solution negotiation process, especially for the co-channel sharing.

(4) The tolerant interference level: This gives the information about the interference level the HeNB network is able to tolerate. It may be useful in the spectrum solution negotiation process, especially for the co-channel sharing.

Upon receiving the CM Inquiry message, the neighbor CM checks its operator's coexistence database to see if there are any serving HeNB networks which have the geo-location and TVWS channels conflicts with the requesting HeNB network. If not, it just sends the CM Response message, without any contents. Otherwise, the CM Response message could provide some detailed information of each of the conflicting HeNB networks. This may include:

(1) The location and coverage area: This is based on the coverage area of the conflicting HeNB network which operates on the TVWS channels of interest.

(2) The TVWS channels: This is the list of TVWS channels that the conflicting HeNB network is using.

(3) The TVWS usage information: This is some detailed information on the TVWS channel usage. It includes the duration of the TVWS channel occupation, the access point antenna height, the access point transmit power level, etc. The QoS conditions of the applications run on the TVWS channels could also be included.

(4) The network information: This gives some specifications of the conflicting HeNB network, mainly, the radio access technologies of the HeNB network. This information may be useful in the spectrum solution negotiation process, especially for the co-channel sharing.

(5) The tolerant interference level: This gives the information about the interference level the conflicting HeNB network is able to tolerate. It may be useful in the spectrum solution negotiation process, especially for the co-channel sharing.

(6) The Channel tolerant information: This provides the information about: a). whether the TVWS channel resources currently occupied by the conflicting HeNB network could be released, b). the way of the channel resources could be released and c). the compensation for the channel resource release. The TVWS channel resource release could be in the form of fully evacuating the channel or sacrificing partial channel resource. The former corresponds to the exclusive channel usage, while the latter corresponds to the co-channel sharing. The co-channel sharing mechanisms include FDM-based, TDM-based, or interference management-based. For the FDM-based co-channel sharing case, the conflicting HeNB network could specify which sub-channels could be released. For the TDM-based co-channel sharing case, the conflicting HeNB network could specify which time-slots could be released. For the interference management based co-channel sharing case, the conflicting HeNB network could specify how much its transmission power level could be reduced. The compensation could be the number of tokens for the requesting HeNB network paying to the conflicting HeNB network for its channel resource release.

The spectrum solution messages include the "Spectrum Allocation Proposal" message and the "Spectrum Allocation Response" message. The initiating CM sends the Spectrum Allocation Proposal messages in order to obtain the approval of its neighbor CM for its proposed TVWS channel usage plan. The contents of this message may include:

(1) The HeNB network information: This includes the requesting HeNB network ID and its network access point location.

(2) The TVWS usage plan: This includes the TVWS channel to be used, the duration of the channel usage, the access point antenna height and the access point transmit antenna power, etc.

(3) The channel tolerant information: This provides the information about 3a). whether this is exclusive channel usage or co-channel sharing usage. 3b). For the co-channel sharing usage, the portion of channel resources to be used. For the FDM-based co-channel sharing case, the requesting HeNB network could specify which sub-channels to be used.

For the TDM-based co-channel sharing case, the requesting HeNB network could specify which time-slots to be used. For the interference management based co-channel sharing case, the requesting HeNB network could specify the transmission power level the conflicting HeNB network should be reduced to. 3c). The price for the channel resource release.

The price could be the number of tokens the requesting HeNB network would like to pay to the conflicting HeNB network for its channel resource release. The price also could be the channel resources the requesting HeNB network wants to release to the conflicting HeNB network for the latter's channel resource. This operation is related to the channel exchange process. One purpose of the channel exchange is that in the carrier aggregation applications, the adjacent channels could be more efficient than separated channels, as some guard spectrum could be utilized in the adjacent channel conditions.

Upon receiving the Spectrum Allocation Proposal message, the neighbor CM may decide whether it wants to accept, further negotiate, or reject the spectrum allocation proposal. If it decides to accept or reject the proposal, it could describe this result in the Spectrum Allocation Response message. It may also put the reasons of accepting or rejecting the proposal. For example, if it receives the spectrum allocation proposal which does not have any conflicts with its serving HeNB networks, it may accept the proposal. If it receives the spectrum allocation proposal for certain resources it does not want to release at any cost, then it may reject the proposal.

There are some situations that the neighbor CM wants to further negotiate with the initiating CM. For example, if the initiating HeNB network's bid (price) for the channel resource release is not satisfied, partial of the requested channel resources could not be released, or the proposed transmit power is too low, etc., then the neighbor CM could specify its desired way of channel resource release. In this case, the Spectrum Allocation Response message could have the similar contents as the Spectrum Allocation Proposal message.

The Spectrum Allocation Proposal and the Spectrum Allocation Response messages could be in several rounds, until the final solution is accepted by both CMs.

LTE Coexistence System without Direct Mutual Communication

Architecture of Coexistence System without Direct Mutual Communication

Figure 30:
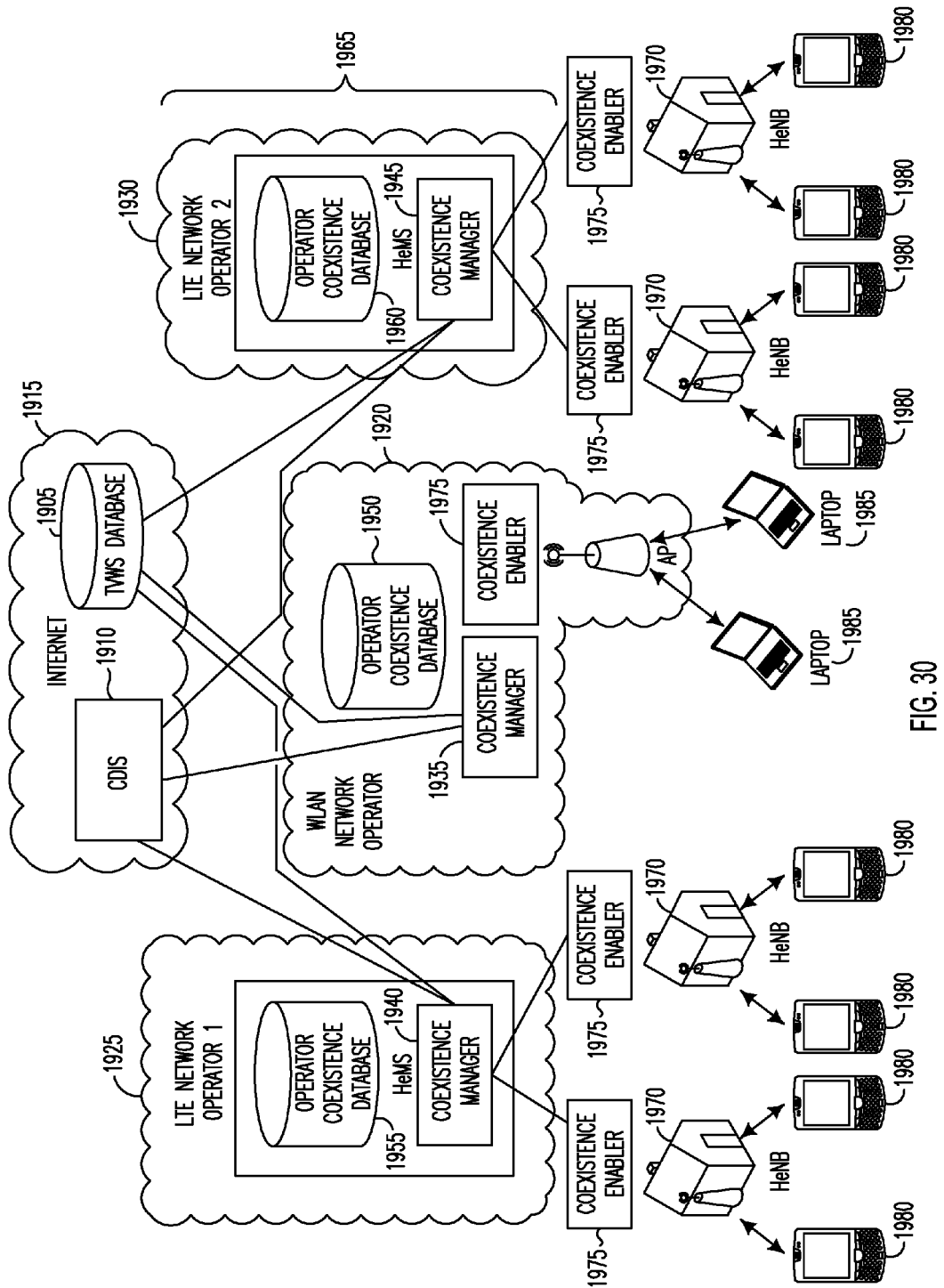
FIG. 30 shows an exemplary deployment of centralized coexistence entity without inter-CM communication.

An exemplary deployment of centralized coexistence mechanism without direct inter-CM communication is shown in FIG. 30. This deployment is similar to FIG. 19, except that the links between CMs 1935, 1940, 1945 no longer exist. Again, in this deployment, the TVWS database 1905 and the CDIS 1910 may be located on the internet. Each LTE network operator may have its own CM and operator coexistence database residing on the core network. Each network, e.g., HeNB 1970 in LTE systems, may have its own CE 1975.

Like the case of LTE coexistence system with direct communication, the operator's coexistence database may contain the TVWS channel usage information of all secondary networks within the network operator. The contents of the operator's coexistence database and the CE functions may be similar to the case of LTE coexistence system without direct communication.

The main functions that CM 1935 hosts may include: maintaining the operator coexistence database, updating CDIS 1910 and the TVWS database 1905 about the networks within the operator, obtaining TVWS usage information from CDIS 1910, providing the current TVWS channel usage information to HeNB networks which could include some initial ranking of the available channels as well as proposing non-conflicting physical cell ID for each channel frequency. (information service only), reserving TVWS channel resource information at CDIS, allocating TVWS resources to the HeNB networks within the operator (management service only), and coordinating the TVWS usage between multiple HeNB networks within the operator (management service only).

In this scenario, the CDIS could function in two different ways: one is called advanced CDIS and the other is called smart CDIS.

The advanced CDIS may provide the TVWS channel usage information to CMs, based on their locations and their channel usage period. The CDIS could be considered as a white board with 3-D tables, (Time, Frequency (or Channel), Location). At a specific location, it reduces to 2-D tables (Time, Channel). The CDIS may partition the time line into small units, and each (time unit, channel) is set as a single resource block. A CM may first check the fullness of resource blocks at a given location. If there is empty resource block, the CM could reserve it, preventing other CMs from using this resource block.

Note that the advanced CDIS deployment implies the "first come first serve" rule: A CM could reserve a TVWS channel resource block if it has not been reserved. When taking the fairness (among CMs) into account, there could be some rules (e.g., FCC rule for FCC certified devices) behind reservation. There could be some limitations on each reservation from a CM, e.g., the number of TVWS channels to be reserved, and the duration of each reservation.

Such limitation may prevent certain HeNB networks from occupying a TVWS channel too long, while other HeNB networks could not access the resource. With the limitation on each channel reservation, a CM needs to reserve a TVWS channel consecutively if it wants to continuously use this channel. A second channel reservation (or called channel renew) may only be allowed at the end of its current channel occupation, so as to guarantee the channel availability to another HeNB network. In other words, another HeNB network could reserve this channel at any time during the occupation period of the first HeNB network.

This limitation may also avoid a HeNB network reserving a channel resource if it does not really need it. This is because the reservation of the current unused channel resource will affect its future channel reservation which is actually useful to HeNB network.

On the other hand, some HeNB networks may reserve more channel resources than other HeNB networks, based on their network situation (e.g., the number of TVBDs in the network, the QoS requirement of the network).

In the advanced CDIS case, the co-channel sharing is achieved by the earlier CMs reserving only a portion of the channel resources, while the later CMs using the remaining portion of the channel resources. Such co-channel sharing is kind of deterministic, as the earlier CM does not use the full channel resource even if there is no later CMs sharing the same channel with it.

There is an alternative smart co-channel sharing approach, which is kind of dynamic. In this approach, a CM may use the full channel resource at the reservation. In case another CM wants to share the channel resource with it, the CM could release partial channel resources.

The co-channel sharing operation is coordinated by the CDIS. In other words, the CDIS functions more than as a database. It functions like a coordinator to resolve the coexistence issues raised by different operators. The smart CDIS makes some channel resource allocation decisions for conflicting CMs. It should be mentioned that such functionality could be implemented by a 3rd party but this combines the 3rd party with the CDIS for simplicity.

In order to coordinate the co-channel sharing between two or more CMs, the smart CDIS may need additional information about the networks served by these CMs, e.g., the number of TVBDs in the HeNB network, the QoS requirement of the HeNB network, etc. This information could be summarized to a single coexistence value. The smart CDIS could make coordination decisions based on CMs' coexistence values.

CM's Operations for Information Service

Figure 31:
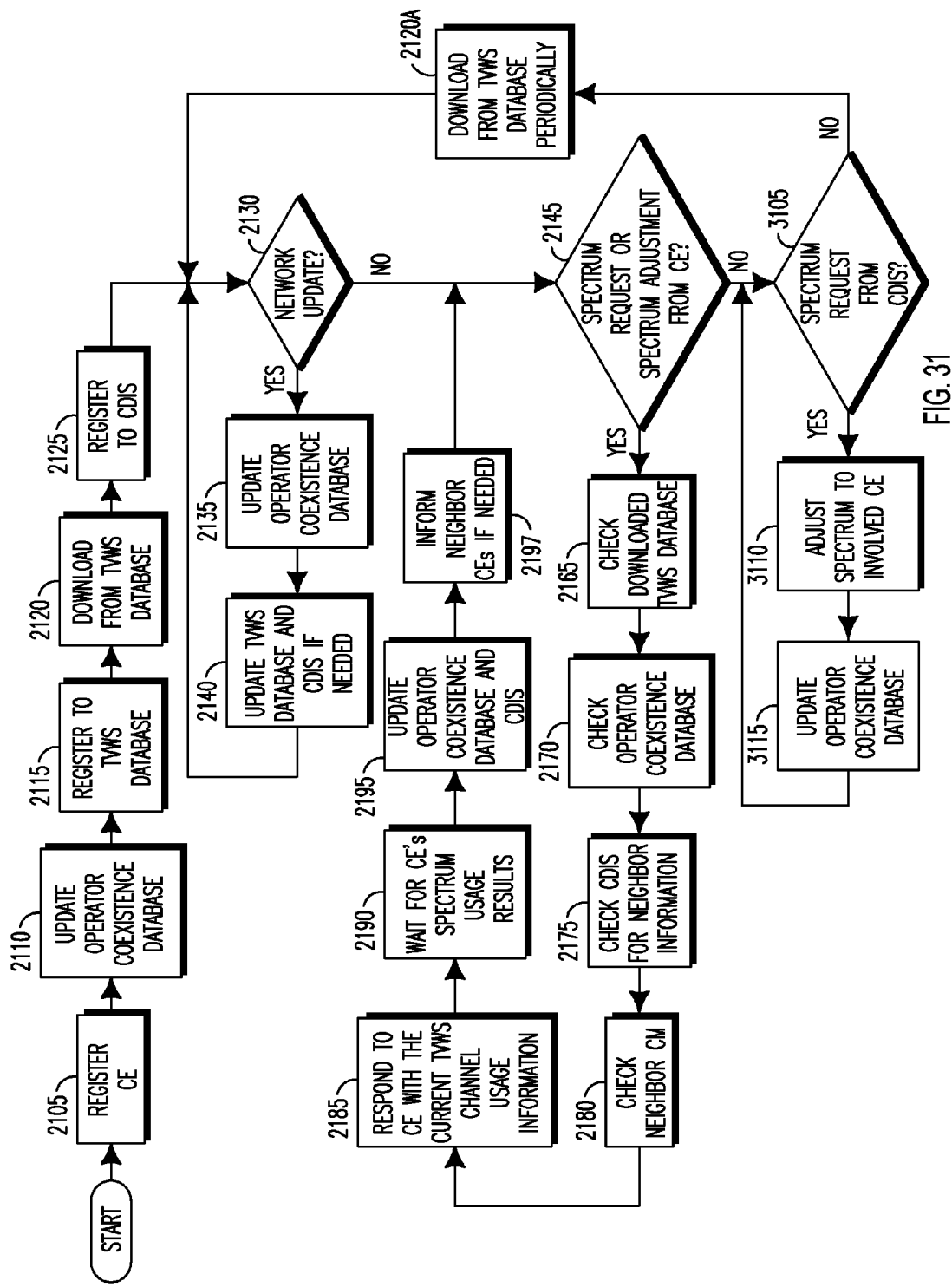
FIG. 31 shows coexistence manager's operations for information service and advanced CDIS.

The operations of a coexistence manager (CM) for the information service and advanced CDIS are shown in FIG. 31. The CM's registration and network update processes are similar to that in FIG. 21, labeled similarly to FIG. 21 and with some steps not explained in detail since they were explained above.

Once the CM receives spectrum request or spectrum adjustment from a HeNB network (via its associated CE) 2145, the CM may, depending on that HeNB network location, check the downloaded TVWS database 1905, the operator coexistence database, and the advanced CDIS (2165, 2170, 2175) to see if there is an available channel at that location. The CM may then provide all the collected TVWS channel usage information to the requesting HeNB network 2185. Some operator-wise policies may be applied in determining the available TVWS channels.

This channel usage information could be provided as a ranked channel list. The CM waits for the spectrum decision from the requesting HeNB network, and updates its operator coexistence database and the advanced CDIS 2195 accordingly. The CM may also inform a neighbor HeNB network (within the same operator) 2197 if the requesting HeNB network uses (or used) the same TVWS channel as the neighbor HeNB network.

If the spectrum request originates from the CDIS, 3105, the spectrum adjustment may be made for the involved CE 3110, and the operator coexistence database is updated 3115.

Coexistence System Procedures

Registration Procedure

The call flows of the registration procedure are similar to FIG. 24. A difference is on the contents of the CDIS registration request message.

CDIS Registration Request: This message may be sent from CM 1935 to CDIS 1910. This message may register all the HeNB networks served by the CM 1935 to the CDIS 1910. The contents of the message may be a subset of the items in the CDIS. The message may contain 1) geo-locations of HeNB networks; 2) transmission power classes; 3) identification addresses of HeNB networks; 4) radio technology used in the HeNB network; 5) operator information, 6). HeNB network device information, etc.

Network Update Procedure

The call flows of the network update procedure are similar to FIG. 25. The only difference lies in the contents of the CDIS Update message.

CDIS Update: This is the message sent from CM 1935 to CDIS 1910. It may update the CDIS 1910 about the HeNB network change, e.g. updated geo-location of the HeNB network, new Tx power of its central controller (e.g. access point, HeNB), etc.

Spectrum Request Procedure

Figure 32:
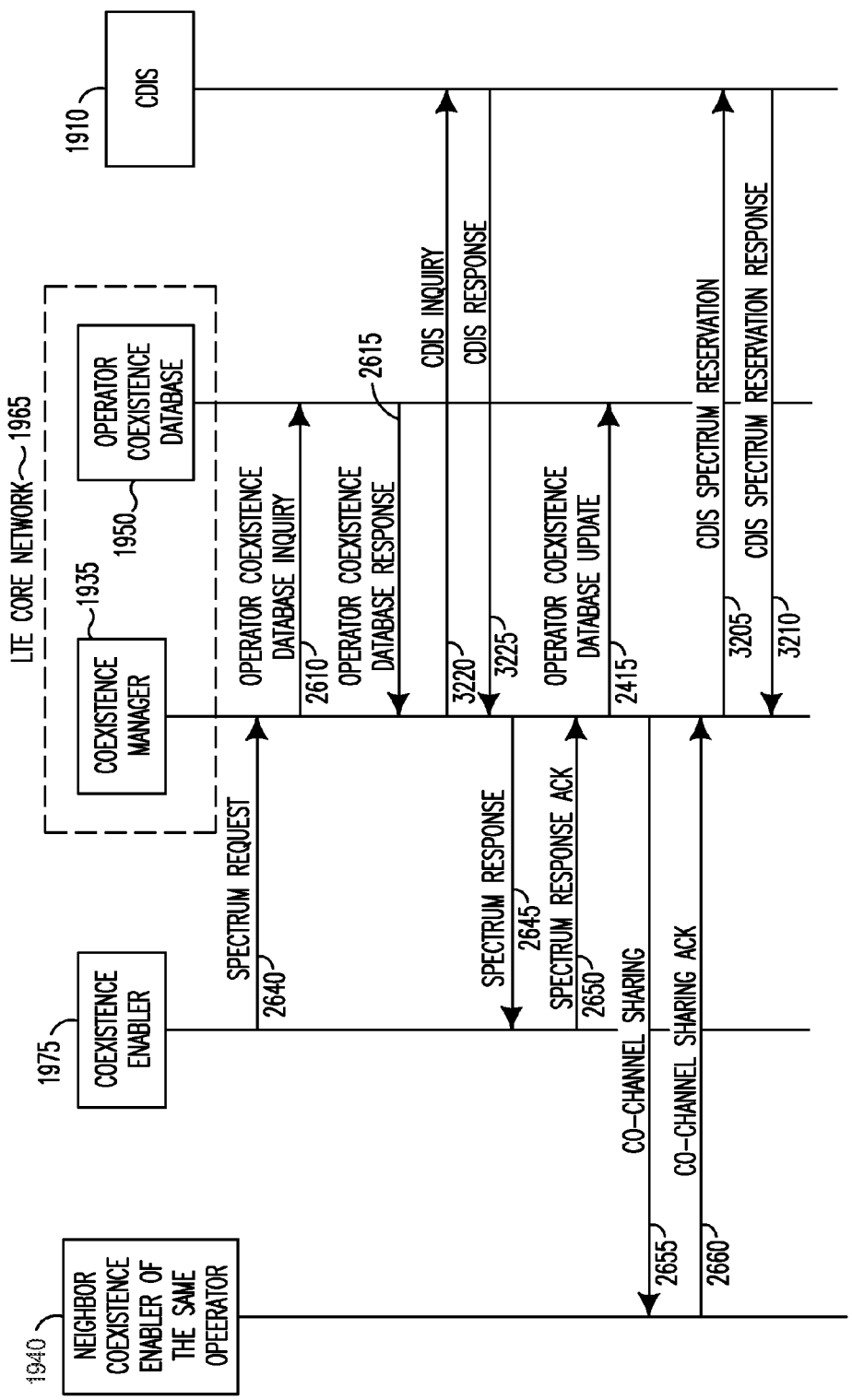
FIG. 32 shows an exemplary spectrum request procedure for information service.

The exemplary call flows of the spectrum request procedure for information service are shown in FIG. 32, with the contents of the messages described below.

CDIS Inquiry 3220: This message may be sent from CM 1935 to CDIS 1910. It may acquire the network usage information at certain location. The contents of this message may include 1) location and coverage area of interest; 2). TVWS channels of interest; 3) network information; 4) tolerant interference level, etc.

CDIS Response 3225: This is the message sent from CDIS 1910 to CM 1935, as a response to the "CDIS Inquiry" message 3220. This message may include the TVWS channel usage information by the HeNB networks, 1). whose coverage areas overlap the coverage area of the inquiring HeNB network, 2). which is operating on TVWS channels of interest, and 3). whose operator is different from that of the inquiring HeNB network. The contents of this message may include a list of items, each corresponding to a certain TVWS channel. Each item is composed of 1). TVWS channel ID, 2). The TVWS channel reservation status. If a TVWS channel is reserved, the reservation status entry could include the period of the reservation and the information about the HeNB network which reserves the TVWS channel, e.g., network ID information, access point antenna height, access point Tx power, network coverage area, network device information, etc.

CDIS Spectrum Reservation 3205: This message may be sent from CM 1935 to CDIS 1910. The contents of this message are the sender CM 1935's proposed reservation of certain TVWS channels for certain durations at certain location. It is aimed to acquire approval from the CDIS 1910. The contents may include: 1). HeNB network ID; 2). HeNB network information: HeNB's Tx power class, antenna height and location; 3). TVWS channels to be occupied by the HeNB network; 4). Duration to be occupied by the HeNB network.

CDIS Spectrum Reservation Response 3210: This message may be sent from CDIS 1910 to CM 1935, as a response to the "CDIS Spectrum Reservation" message 3205. This message is to reply the CM 1935 which tries to reserve the TVWS usages, whether or not the spectrum reservation request is approved. In case the spectrum reservation proposal is disapproved, the suggested modifications are contained in this message as well.

The remaining messages have the same contents as those for FIG. 26.

Figure 33:
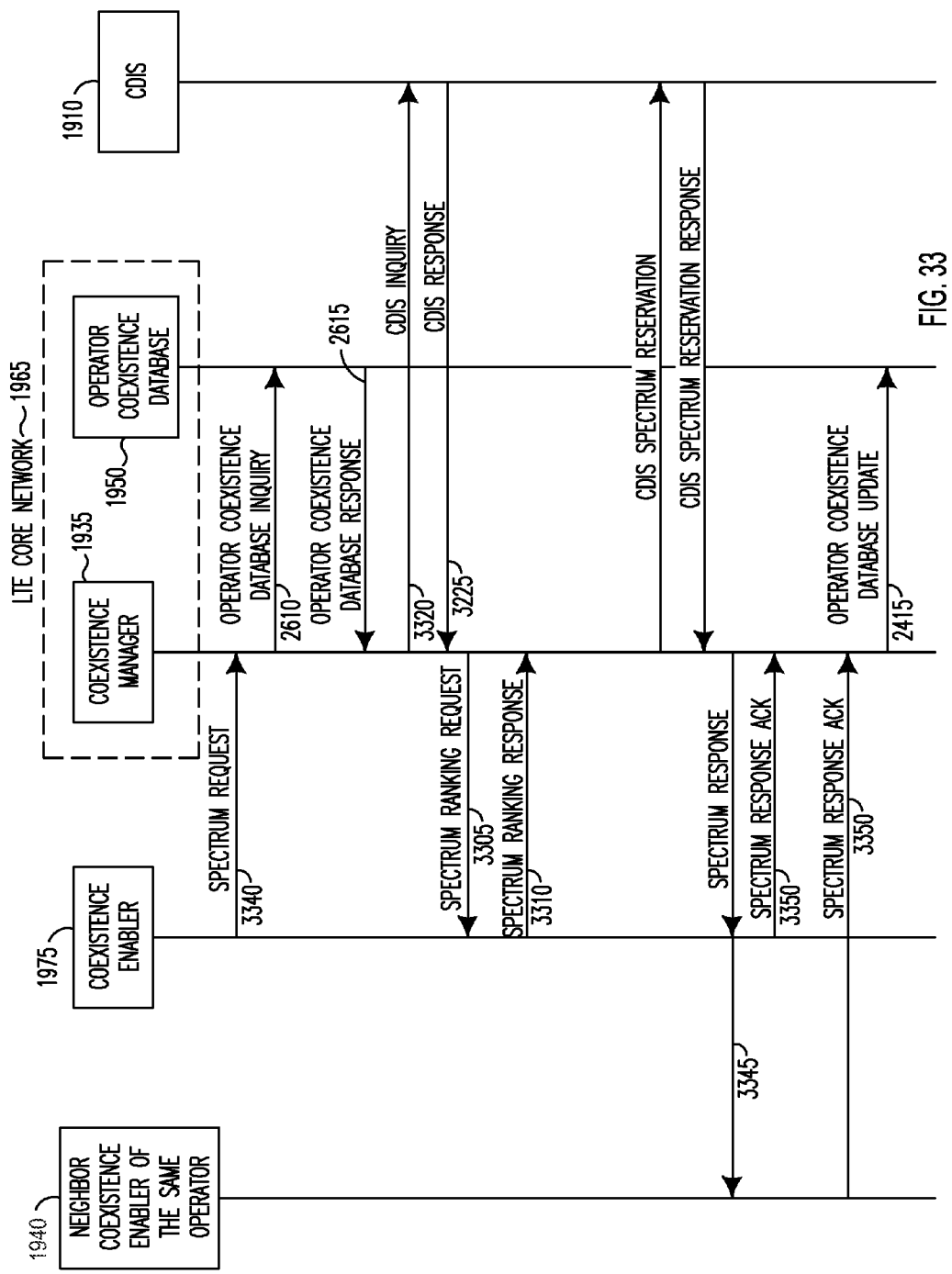
FIG. 33 shows an exemplary spectrum request procedure for management service.

The exemplary call flows of the spectrum request procedure for management service are shown in FIG. 33. Comparing with FIG. 32, there are several more messages for the management service.

Spectrum Ranking Request 3305: This message may be sent from CM 1935 to CE 1975. The contents of this message may include 1). a list of available TVWS channels at certain location; 2). some restrictions of using these channels, etc. This message is aimed to get the priorities of using these available channels. Such rank may be based on the local radio environment.

Spectrum Ranking Response 3310: This message may be sent from CE 1975 to CM 1935. The contents of this message may include 1). A list of ranked available TVWS channels; 2): Some details of using these channels.

Furthermore, the contents of the following messages for the management service may be different from those for the information service.

Spectrum Request 3340: This message may be sent from CE 1975 to CM 1935. It is aimed to acquire available TVWS channels at the location of the network. The contents of this message may include 1). TVWS channels of interest; 2). bandwidth requirement; 3) duration of the TVWS channels, etc.

Spectrum Response 3345: This message may be sent from CM 1935 to CE 1975 and/or the neighbor CE 1940, as a response to the "Spectrum Request" message 3340. This message includes the assigned channel information for a certain network. The contents of the message include: 1). TVWS channels assigned to the network; 2). Duration of the TVWS channels; 3). some detailed TVWS usage information, e.g., the transmission power, antenna height, etc.

Spectrum Response ACK 3350: This message may be sent from the CE 1975 to the CM 1935 and/or the neighbor CE 1940 to the CM 1935, as an acknowledgement of the "Spectrum Response" message.

Spectrum Adjustment Procedure

The call flows of the spectrum adjustment procedure are similar to FIG. 32 (information service) and FIG. 33 (management service). A difference is to replace the "Spectrum Request" message with the "Spectrum Adjustment" message.

CM-CDIS Interface

There are several CM-CDIS messages transmitted. According to the overall architecture (cf. FIG. 30), each LTE network operator may have its own CM 1935 residing on the LTE core network, while the CDIS 1910 resides on the internet. Hence, the connections between CM 1935s could be most probably via internet. Here, the focus is on the high level API between CM 1935 and CDIS 1910.

Messages exchanged between CM 1935 and CDIS 1910 could be categorized to 3 types:

Network registration and information update: This type of message involves the registration of the HeNB networks to the CDIS, as well as the updates of the registered information. The CDIS Registration Request, CDIS Registration Response, CDIS Update and CDIS Update ACK messages belong to this type.

Spectrum information inquiry messages: This type of message involves the transmission of spectrum usage information. It facilitates the spectrum reservation process. The CDIS inquiry and CDIS Response messages belong to this type.

Spectrum reservation messages: This type of message involves the reservation process between CM 1935 and CDIS on the final spectrum allocation solution. The CDIS Spectrum Reservation and the CDIS Spectrum Reservation Response messages belong to this type.

Additionally, there may be another type of message between CM 1935 and CDIS 1910. This type of message is related to the link setup or dismissal between CM 1935 and CDIS 1910. A CM 1935 may try to set up the link with a CDIS 1910 before its registration. The link setup process could be done via the "CDIS Registration Request" message and the "CDIS Registration Response" message. The authentication and encryption operations may be necessary during the link setup process.

In the network registration and information update process, the CM 1935 may first send the "CDIS Registration Request" message to the CDIS 1910. This message is to register all the HeNB networks served by the CM 1935 to the CDIS 1910. Upon receiving the CDIS Registration Request message, the CDIS 1910 may store the information contained in that message, and send the "CDIS Registration Response" message back to the CM 1935. If there is any network update, the CM 1935 may send the "CDIS Update" message to the CDIS 1910, and the CDIS 1910 confirms with the "CDIS Update ACK" message.

In the spectrum information inquiry, messages may include the "CDIS Inquiry" message and the "CDIS Response" message. The CM 1935 may send the CDIS Inquiry messages in order to obtain the TVWS channel usage information at a specific location. This facilitates its serving HeNB network operation on TVWS channels. Hence, The contents of this message may include:

The location and coverage area of interest: This is based on the coverage area of the HeNB network that makes requests for TVWS channel operations.

The TVWS channels of interest: This is the list of potential channels that the HeNB network could or want to use. It may depend on the device capability in the HeNB network.

The network information: This gives some specifications of the HeNB network, mainly, the radio access technologies of the HeNB network. For example, the HeNB network is using LTE technologies. This information may be useful in the spectrum solution negotiation process, especially for the co-channel sharing.

The tolerant interference level: This gives the information about the interference level the HeNB network is able to tolerate. It may be useful in the spectrum solution negotiation process, especially for the co-channel sharing.

Upon receiving the CDIS Inquiry message, the CDIS may check its reservation database to see if there are any HeNB networks which have the geo-location and TVWS channel reservations conflicts with the requesting HeNB network. If not, it just sends the CDIS Response message, without any contents. Otherwise, the CDIS Response message could provide some detailed information of each of the conflicting HeNB networks. This may include:

The location and coverage area: This is based on the coverage area of the conflicting HeNB network which operates on the TVWS channels of interest.

The TVWS channels: This is the list of TVWS channels that the conflicting HeNB network is using.

The TVWS usage information: This is some detailed information on the TVWS channel usage. It includes the duration of the TVWS channel occupation, the access point antenna height, the access point transmit power level, etc. The QoS conditions of the applications run on the TVWS channels could also be included.

The network information: This gives some specifications of the conflicting HeNB network, mainly, the radio access technologies of the HeNB network. It may also contain the device information of the HeNB network (e.g., the number of devices and their capabilities, etc). This information may be useful in the spectrum solution negotiation process, especially for the co-channel sharing.

The tolerant interference level: This gives the information about the interference level the conflicting HeNB network is able to tolerate. It may be useful in the spectrum solution negotiation process, especially for the co-channel sharing.

The Channel tolerant information: This provides the information about: (1) whether the TVWS channel resources currently occupied by the conflicting HeNB network could be released; (2) the way of the channel resources could be released. The TVWS channel resource release could be in the form of fully evacuating the channel or sacrificing partial channel resource. The former corresponds to the exclusive channel usage, while the latter corresponds to the co-channel sharing. The co-channel sharing mechanisms include FDM-based, TDM-based, or interference management-based. For the FDM-based co-channel sharing case, the conflicting HeNB network could specify which sub-channels could be released. For the TDM-based co-channel sharing case, the conflicting HeNB network could specify which time-slots could be released. For the interference management based co-channel sharing case, the conflicting HeNB network could specify how much its transmission power level could be reduced. (3) the compensation for the channel resource release. The compensation could be the number of tokens for this HeNB network to release its channel resource.

The spectrum reservation messages may include the "CDIS Spectrum Reservation" message and the "CDIS Spectrum Reservation Response" message. The CM sends the CDIS Spectrum Reservation message in order to reserve the certain channel resources at CDIS. The contents of this message may include:

The HeNB network information: This includes the requesting HeNB network ID and its network device information.

The TVWS usage plan: This includes the TVWS channel to be used, the duration of the channel usage, the access point antenna height and the access point transmit antenna power, etc.

The channel tolerant information: This provides the information about: (1) whether this is exclusive channel usage or co-channel sharing usage; (2) for the co-channel sharing usage, the portion of channel resources to be used; and (3) the price for the channel resource release. The price could be the number of tokens the requesting HeNB network would like to pay.

For the FDM-based co-channel sharing case, the requesting HeNB network could specify which sub-channels to be used. For the TDM-based co-channel sharing case, the requesting HeNB network could specify which time-slots to be used. For the interference management based co-channel sharing case, the requesting HeNB network could specify the transmission power level the conflicting HeNB network should be reduced to.

The price also could be the channel resources the requesting HeNB network wants to release to the conflicting HeNB network for the latter's channel resource. This operation is related to the channel exchange process. One purpose of the channel exchange is that in the carrier aggregation applications, the adjacent channels could be more efficient than separated channels, as some guard spectrum could be utilized in the adjacent channel conditions.

Upon receiving the CDIS Spectrum Reservation message, the CDIS may decide whether the reservation is acceptable. If the reservation message does not involve other HeNB network changes, such decision can be easily made. If the reservation message involves the channel resource release of another HeNB network, the CDIS needs to check its database to see if the conflicting HeNB network could accept this channel resource release request. If so, the CDIS may inform both the requesting HeNB network and the conflicting HeNB network about its decisions. Otherwise, the CDIS may reject the spectrum reservation proposed by the first HeNB network.

Other Possible Coexistence Call Flows Through the Architecture

Figure 5:
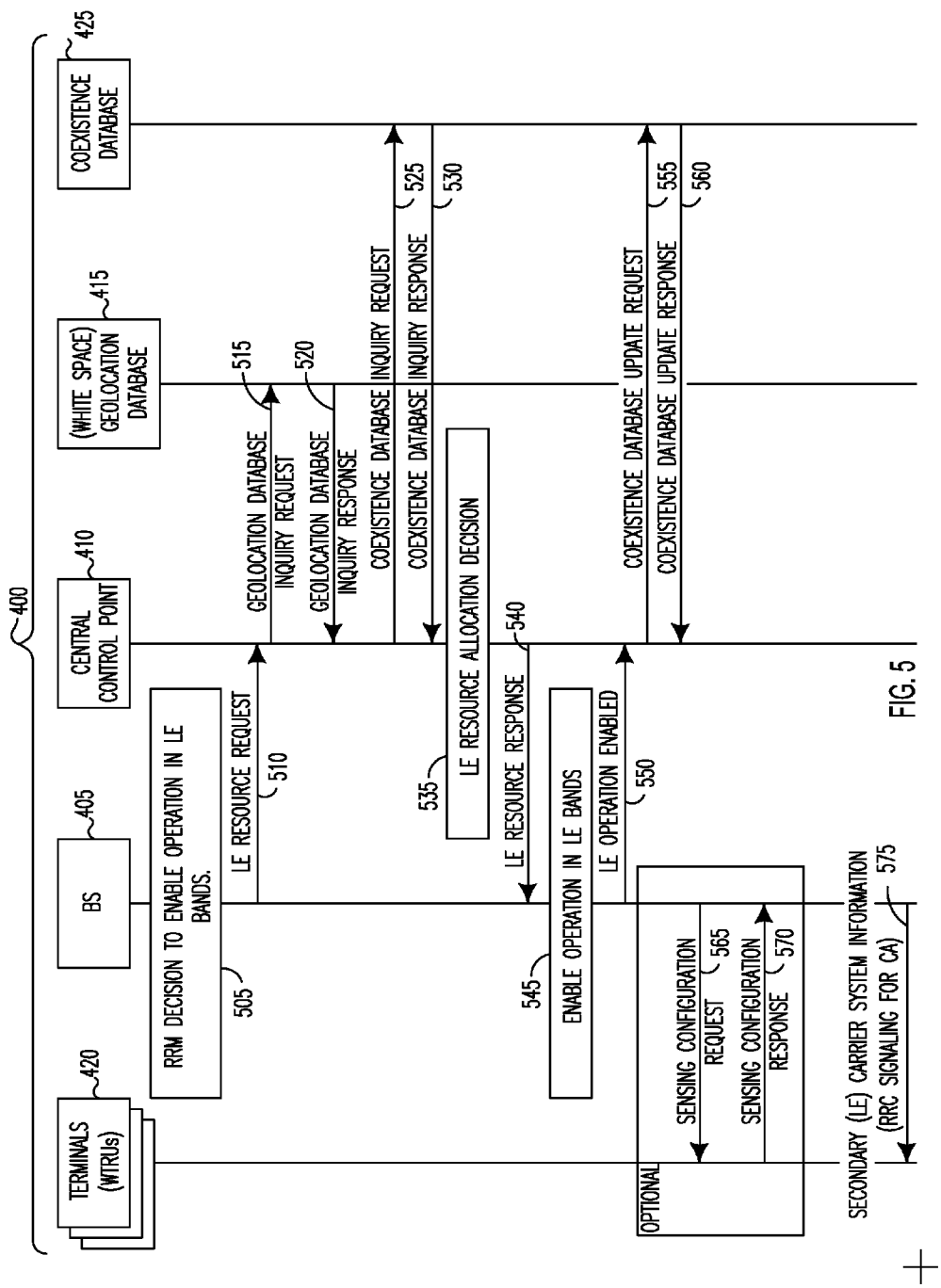
FIG. 5 shows an example of a base station initiated activation of LE band operation.

FIG. 5 is a flow diagram of a procedure for activating a BS-initiated LE band operation performed in the wireless communication system 400 of FIG. 4 using the coexistence database 425.

In 505 of FIG. 5, the BS 405 may be initially operating in a licensed band. Using WTRU and/or BS measurements, an RRM algorithm running in the BS 405 may determine that it may be advantageous or necessary, (given current quality of service (QoS) requirements), to add a carrier in the LE band. This additional carrier may then be used for scheduling of DL or UL traffic to/from all or a subset of the WTRUs 420 currently connected to one of the cells operated by the BS 405.

One potential trigger for the RRM algorithm's determination may be that the network or one or at least one WTRU 420 is currently congested, and the BS 405 is unable to allocate sufficient resources (UL or DL). Another potential trigger for this decision may be that at least one WTRU 420 is currently experiencing cell edge conditions and the BS 405 may utilize the improved propagation characteristics of the LE bands, (e.g., TVWS), for communication with that specific WTRU 420. Another potential trigger is that the BS 405 cannot satisfy the scheduling requests from the WTRUs 420 that have a radio resource control (RRC) connection with the BS 405.

In 510 of FIG. 5, the BS 405 sends an LE resource request to the CCP 410 to request bandwidth resources, (e.g., TVWS channels), that it may use. The CCP 410 may manage the usage of all LE bandwidth by providing the final allocation decisions based on information in at least one of the WS geolocation database 415 and the coexistence database 425.

In 515 of FIG. 5, the CCP 410 sends an inquiry request to the WS geolocation database 415 to obtain potentially available channels based on the usage of these channels by licensed (primary) users which have priority usage of the channels. The WS geolocation database 415 contains knowledge of the primary users of the TVWS channels at a given location. The CCP 410 may send the inquiry request to the WS geolocation database 415 upon request from the BS 405 (as shown in 510) or it may periodically send an inquiry request to the WS geolocation database 415 to obtain an accurate map of all channels in the LE bands that are occupied by the primary users. In addition, the WS geolocation database 415 may indicate the maximum power with which a WTRU 420 may operate in a given location. As a result, the inquiry request may specify the geographic location of the BS 405 and the WTRUs 420 it may serve.

In 520 of FIG. 5, the WS geolocation database 415 may send an inquiry response to the CCP 410 that may specify the available channels and potentially the maximum transmit power that may be used in each of these channels.

In 525 of FIG. 5, the CCP 410 may also send an inquiry request to the coexistence database 425, if such a database is used. The coexistence database 425 may contain information about other secondary systems, (not necessarily managed by the CCP 410), which may be using the LE channels that are available based on the information in the WS geolocation database 415.

In 530 of FIG. 5, the information obtained from the coexistence database 415 via an inquiry response may allow the CCP 410 to allocate channels to the BS 405 in such a way as to avoid interference with other systems operating in the same bands. This information may be used to avoid any channels currently occupied by other systems, or specify the rules of operation by the BS 405 for avoiding any interference. Alternatively, coexistence information may be obtained directly through communication with other CCPs 410 in the vicinity.

In 535 of FIG. 5, when the CCP 410 has received a list of potentially usable channels, as well as any additional coexistence information, it may allocate the appropriate channel(s) in the LE bands to the BS 405. In 535, the CCP 410 may also consider coexistence with other BSs 405 to which it serves as the CCP 410.

In 540 of FIG. 5, the CCP 410 may send the allocated LE resources to the BS 405 along with any usage rules/policies to be respected by the BS 405. Such policies may include the maximum transmission power, the need for sensing on the channels, and the basic sensing requirements.

In 545 of FIG. 5, the BS 405 may enable operation in the LE band by creating a secondary cell on a given channel or bandwidth specified by the CCP 410. In addition, the BS 405 may store alternate channels in the LE bands that have been provided by the CCP 410 (see 540). The BS 405 may then determine how these channels may be used in order to satisfy the trigger which caused the request, (e.g., determining whether the new CC may be a UL or DL CC).

In 550 of FIG. 5, any information regarding the determination of signal 545 that impacts the CCP 410, (in terms of coexistence and interference management), may be sent to the CCP 410.

In 555 and 560 of FIG. 5, in the event that the coexistence database 425 exists, the use of the channels by the network managed by the BS 405 may be added to the information in the coexistence database 425, such that other systems may be aware of the use of the LE channels by the cells managed by the BS 405.

In 565 and 570 of FIG. 5, in the case where sensing capabilities are available on certain WTRUs 420 in the network, and that sensing is required on the channels that were allocated by the BS 405, the BS 405 may send the WTRUs 420 a specific sensing task through a sensing configuration. This configuration may typically be sent through system information on the licensed carrier, and may potentially identify the bandwidth to be sensed, the algorithm type, and the frequency of sensing or reporting.

In 575 of FIG. 5, after the BS 405 has enabled operation in the LE bands and has chosen the channel to be used, this information is sent to the subset of WTRUs 420 that may be configured to perform CA in order to use resources on the LE bands. This information may be sent through RRC signaling to add a CC for at least one WTRU 420. Once a secondary CC in the LE bands has been added, the BS 405 may then schedule resources for those WTRUs, (either in the UL or DL), using normal medium access control (MAC)/physical layer (PHY) control signaling for resource allocation.

Figure 6:
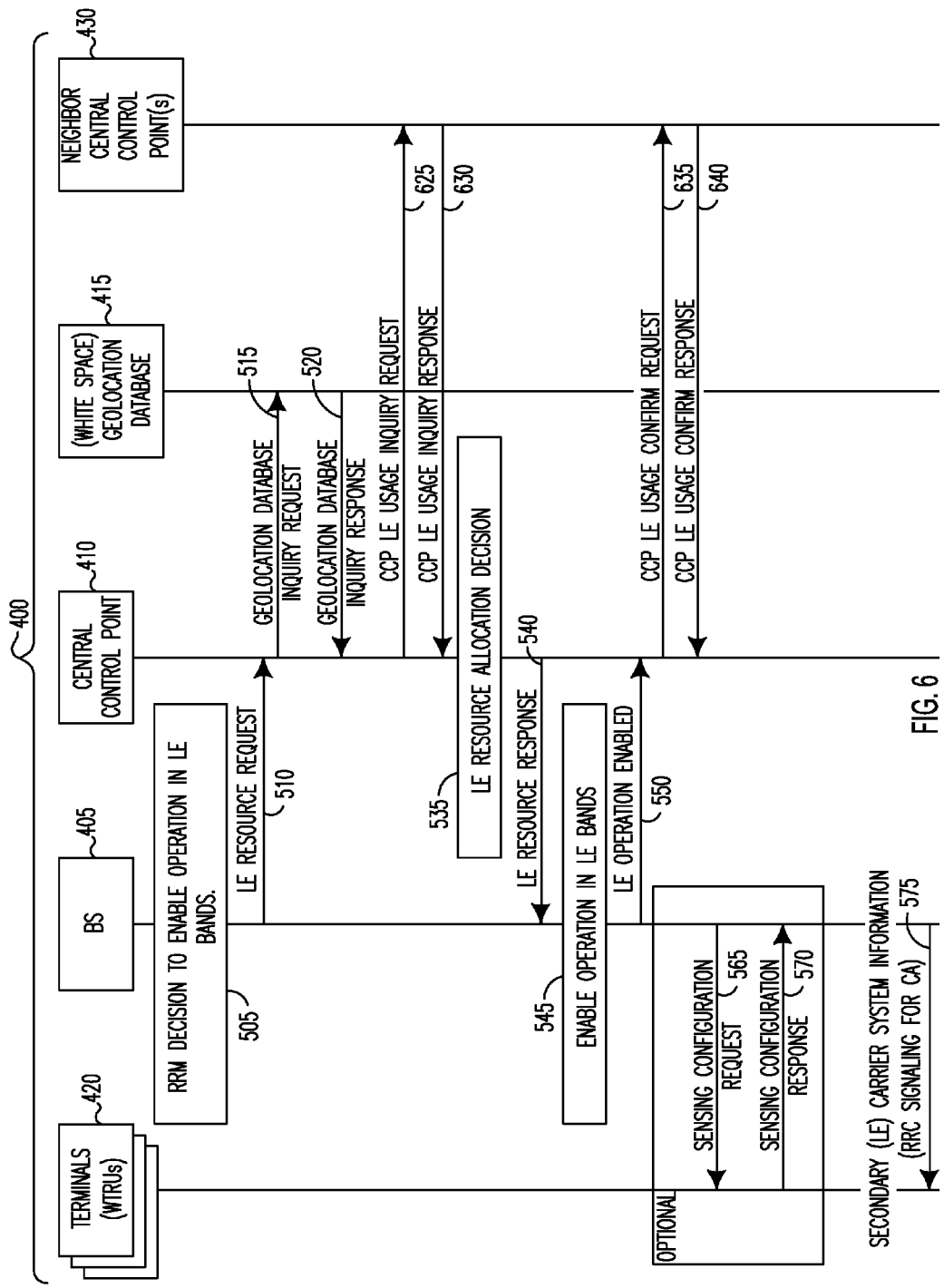
FIG. 6 shows an example of a base station initiated activation of LE band operation without a coexistence database.

FIG. 6 is a flow diagram of a procedure for activating a BS-initiated LE band operation performed in the wireless communication system of FIG. 4 without using the coexistence database 425. In FIG. 6, coexistence between different systems or RATs is achieved through direct communication between CCPs. Each CCP may obtain the coexistence information needed for selection of frequencies by direct communication with other CCPs. Each CCP may be considered to be responsible for all BSs associated with a particular RAT or operator. Without a coexistence database, the CCPs may exchange information about the LE spectrum being used by other secondary users in their area, in order to ensure coexistence. The information flow is almost identical to that shown in FIG. 5, except that in 625, the CCP 410 queries its neighboring CCP(s) 430, instead of a coexistence database 425, before making an LE band allocation to the BS 405. Also, there may be no need for the CCP 410 to update the coexistence database 425—and the CCP LE Usage Confirm Request 635 is also confirmed 640.

In all of the following scenarios described below with respect to FIGS. 7-11 may be modified to operate without a coexistence database 425, as shown in FIG. 6, for the case of inter-CCP communication.

Figure 7:
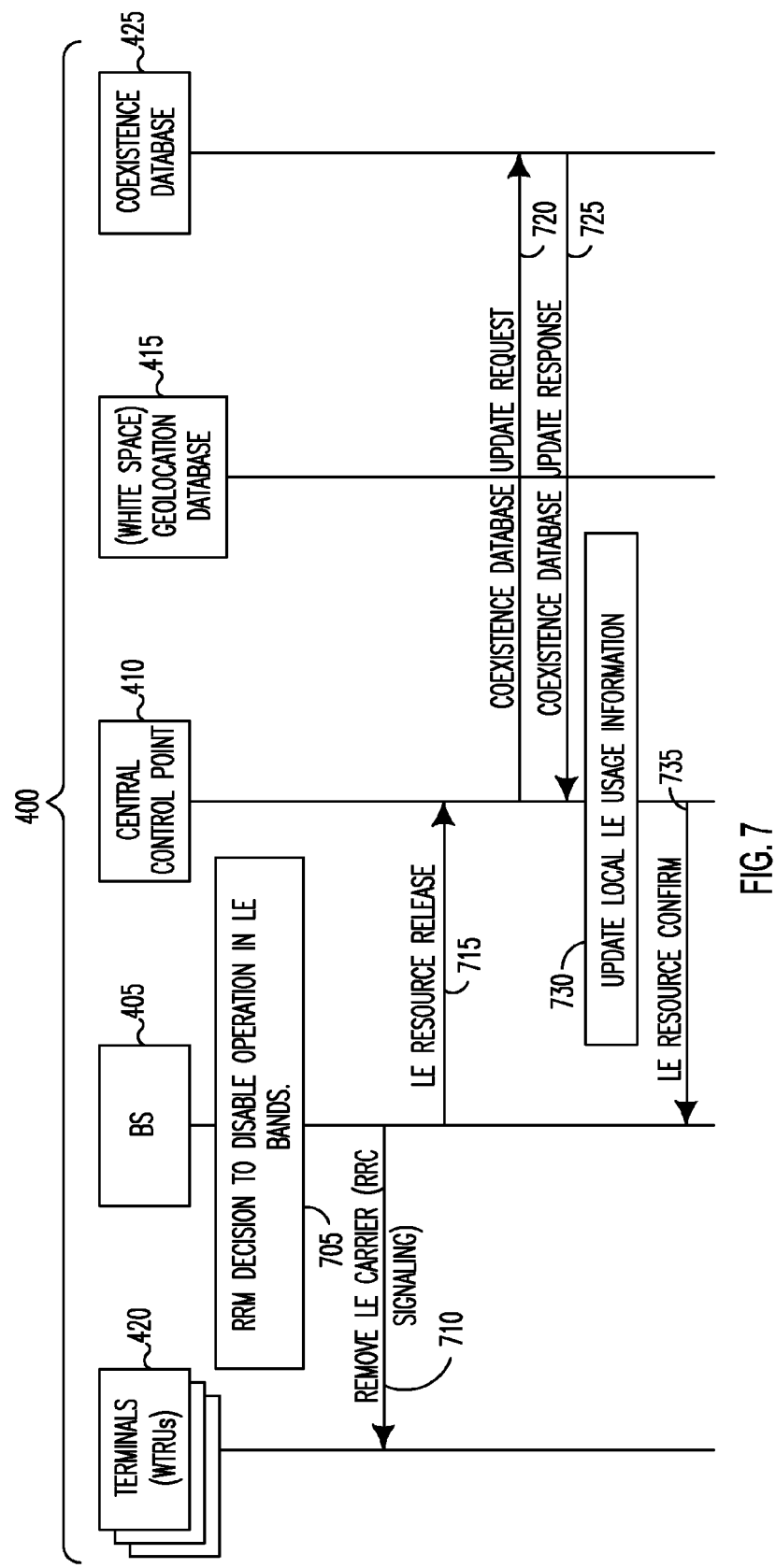
FIG. 7 shows an example of a base station initiated deactivation of LE band operation.

FIG. 7 is a flow diagram of a procedure for deactivating a BS-initiated LE band operation performed in the wireless communication system of FIG. 4 using the coexistence database 425.

In this scenario, the BS 405 decides to stop operation in the LE bands. This change may apply to all WTRUs 420 that are currently connected to the BS 405 through the licensed carrier, and implies that the BS 405 itself may operate only on the licensed band going forward. As a result, all WTRUs that currently use the LE channels for transmission or reception, (UL or DL), may terminate operation in this band. The component carriers CC(s) which are configured in the LE may therefore be removed from the configuration of each WTRU that has a connection with the BS.

In 705 of FIG. 7, the RRM algorithm in the BS 405 decides to disable operation in the LE band over the entire cell managed by the BS 405. Potential triggers for the RRM algorithm making this decision may be the conditions in which an initially triggered scenario in which the network load can be reliably supported on the licensed band only is removed.

At 710 of FIG. 7, the BS 405 sends an RRC message to remove the LE carrier for all of the WTRUs in which an LE CC has been configured. As a result, all WTRUs may no longer be required to send sounding reference signals or measure a channel quality indicator (CQI)/precoding matrix indicator (PMI)/redundancy indicator (RI) for the LE CC.

At 715 of FIG. 7, the BS 405 notifies the CCP 410 of the release of resources in the LE band that it was using in its CA.

At 720 and 725, in the case of the presence of a coexistence database 425, the CCP 410 may update the coexistence database 425 to indicate that the BS 405 in question is no longer utilizing the LE channels that were previously allocated. In the case where other BSs 405 or networks under the control of this particular CCP 410 are still utilizing the same channels, certain portions of this procedure may not be required as the coexistence database 425 may still indicate that there are systems which utilize these channels under the control of this CCP 410.

In 730 of FIG. 7, the CCP 410 may also locally update its own local LE usage information with the release event. Since this release event may free-up additional resources for other BSs 405 under the control of the CCP 410, the CCP 410 may need this information for future resource requests, or for re-configuring other BSs 405 that may be still operating in the same bands. In 735, the CCP 410 confirms the release of the resources to the BS 405.

Figure 8:
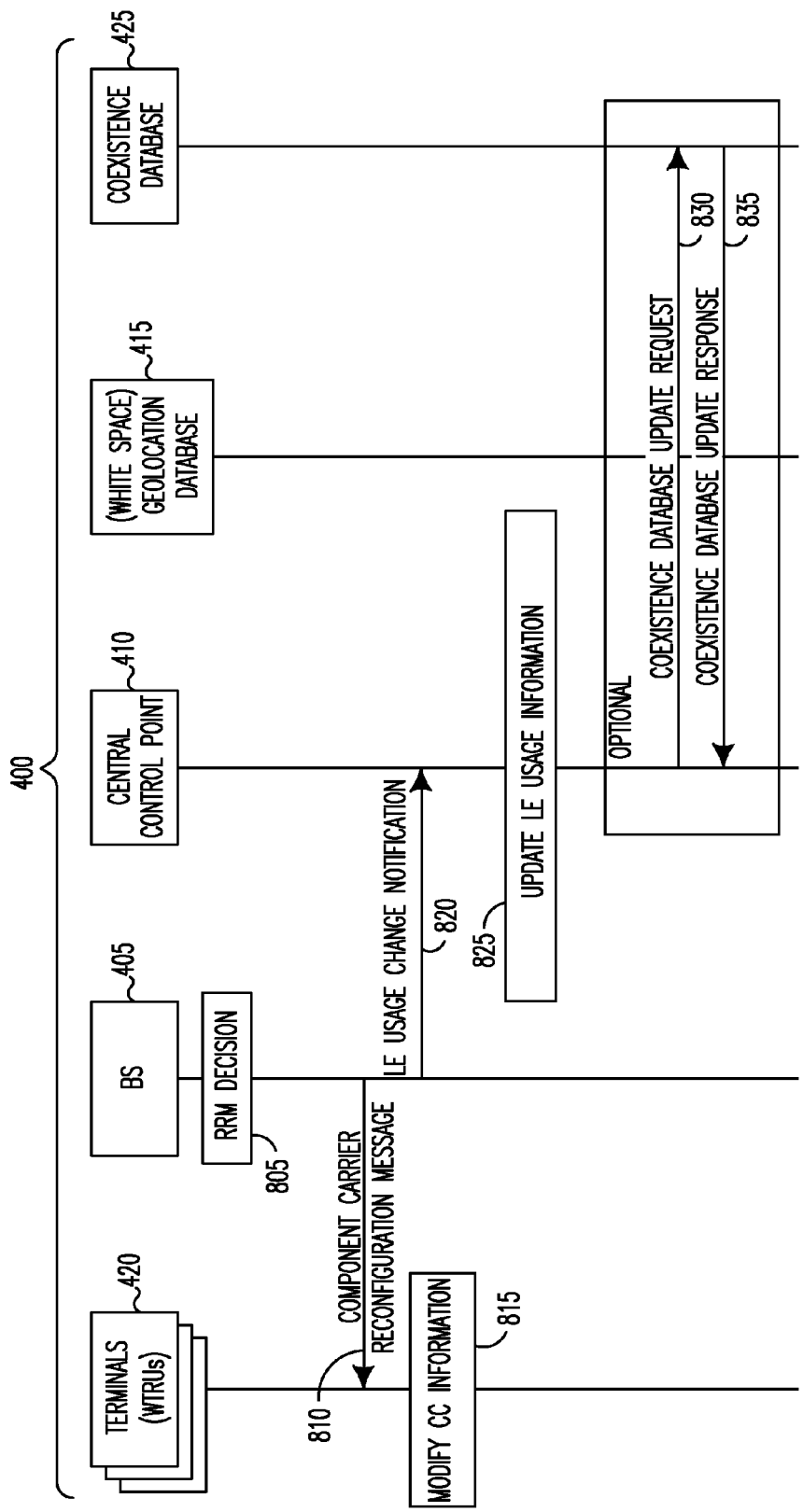
FIG. 8 shows an example of a base station initiated component carrier reconfiguration.

FIG. 8 is a flow diagram of a procedure for a BS-initiated CC reconfiguration performed in the wireless communication system of FIG. 4 using the coexistence database 425. During operation of the BS 405 in both licensed and unlicensed bands, there may be situations where the CCs in the LE bands being used by a subset of WTRUs must be reconfigured. One example of such a reconfiguration may be to change the LE carrier from a DL to a UL CC or vice versa in order to adapt to the changes in the overall load of the network. Another example may be to dynamically change the UL/DL configuration of an LE carrier, (in the case where that carrier operates in time division duplex (TDD) as opposed to frequency division duplex (FDD) mode). It may be that any reconfiguration decision made by the BS 405 is consistent with the policies it initially receives from the CCP 410. In that case, the reconfiguration decision may be made locally, and only the information about the decision needs to be sent to the CCP 410, following the reconfiguration.

In 805 of FIG. 8, the RRM algorithm at the BS 405 may detect a need to reconfigure a CC in the LE in order to meet the new needs of the network load. Such a decision may be triggered by the change in the relative UL/DL resource requirements as specified by the WTRU 420 scheduling requests, buffer status reports and the DL traffic present at the BS 405.

In 810 of FIG. 8, the BS 405 sends a CC reconfiguration message to all WTRUs 420 which are using the CC whose configuration needs to change. This message may be sent through a single new RRC message specifying the change of configuration, or using a set of RRC messages for the removal of the CC followed by its addition with new configuration.

In 815 of FIG. 8, the WTRUs 420 that were previously using this CC may modify their local information about this carrier. This change of information may impact the behavior of the WTRU 420 regarding the CC after its reconfiguration.

For instance, a WTRU 420 may have been measuring CQI/PMI/RI on a DL FDD CC and may no longer need to do so when this CC is changed to a UL FDD CC.

In 820 and 825, following the CC reconfiguration message, the BS 405 notifies the CCP 410 of the reconfiguration in the case where the reconfiguration may affect coexistence with other BSs 405 being managed by the CCP 410. For instance, if a CC is reconfigured from UL to DL or vice versa, the CCP 410 may need this information to ensure proper operation and interference avoidance with other BSs 405 using the same or neighboring channels in the LE bands. As a result, the CCP 410 updates the information concerning the usage of the LE channels by each BS 405 so that future channel allocation decisions may take into account the current usage of each channel.

In 830 and 835, the decision of the BS 405 to reconfigure a CC may impact future coexistence decisions with other systems. In this case, the CCP 410 may update the coexistence database 425 (if it exists) with this information. Alternatively, the CCP 410 may communicate with other neighboring CCPs 410 as well.

Figure 9A:
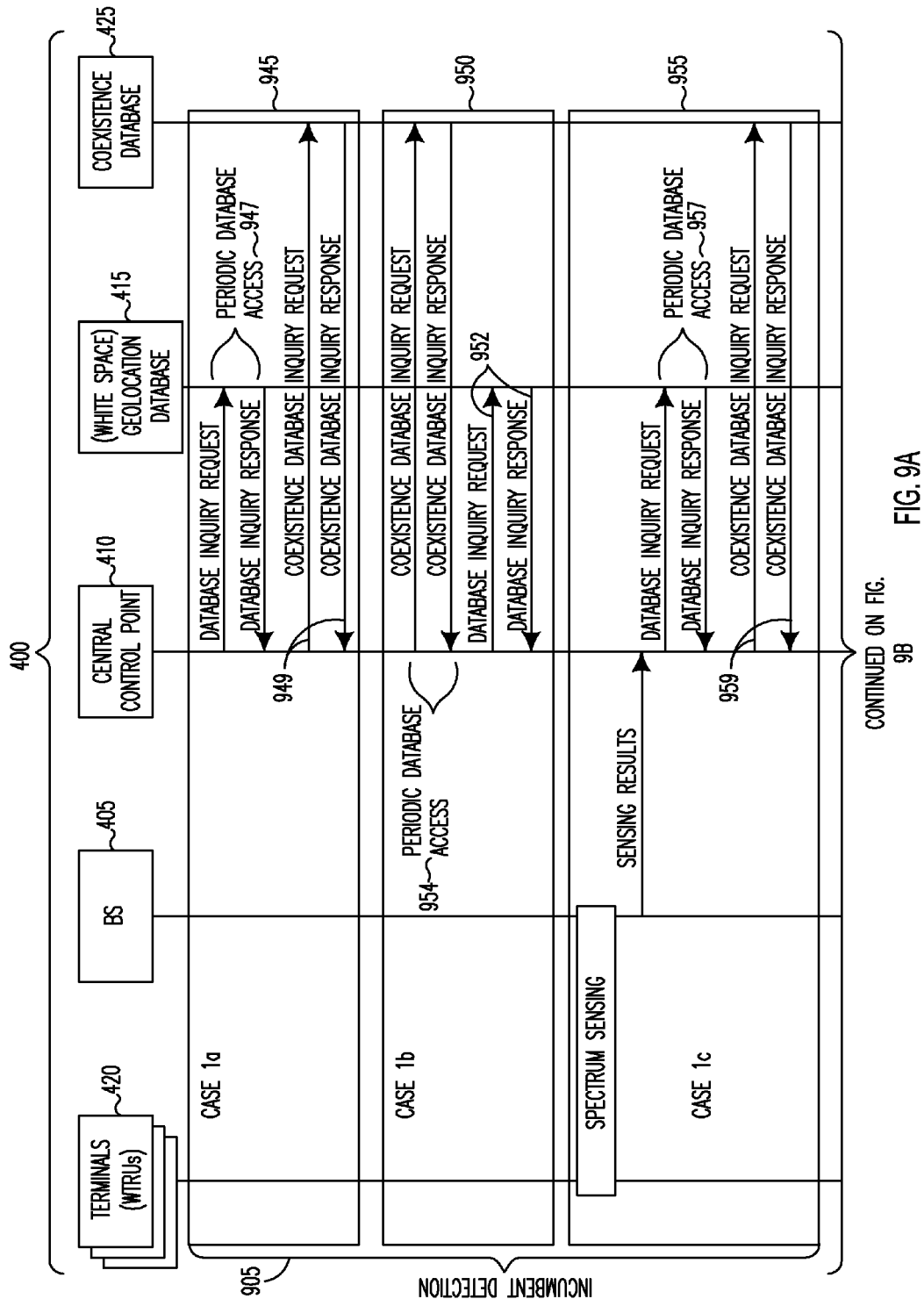
FIGS. 9A and 9B show an example of an incumbent detection on an LE channel.
Figure 9B:
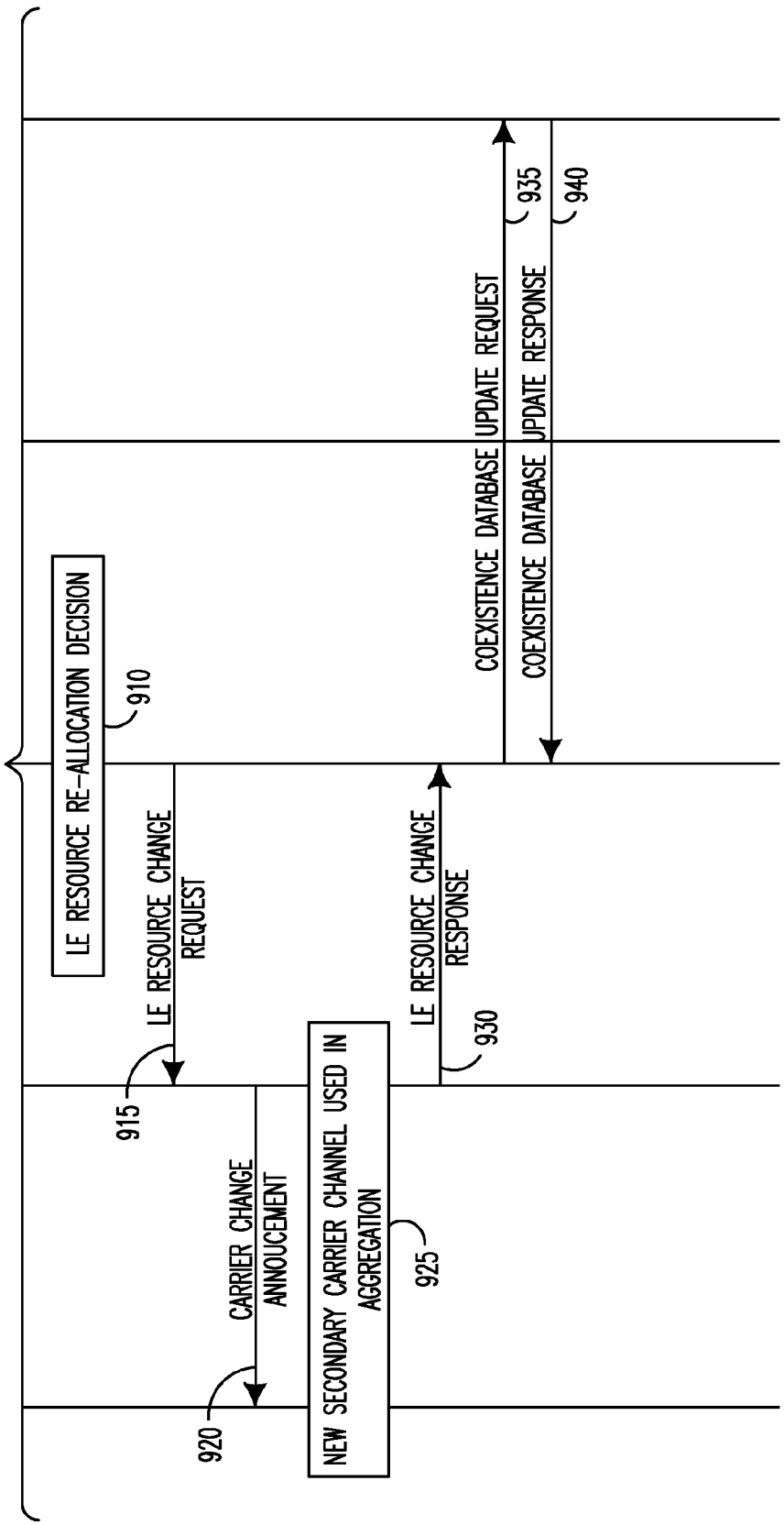

FIGS. 9A and 9B show a flow diagram of a procedure for incumbent detection on the LE channel performed in the wireless communication system of FIG. 4 using the coexistence database 425.

During operation in the LE bands, there may be situations where a primary user is detected (which requires evacuation of the band in order to protect the primary users) or when the arrival of a secondary user may cause coexistence issues. In either of these scenarios, the CCP may decide that the LE LTE carrier should be moved to an alternate channel or location in the LE band.

In 905 of FIGS. 9A and 9B, an incumbent (primary or secondary) may be detected through one of several methods:

Case 1a, 945) Through periodic access 947 to the geolocation database 415, the CCP 410 may determine the presence of a primary user. The CCP 410 then immediately accesses 949 the coexistence database 425 to gain coexistence information about other alternate frequencies.

Case 1b, 950) Through periodic access 954 to the coexistence database 425, the CCP 410 may determine the presence of a secondary user which may not coexist on the same band, (given QoS requirements of each user). The CCP 410 then immediately accesses 952 the geolocation database 415 to gain information about primary users and potentially available other frequencies.

Case 1c, 955) Through spectrum sensing, which may be performed at the BS 405, or alternatively at both the BS 405 and certain WTRUs, the presence of an interference or incumbent user may be detected, and the CCP 410 may access 957, 959 both databases 415 and 425 in order to gain the required information to allocate a new channel.

Although periodic database access may be available in the above procedures, a method may be implemented where certain portions of the databases 415 and 425 may be triggered and sent to the CCP 410.

In 910 of FIGS. 9A and 9B, based on the collected information, the CCP 410 reallocates the affected LE channel to another channel. If, on the other hand, there are no available frequencies, operation in the LE frequencies may be disabled.

In 915 of FIGS. 9A and 9B, the change in the LE channel is signaled to the affected BS 405, (and any other BS 405 which may be using the same resource under the control of the CCP 410).

In 920 and 925 of FIGS. 9A and 9B, the BS 405 sends an announcement message to all WTRUs 420 indicating the change in frequency. This frequency change may take effect once the WTRUs 420 are able to read this message, and following this, the BS 405 may schedule resources in the LE band on the new frequency/channel.

In 930, 935 and 940 of FIGS. 9A and 9B, as with the previous scenarios, the change of frequency is entered into the coexistence database 425.

Figure 10A:
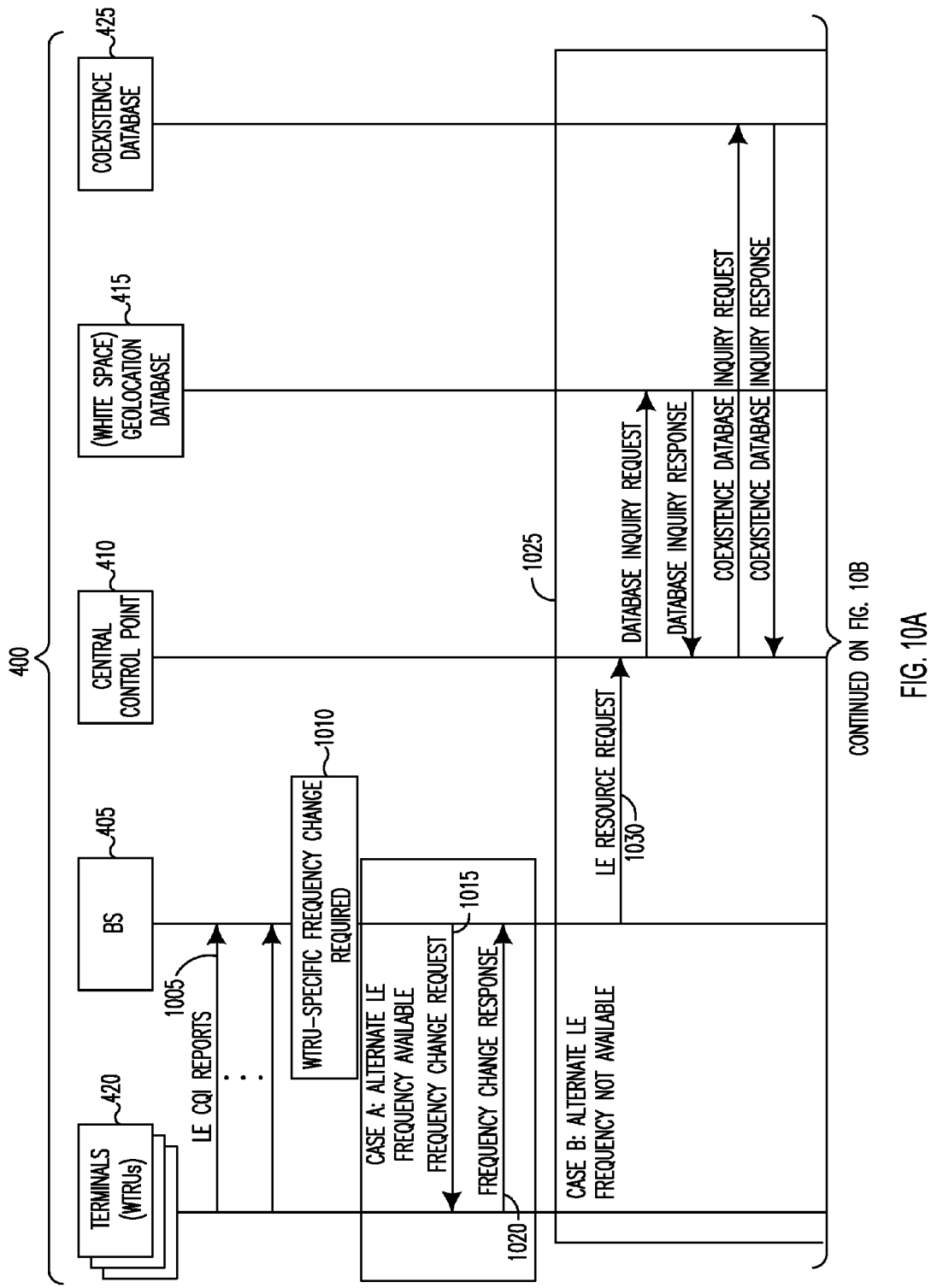
FIGS. 10A and 10B show an example of a WTRU specific frequency change.
Figure 10B:
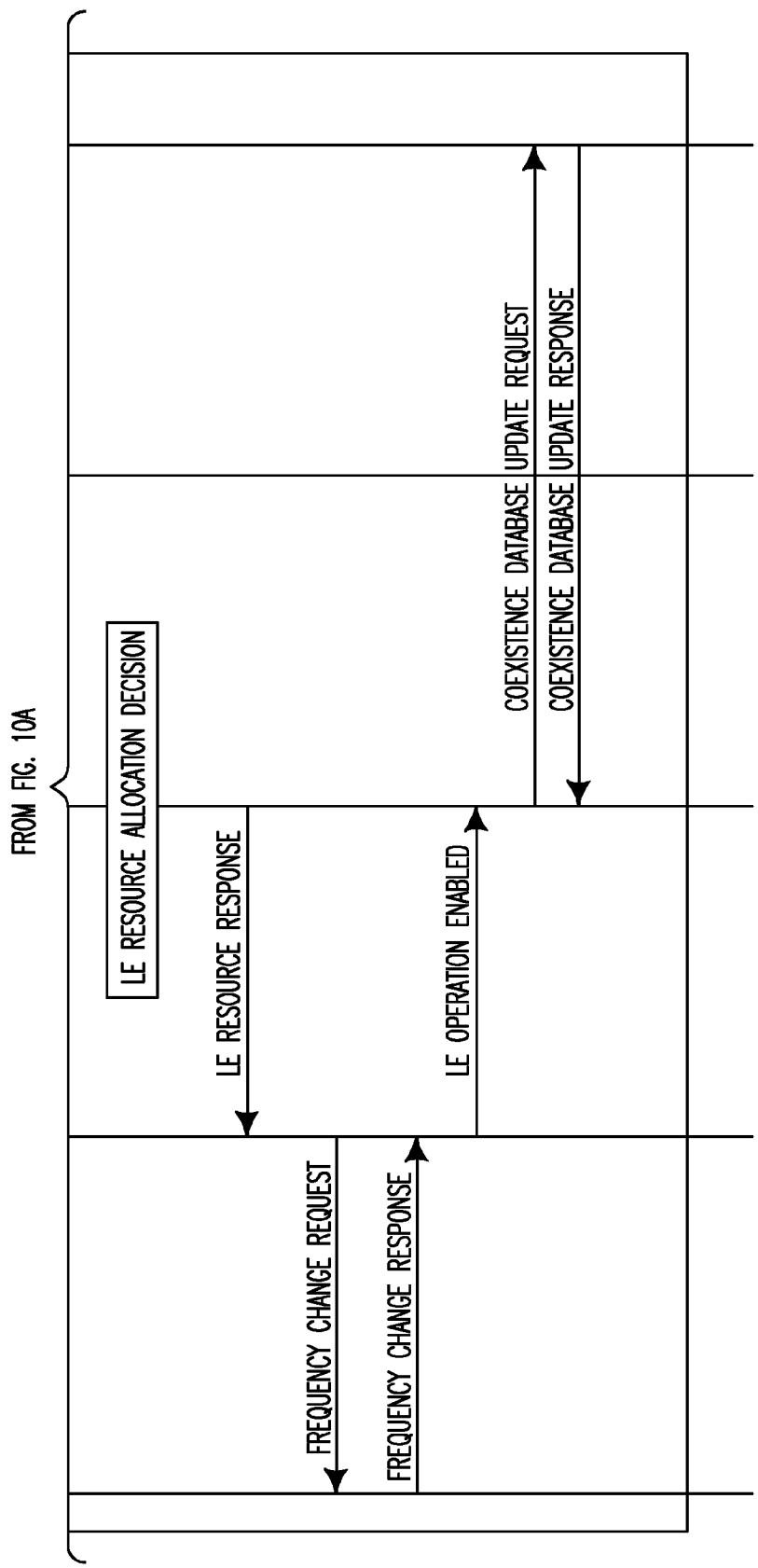

FIGS. 10A and 10B show a flow diagram of a procedure for WTRU-specific frequency change performed in the wireless communication system 400 of FIG. 4 using the coexistence database 425. In this scenario, a specific WTRU may have difficulty utilizing a channel in the LE band. In that case, that specific WTRU may be moved to another channel. The decision may be performed by the BS 405 or the CCP 410, depending on the scenario.

At 1005, the BS 405 may receive CQI reports on the LE channel from a particular WTRU 420. These reports may indicate the quality of this channel for this particular WTRU 420.

At 1010, the BS 405 may determine from the CQI reports that a different LE channel is required for that WTRU 420, (e.g., a lower frequency channel, in the case the WTRU 420 is at the cell edge, or an LE channel having a lower overall network load).

In 1015 and 1020, the BS 405 may initiate a frequency change request for the WTRU 420 so that CA now occurs with another LE channel the BS 405 is already aggregating on.

In the scenario 1025 where an appropriate frequency is not available for this particular WTRU 420, the BS 405 may initiate a request 1030 for additional resources from the CCP 410.

Figure 11A:
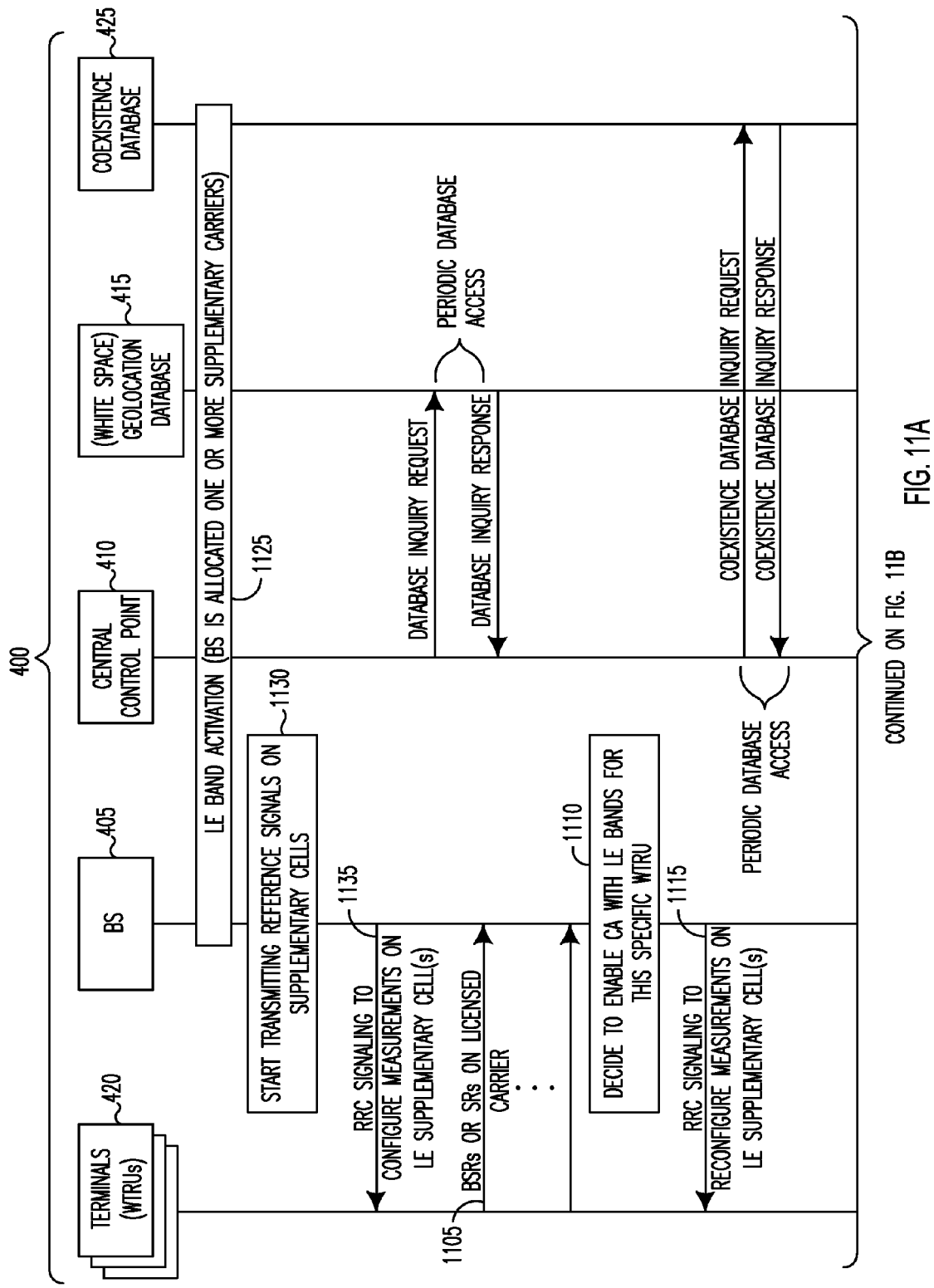
FIGS. 11A and 11B show an example of enabling CA at a specific WTRU through supplementary carrier measurements.
Figure 11B:
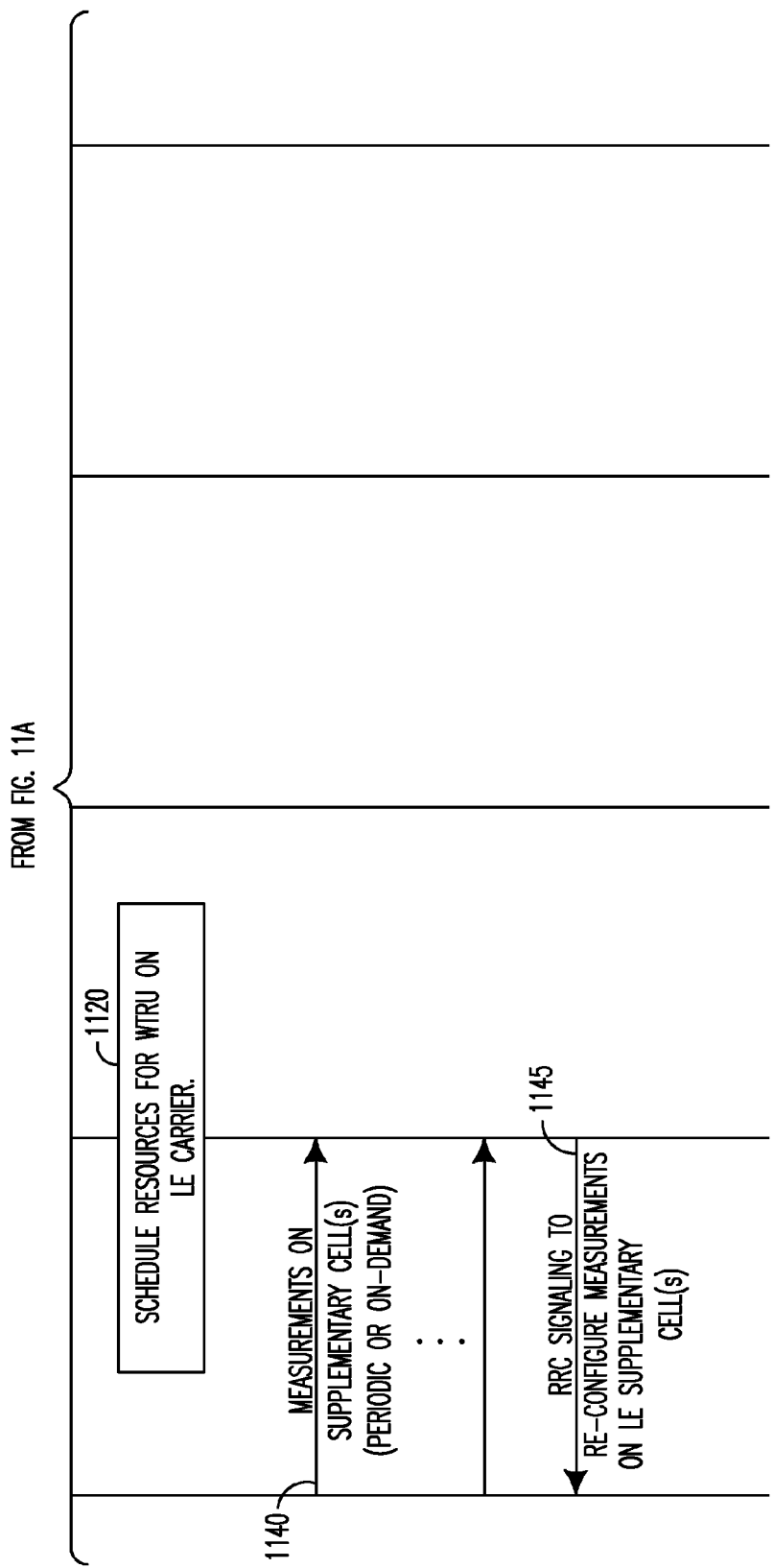

FIGS. 11A and 11B show an example of enabling CA at a specific WTRU through supplementary carrier measurement. The specific WTRU or set of WTRUs may be initially connected to the BS over the licensed band. The BS may initiate LE Band Activation 1125 to make use of the LE bands for additional bandwidth based on RRM decisions related to the overall traffic in the network.

The BS 405 may then begin to transmit reference signals 1130 to allow WTRUs to perform signal quality measurements on a Supplementary Cell in the LE bands. Initially, these measurements may determine whether a specific WTRU may receive data on a specific Supplementary Carrier (i.e. for sounding and basic quality) 1135. When the WTRU starts to use the Supplementary Cell, these measurements may be used for scheduling purposes.

The BS 405 may then configure one or more of the Supplementary Cells in the LE band that are available in the BS. This configuration may be performed in conjunction with configuring measurements for the WTRU to perform on these Cells. Supplementary Cell configuration may allow the BS to be able to address the Supplementary Carrier when communicating with the WTRU and vice versa. Separate messages may be used for cell configuration and measurement configuration and may occur at distinct times. The WTRU may then be aware of the presence of one or more Supplementary Cells operating in the LE bands. Although the WTRU may not receiving data on these cells and may not transmit on them, the WTRU may be performing measurements and transmitting the measurement reports to the BS via the licensed connection.

The BS 405 may then periodically receive buffer status reports (BSRs) and status reports (SRs) from the WTRU in question on the licensed band 1105. The BSRs and SRs may give an indication of the uplink resources required by the WTRU at a given time. Downlink resources may be determined at the BS 405 itself.

The BS 405 may then decide that the WTRU 420 requires the use of resources on an LE channel. The BS may signal to the specific WTRU (for instance, using Rel-10 RRC messaging for CA) that it should enable CA 1110. Alternatively, signaled activation of a Supplementary Cell for CA may not be necessary and the BS may rely on simply scheduling resources on the Supplementary Cell. Regardless, at this stage, measurements may need reconfiguration in order to ensure that the WTRU performs measurements on the Supplementary Cell that it may actively be using for transmission and reception on a more regular basis 1115. The activation, which is optional, and measurement configuration may be done with a single message or using multiple messages 1140.

The BS 405 may then start to send downlink resources allocations and uplink grants on the LE channel following the time required for the WTRU 420 to receive this signaling. The WTRU may continue to periodically report measurements on the active Supplementary Cell, as well as other Supplementary Cells. At some point, another Supplementary Cell may become better than the currently employed Supplementary Cell by a certain threshold, set by the BS 405.

The BS 405 may then move traffic destined for this particular WTRU from the first Supplementary Cell to the second Supplementary Cell following the trigger of an event. Optional activation, as well as some modification of the measurement configuration, may take place 1145.

In the examples described above, the BS may initiate the use of the LE band or the need to change channels based on information provided by the WTRU. The BS may request the CCP to communicate with a coexistence database or other CCPs in order to obtain coexistence rules, parameters, usable PCIs, and power restrictions. There are also examples where the coexistence information initially provided when LE band operation is started may need to be changed. For example, BS2 with a higher priority or with exclusive usage rights may request to use the LE bands. Any BS's, for example BS1, currently using the same channel assigned to the BS2 may need to be notified in order to modify the coexistence rules, or to enact a channel change in the LE band. The coexistence database may first notify the CCPs affected by the arrival of BS2 and the CCPs may communicate the change to the affected BSes.

Figure 12:
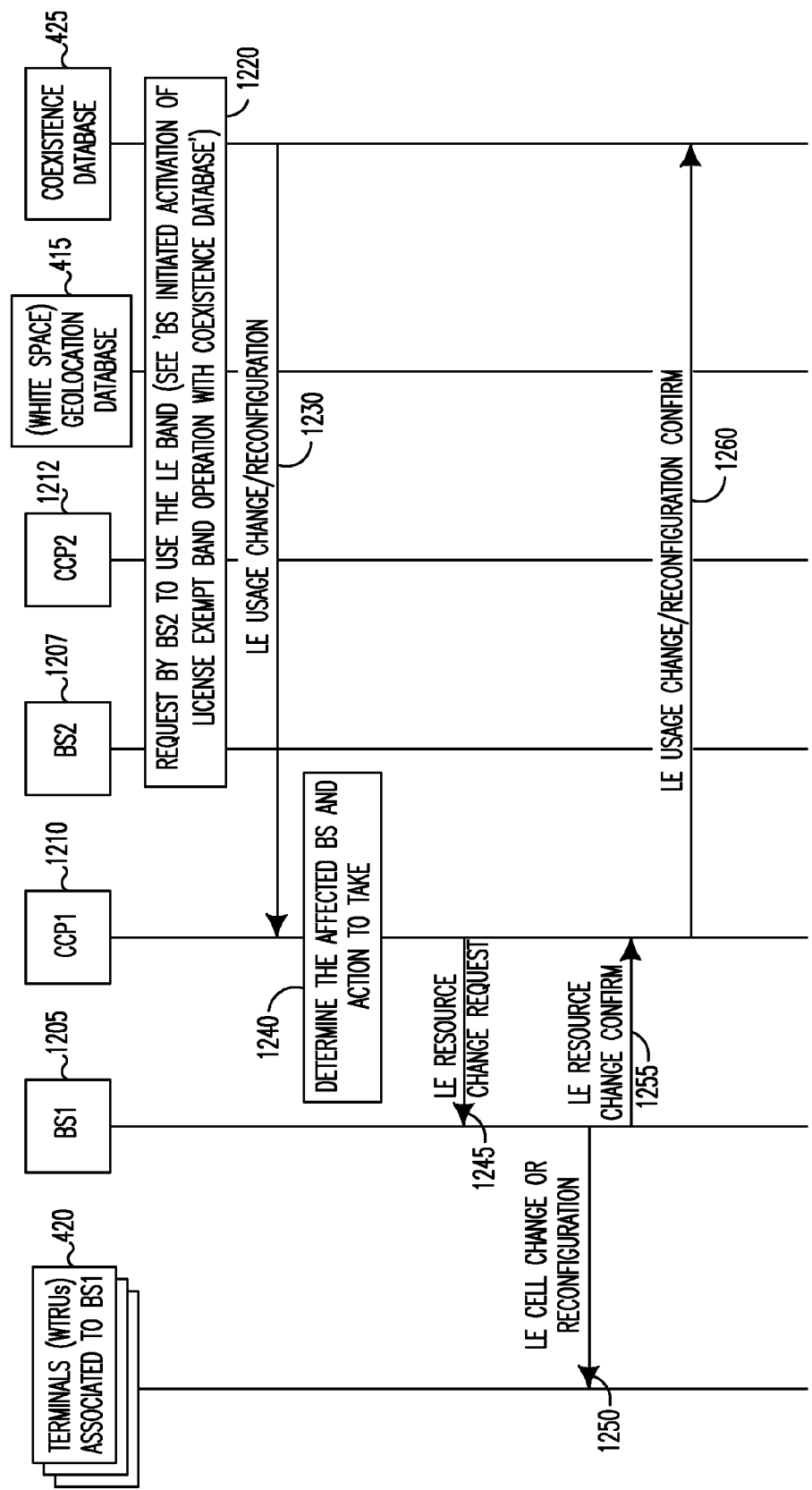
FIG. 12 shows an example of coexistence enabled cell change and/or reconfiguration.

FIG. 12 shows an example of the coexistence enabled cell change or cell reconfiguration. In FIG. 12, it is assumed that a first base station BS1 1205 is under the control of CCP1 1210 and BS2 1207 is under the control of CCP2 1212.

The coexistence database 425 may detect the need to change and/or reconfigure one or more cells currently under the management of CCP1 1210 during or following a request 1220 by BS2 1207 to use the LE band. An LE Usage Change and/or Reconfiguration 1230 may be transmitted to CCP1 1210 to provide CCP1 1210 with a new configuration or channel information. In the case of a channel change, a new set of channels and a new PCI, or set of potential PCIs, may be transmitted to CCP1 1210.

CCP1 1210 may then determine 1240 which BS is affected by the change in the coexistence information/situation based on the information provided by the coexistence database. The specific decision on what action to take may be taken independently by CCP1 1210 based on the constraints defined in the information provided by the coexistence database 425. For example, the CCP may determine that a change in the bandwidth of the LE Cell operated by BS1 1205 is sufficient to ensure coexistence, in which case, only a cell reconfiguration 1250 may be performed. The decision may also involve complete deactivation of the LE band.

CCP1 1210 may then instruct BS1 1205 to change the LE cell configuration 1245 or operating frequency using an LE Resource Change. An LE Cell Change or Cell Reconfiguration may be transmitted 1250 by BS1 1205 to the WTRUs 420 that it is servicing. This may be transmitted via a change in system information over the licensed cells served by BS1. As a result of this message, the CA scenario may be modified to change the specific LE cell or to reconfigure the LE cell used by BS1 when performing CA. Confirmation of the action taken may be transmitted to the CCP 1255 and the coexistence database 1260.

In another example, when handover from one BS to another BS is performed, the use of LE bands may require considerations that are not currently part of LTE-A. First, the new BS may not have operation in the LE bands currently activated, and therefore, LE band activation may be part of the handover procedure. Second, the CCP may be made aware of the handover procedure in order to maintain consistency of the allocated PCI and channels.

Figure 13:
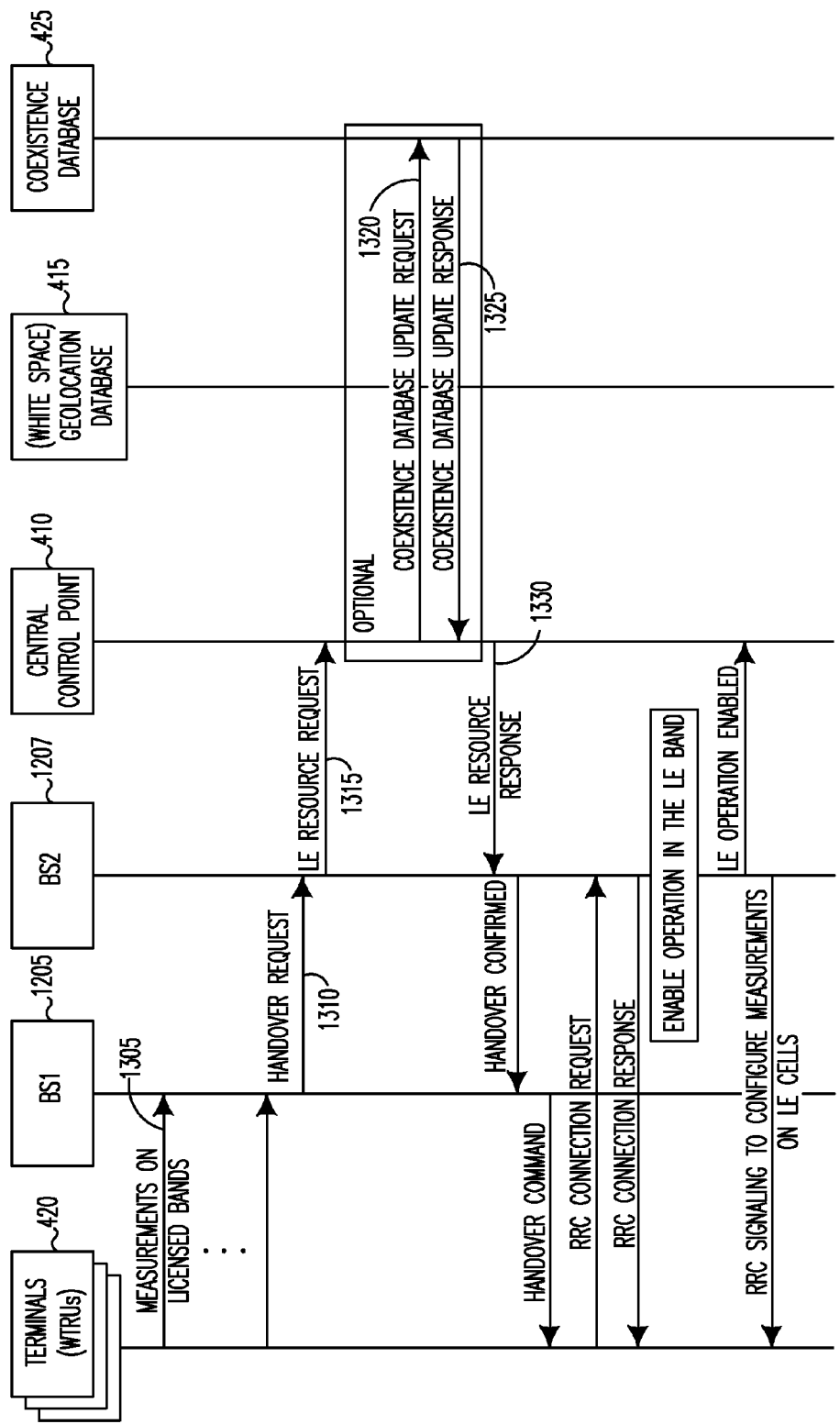
FIG. 13 shows an example of licensed cell handover while performing CA in LE bands.

FIG. 13 shows an example of licensed cell handover while performing CA in LE bands. A WTRU 420 may periodically report measurements 1305 on the licensed cells which may be used to trigger a handover decision when in RRC Connected Mode.

BS1 1205 may then transmit a handover request 1310 to BS2 1207 through the X2 interface following a decision by BS1 1205 to trigger a handover to BS2 1207. In this case BS1 1205 and BS2 1207 are Home (H)eNBs and the handover may be transmitted through the S1 interface instead. In addition to the secondary cell information being transmitted, BS1 1205 may also transmit information about the Supplementary Cells in the LE bands, including the PCI, to BS2 1207.

BS2 1207 may then transmit a LE Resource Request 1315 to the CCP 410, indicating that the trigger is a handover decision from BS1 1205 assuming BS2 1207 is not using the LE bands. The CCP 410 may decide to use the same coexistence parameters, LE channel, and LE PCI as was previously used by BS1 1205. If this is not possible, for example, the PCI may cause collision or confusion if used by BS2 1207 on the LE band, the CCP 410 may request updated information from the coexistence database.

Optionally, the CCP 410 may request 1320 the coexistence database 425 to issue new coexistence parameters 1325 and update the information maintained by the database.

The CCP 410 may then confirm the coexistence parameters, PCI and channels to be used by BS2 in the LE Resource Response Message 1330. BS2 1207 may use the information received from the CCP 410 to activate one or more cells in the LE bands. BS2 1207 may have completed LE band activation, similar to FIG. 5.

RRC messaging may be used to reactivate the Supplementary Cell CA in the WTRU 420 which was torn down during the handover.

In PCI management variant, coordination of the PCIs used by each of the BSs, such as BS 405 may need to be managed by the CCP 410 and may be controlled by the coexistence database 425 or through communication between the CCPs 410. While the CCP 410 may be responsible for managing the PCIs used by the BS 405 for that specific operator, inter-operator PCI collision and confusion may be avoided by management of the PCI at the coexistence database level or through inter-CCP communication.

In the case of a coexistence database 425, the database may be responsible for allocating PCIs to be used by each CCP 410 in the LE band based on the geographical location of the CCP 410. The allocation performed by the coexistence database 425 may ensure there is no collision or confusion of PCIs between BSs 405 managed by different operators. In addition, the CCP 410 may perform similar management, on a per-BS basis, based on the PCIs allowed by the coexistence database 425. In addition, the coexistence database 425 may also provide guidance, without specifying the actual PCIs to be used, to avoid PCI collision or confusion. PCI selection may be performed by the CCP 410 based on this guidance only.

In PCI suggestion variant, the coexistence database may use information about the location of the CCP 410 to provide a list of suggested PCIs to be used. A separate list may be associated with each of the LE channels that are also suggested by the coexistence database 425 for usage by the requesting BS 405.

States of Architecture Components

Base Station States

Figures 14, 15:
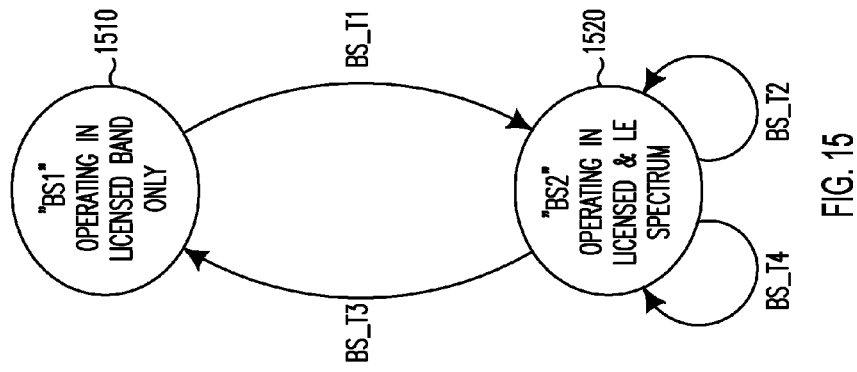
FIG. 14 shows an example format of channel and PCI information in PCI suggestion variant.
FIG. 15 shows a base station state transition diagram.

FIG. 15 shows a base station state diagram. In FIG. 15, the base station may be in one of two possible states. In a first state, BS State 1 (BS1) 1510, the BS may be operating in licensed bands only. In BS1 1510, the BS may activate only cells which operate in the licensed band. In a second state, BS State 2 (BS2) 1520, the BS may be operating in both licensed and LE spectrum. In BS2 1520, at least one of the cells operating in the control of the BS may be in LE spectrum.

FIG. 15 includes four triggers, BS_T1, BS_T2, BS_T3, and BS_T4.

BS_T1 may consist of enabling the use of CA with LE CC by the BS. In this case, the BS may configure a cell, either an existing cell previously operating in the licensed band or a new cell, to operate in the LE spectrum. The trigger may occur based on several events. For example, the trigger may occur based on network degradation detection, from buffer status reports from the WTRUs or BS buffer occupancy measures. The trigger may also occur based on one or more WTRUs that are shown to be at the cell edge or have moved beyond the cell edge and has/have limited coverage. The trigger may also occur based on new WTRUs that join the network with additional bandwidth requirements.

BS_T2 may consist of a change or reconfiguration of an LE channel or CC. This may include changing the center frequency or bandwidth of the CC within the LE bands (e.g. change from one channel to another), or the reconfiguration of the usage of the CC itself (change from UL to DL FDD CC or change in the TDD UL/DL configuration of an LE CC). The trigger may occur based on several events. For example, the trigger may occur based on network degradation detection specific to the LE CC, from buffer status reports from the WTRUs or BS buffer occupancy measures. The trigger may also occur based on the detection of a primary user on the LE band channel and availability of another channel in the same LE band. This may be detected by the CCP through access to the geolocation database, or through analysis of sensing results. The trigger may also occur based on the detection of a secondary system on the LE channel causing coexistence issues. This may be detected by the CCP through access to the coexistence database, or through analysis of sensing results. The trigger may also occur based on a change in the network load, either uplink/downlink or an increase in bandwidth requirements of the WTRUs, which may be satisfied through the reconfiguration of an LE CC, the addition of a new CC, or the switch to a more suitable CC. The trigger may also occur based on a WTRU that may be detected at the cell edge, in which the change of the channel in the LE band would extend the range of the cell for that WTRU or set of WTRUs that are affected.

BS_T3 may consist of the BS deciding to disable the use of CA with LE spectrum within the cell or area served by the BS. The trigger can occur based on the several events. For example, the trigger may occur based on conditions where a previous network degradation condition is eliminated and moving all traffic to the licensed band may not cause further QoS degradation for any WTRUs. The trigger may also occur based on conditions where a detection of a primary user on the LE band channel with no availability of other LE channels. This trigger may be managed by the CCP through access to the geolocation database, or through analysis of sensing results. The trigger may also occur based on conditions where a detection of a secondary system on the LE channel causing coexistence issues and no alternate channels available in the LE band. The trigger may also occur based on conditions where a cell edge condition for a particular WTRU or set of WTRUs which initiated use of the LE bands no longer exists.

BS_T4 may consist of a change in the scheduling decisions made in either uplink or downlink. It entails a change in the location of resources allocated (from licensed to LE or vice versa) based on the availability of these resources and the need for control channel resources. Resources may be scheduled using cross-carrier scheduling (from licensed to LE bands) or within the same carrier.

These decisions may be made dynamically by the MAC scheduler at the BS in order to maximize the efficiency of the use of the LE spectrum. They may also depend on the mode (FDD or TDD, for instance) used in the LE CC.

WTRU States

FIG. 16 shows a WTRU state transition diagram. In FIG. 16, the WTRU may be in three possible states. In a first state, idle Mode 1605, the WTRU may be in RRC_Idle and therefore has no CA enabled. In a second state, WTRU State 1 (US1) 1610 the WTRU may be in RRC_Connected mode over a licensed band CC but does not use the LE band for aggregation. In a third state, WTRU State 2 (US2) 1620, the WTRU may be in RRC_Connected mode and is employing CA between licensed and LE bands (i.e. a CC on the LE band is currently active).

FIG. 16 includes four triggers, UE_T1, UE_T2, UE_T3, UE_T4. The WTRU triggers may come from decisions made at the BS or eNB, however, they may be specific to a particular WTRU and therefore affect only the state of that particular WTRU or set of WTRUs and not the BS itself.

In UE_T1, the WTRU may be configured to perform CA, either uplink or downlink or both, with a CC in the LE band. This may be generally signaled to the WTRU through RRC signaling to configure the CC. The trigger may occur based on several events. For example, the trigger may occur based on WTRU requests for additional bandwidth due to a new QoS application being launched, or due to an increase in the bandwidth requirements of existing applications. The trigger may also occur based on the buffer status reports from a particular WTRU that indicate that the licensed bands are no longer sufficient to satisfy the needs of the WTRU. The trigger may also occur based on a BS determining that a particular WTRU may require a large amount of DL resources momentarily.

In UE_T2, additional LE CCs may be added to the CA configuration, or CCs removed from the CA configuration. Following the change, the WTRU may continue to use the LE band to receive or transmit from/to the BS. This trigger may occur in one of several events. For example, the trigger may occur when the WTRU detects the need for higher or lower bandwidth. The trigger may also occur when the WTRU is interfered in the LE bands, through secondary user or interference, where this interference affects only the WTRU and not the entire cell. The trigger may also occur when a primary user is detected which affects only this particular WTRU.

UE_T3 may be triggered in one of several events. For example, the trigger may occur when the WTRU bandwidth requirements drop. The trigger may also occur when a primary or secondary user is detected as in UE_T2 and no additional resources are available in the LE band.

UE_T4 may consist of a change in the scheduling decisions made in either uplink or downlink. UE_T4 is identical to BS_T4 (see above), except that it may be specific to the decisions that are made for this particular WTRU. The trigger may come from scheduling decisions made at the BS.

Algorithms

In order to run the SAP, algorithms may be implemented by the coexistence system components which communicate with each other using the facilities provided by the SAP protocols.

Channel Format

FIG. 14 shows an example format of channel and PCI information in PCI suggestion variant. The list 1400 consists of a set of information elements (IE), where each IE defines one LE channel 1410, 1420, 1430, 1440. As part of this IE, a list of usable PCIs is given. In addition, different formats for this information may not limit the use of PCI suggestion, as it is described here.

The LE channel list and PCI list may be provided in the 'Coexistence database Inquiry Response' message in examples 1, 4, and 5 above and in the LE Usage Change and/or Reconfiguration Message 1230 discussed above in connection with FIG. 12.

Once a CCP receives a PCI suggestion from the coexistence database, or alternately after negotiation with other CCPs in the alternate architecture, the CCP may determine the best combination of channel and PCI for the BS that may be allocated to the LE channel. Such a decision may be made by the RRM algorithm located at the CCP and may attempt to minimize the inter-cell interference between the BS managed by the CCP. The PCI may be chosen based on the BS location within the operator's coverage area and the best selected channel. The algorithm may use the combination of channel and PCI suggested by the coexistence database to select the best combination of channel and PCI. Alternatively, the algorithm may first select the channel which minimizes the interference and then select the PCI which may allow the BS to individually boost the PHY channels with the minimum impact on neighboring LE cells using the same LE channel or neighboring LE channels.

When the CCP selects the LE channel and associated PCI to use on that channel, the CCP may transmit this information to the BS using the 'LE Resource Response' or the 'LE Resource Change Request'.

The selected PCI and frequency used may also be transmitted to the coexistence database for tracking and future Coexistence Requests by other CCPs following selection by the CCP. This may be done through the 'Coexistence Database Update Request' message or the 'LE Usage Change/Reconfiguration Confirm'.

When LE operation is deactivated or terminated by a BS on a particular cell, the PCI for that cell may need to be transmitted to the coexistence database along with the LE channel used. This may be done through the 'Coexistence Database Update Request'.

In the PCI exclusion variant, the coexistence database may provide a set of PCIs that may not be used on each of the LE channels in order to avoid PCI collision or confusion between the different operators. The list of zero or more PCIs associated with each LE channel may be provided through the same messaging as described for the PCI suggestion variant.

The format of this information may be identical to FIG. 14 with the exception that the PCI list in each LE Channel IE may be interpreted by the CCP as a set of PCIs that should not be used in the given LE channel.

In the Full PCI Control Variant, the coexistence database may specify the exact PCI to use for each of the usable LE channels. In this variant, the coexistence database may be responsible for PCI management over the LE spectrum. Although this may provide less flexibility to each individual operator in terms of cell planning in the LE spectrum, it may centralize the management to a single entity, instead of having the associated algorithms replicated in each CCP.

The messaging required in this variant may be similar to both PCI suggest and PCI exclusion, except that PCI information may not need to be confirmed with the coexistence database since the selection of the PCI is made at the coexistence database and not at the individual CCPs. The format of the information may also be similar except that the list of PCIs may be replaced with a single PCI that is enforced by the coexistence database.

A set of states may be adhered to by both the BS and WTRUs to enable the use of CA in the LE spectrum. The definition of these states may ensure a well-defined control of the use of the LE bands. In addition, specific triggers may be defined which enable the transition between states for both the WTRUs and the BS. These triggers are defined in terms of specific events related to sensing, access of the databases as described above, as well as RRM tasks which are common in LTE.

The WTRUs and BS may each independently reside in a set of states depending on whether CA is being performed between the licensed and LE carriers or whether only the licensed carrier is being used, in which case, CA may still be used according to LTE Rel-10. In addition, certain triggers, specific to the BS or the WTRUs, may occur which cause transitions to other states or within the same states.

Channel Selection Algorithm

The channel selection algorithm may involve several steps. Each network controller (e.g. a WiFi AP) may determine the channel availability in its location. The network controller may be aware of its location, as well as the location of all of its network elements, i.e. location is an area, not a point in space. The network controller may use information provided by the coexistence database. For the purposes of coexistence, a network controller may control a network of only one device (i.e. this process may be done on a device-by-device basis), although this may not be typical.

The channel availability information (i.e. the spectrum map) may contain different pieces of information as follows:

It may be binary, that is, it may simply state whether a channel is available or occupied;

It may provide "soft" occupancy information in the form of interference (power) level on the channel; or It may provide information on the type of networks/devices that are using the channel. For example, these may be classified according to the following criteria: licensed or unlicensed (which determines whether they may be interfered with at all); transmit power class (e.g. as per regulatory definitions) and medium access type (TDMA, CSMA, CDMA, etc.).

A coexistence database may request to be updated by each network which is a part of a coexistence system with respect to the observed channel status. The coexistance database may use the network updates to update a channel map. In particular, the database may request the following information: the network's (or device's) own maximal transmit power; the number of devices in the network; the network's channel utilization (how heavily is it actually using the channel), and channel measurements. The channel measurement information provides information with respect to the channels being used and the channels not being used by the device/network. These measurements may include of the following parameters: measured channel power; measured channel variability (how much does the power vary), and detected signal types.

When a network controller learns the channel utilization/spectrum mask (or when it learns of a change in it), the controller may select what channel to operate on. The selection may depend on several factors such as channel availability and the channel selection etiquette.

Channel availability may mean looking for channels that are completely free or may mean looking for channels that are lightly loaded with a network that is compatible to the controller's own network. For example, a WiFi network expecting 10-20% channel load may share a channel with another WiFi network expecting 10-20% channel load.

Channel selection etiquette may mean selecting channels such that available chunks of contiguous spectrum are not broken up needlessly.

Coordinated Measurement Opportunities Algorithm

Another algorithm may coordinate a measurement opportunity for the networks in a particular area that are part of the same coexistence system (this may be widely known as "coordinated silence intervals"). The algorithm involves having all networks that are part of a coexistence system in a particular area go silent at a predefined time so that a set of measurements may be made known. Networks (i.e. those that are part of the coexistence system) may not be measured. The ability to go silent at a predefined time may assist in identifying whether any interference/networks other than known networks are present on channels occupied by known networks.

Exemplary algorithms for measurement interval coordination have been previously provided. In order to coordinate a measurement interval, however, the following basic operations may occur:

(1) Coordinating information must be distributed to all the participating networks. This may include not only scheduling information but some common time base—or reference a common time base already present;

(2) Each network may report whether it actually honored the silence request (some networks may not be able to do so and this is important to take into account);

(3) Presumably, a network may use the silencing interval to collect measurements, and these measurements should be reported.

Network Coverage Selection Algorithm

Another algorithm may select how large of an area a network should cover. Like in the channel selection algorithm, the decision may be based on the spectrum mask, however in order to satisfy the needs of this algorithm, the mask may to be detailed enough for the network controller to determine how it might select a channel.

For example, circular networks may be defined by using the controller's location and a radius. Given a fixed controller location, a network with a radius of 10 m may have 5 channels available to choose from, while a network with a radius of 100 m, may only have 2 because 3 of the channels have become occupied between 10 and 100 meters from the controller.

Just as network coverage selection is impacted by the channel utilization (spectrum mask), the channel selection algorithm may take into account etiquette consideration throughout its potential coverage area. Thus the channel selection algorithm may work in concert with the channel coverage selection.

Other Algorithms

Other potential algorithms may include selection of medium access technology (e.g. CSMA/TDMA), maximal network data rate.

Basic Service Set

In addition to the algorithms discussed below, a basic set of capabilities (basic service set) may include the basic access to the regulatory database, which may be allowed without any registration to the coexistence system as well as methods for subscription to the systems.

Service Definitions

Four types of service may include: information service; event service; command service and basic service.

Because the same SAP is used, from a SAP point of view, services are two-way. Moreover, services potentially involve two-way communication (for example, command services involve commands and responses to the commands).

Service primitives are further described below. For each primitive, the parameters may include: information service; command service; event service; and basic service set.

Information Service

This service may be used to disseminate information both from controlling elements to their controlled elements and back (the network may be hierarchical with several layers).

In the CHANNEL INFORMATION REQUEST, the following parameters may be included: request ID/network ID, other identifying information; location (including the area information is being requested for); recurrence (one-time, periodic, periodicity rate); channel list request for which request is issued, and information content requested (how rich should the information be).

In the CHANNEL INFORMATION RESPONSE, the following parameters may be included: channel information as discussed above and response time stamp.

In the MEASUREMENT INTERVAL INFORMATION REQUEST, the following parameters may be included: location (including the area information is being requested for); measurement type, and channel list.

In the MEASUREMENT INTERVAL SCHEDULE, the following parameters may be included: list of locations (geolocation and area); list of channels for which the measurement is applicable, and measurement interval schedule.

Command Services

This service may be used by controlling elements to issue commands (or requests) to controlling elements.

CHANNEL ASSIGNMENT COMMAND. The following parameters may be included: command ID; network ID/location or some other identifier; channel number/list; assignment start time/time to switch; command reasons (for example, in response to a CHANNEL ASSIGNMENT REQUEST—in this case Request ID should be included) and optional parameters for advanced services such as maximal power or coverage radius; technology to be used and channel utilization limits.

It should be noted that the CHANNEL ASSIGNMENT REQUEST as structured may be used to assign channel, set network radius, etc., and to support the more advanced algorithms as described above.

The CHANNEL ASSIGNMENT REQUEST is a result of execution of a channel assignment algorithm at a controlling node. In particular, channel etiquette (e.g. avoiding the breaking up of spectrum) may have already been taken into account. In typical architectures the request may be issued: 1) from a controlling central manager (CM) to a sub-servient in a hierarchical network; or 2) from a CM to a central entity (CE) associated with it.

A NULL channel assignment may be used to revoke all existing assignments. This may be used to avoid the need to define a channel revocation command, as shown below.

In the CHANNEL ASSIGNMENT RESPONSE, the following parameters may be included: command ID; network ID/location; operation result (success/failure); reason for failure and optional security parameter such as a signed attestation that operation is complete.

It should be noted that the CHANNEL ASSIGNMENT RESPONSE is so critical to overall network operation that a device-secure certificate of compliance may be desirable in the response.

In the CHANNEL REVOCATION COMMAND, the following parameters may be included: command ID; network ID/location or some other identifier; channel number/list and revocation time.

It should be noted that the channel revocation request may be used together with a channel assignment request to change a channel assignment (including changing parameters like power on the same channel).

A CHANNEL REVOCATION COMMAND may not be needed, if a NULL channel assignment is supported in the channel assignment command.

In the CHANNEL REVOCATION RESPONSE, the following parameters may be included: command ID; network ID/location; operation result (success/failure); reason for failure and an optional security parameter such as a signed attestation that operation is complete.

In the MEASUREMENT COMMAND, the following parameters may be included: command ID; network ID/location; list of devices within the network which are to make the measurement; options such as ALL (for all devices) or unspecified (left up to network controller) are to be supported; If specific devices are included parameters may include device IDs (e.g. MAC IDs) and/or geolocations; measurement schedule; one-time/recurring; channel list; measurement time/recurrence; other parameters (durations, desired SNR, etc.) and measurement type.

It should be noted that the measurement to take advantage of a coordinated silencing interval is inferred from the schedule, measurement type and channel list.

In the MEASUREMENT RESPONSE, the following parameters may be included: command ID; network ID. (List of devices which made the reported measurements. Includes device locations and/or IDs (e.g. MAC IDs) and measurement times per device); measurement parameters and measurement results.

Event Service

This service may be used by controlled elements to provide information to controlling elements.

In the EVENT TRIGGER SET REQUEST, the following parameters may be included: request ID; network ID/location; event trigger description and parameters.

It should be noted that even triggers are used to setup some of the event services. Some of the measurements may be trigger-based and are therefore setup in this fashion, as opposed to using the information service.

It the EVENT TRIGGER SET RESPONSE, the following parameters may be included: request ID; network ID/location; results (success/failure); reason for failure.

In the TRIGGERED EVENT REPORT, the following parameters may be included: trigger set request ID; network ID/location; event occurrence time, and event report content (depends on the event; may be measurements content).

In the CHANNEL USAGE CHANGE REPORT, the following parameters may be included: network ID/location; list of channels being affected; free up time and change type (channel being freed up or assigned; channel power is being changed (reduced); change in channel load and change in channel medium access method).

It should be noted that the event primitive is used to indicate to the coexistence service that a network is changing how it uses a channel on its own (as opposed to in response to a command from the service). It may be used to indicate to the controlling CM that a channel usage is being reduced. It is used by the controlling CM to control its peers and by CDIS to inform of actions such as whether to reduce or increase usage.

In the CHANNEL ASSIGNMENT REQUEST, the following parameters may be included: request ID; network ID/location or some other identifier; channel number/list; requested start time/time to switch; reason for request and optional parameters for advanced services (maximal power or coverage radius; technology to be used; channel utilization limits).

Also note that the CHANNEL ASSIGNMENT REQUEST event may be used to request that a channel assignment be made. The corresponding COMMAND is the response to the request.

Basic Service

This service provides the basic capabilities as previously defined above in connection with the basic service set embodiment. In addition to the messaging defined here, the basic service set includes an authentication exchange. The authentication exchange relies on well-known authentication techniques, but involves a number of messages, which are not discussed.

In the REGULATORY ENVIRONMENT REQUEST, the following parameters may be included: request ID and network/device ID.

It should be noted that presence of this query allows a device to discover what regulatory environment it is in. This supports international roaming.

In the REGULATORY ENVIRONMENT RESPONSE, the following parameters may be included: request ID and regulatory environment information.

In the REGULATORY CHANNEL LIST REQUEST, the following parameters may be included: request ID; regulatory database ID (NULL if not known); regulatory requestor ID and required regulatory information (location, appropriate device ID, etc.).

It should be noted that this is used to get information from the regulatory database. The coexistence system acts as a pass through, although in some cases it may be allowed to act as a proxy for the regulatory database.

One of the reasons for including the above parameters is to facilitate access to (e.g. discovery of) the regulatory database.

In the REGULATORY CHANNEL LIST RESPONSE, the following parameters may be included: response ID and regulatory response context (depends on each regulatory environment).

In the COEXISTENCE SERVICE SUBSCRIPTION REQUEST, the following parameters may be included: request ID; network ID/device ID and requested service ID.

In the COEXISTENCE SERVICE SUBSCRIPTION RESPONSE, the following parameters may be included: request ID; network ID/device ID and response and reason for it.

Although features and elements are described above in particular combinations, one of ordinary skill in the art may appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

We claim:

1. A method of coexistence management comprising:
   receiving a channel request from a requesting wireless network of a plurality of secondary user wireless networks;
   obtaining available channel information from a geolocation database;
   collecting channel usage information from the secondary user wireless networks, the channel usage information comprising a different type of information than the available channel information from the geolocation database and indicating at least one characteristic of devices in the secondary user wireless networks; and
   providing, to the requesting wireless network, a ranked list of available channels based at least on the available channel information and the channel usage information.

2. The method of claim 1, further comprising ranking the available channels based on channel quality to provide the ranked list.

3. The method of claim 2, wherein the ranking the available channels based on channel quality includes ranking the available channels based on an interference level between the plurality of secondary user wireless networks.

4. The method of claim 1, wherein the plurality of wireless networks comprise at least one of a cellular network or a wireless local area network (WLAN).

5. The method of claim 1, further comprising:
   receiving sensing information from a plurality of base stations, wherein each the plurality of base stations is in a corresponding wireless network from among the plurality of secondary user wireless networks.

6. The method of claim 5, wherein at least one of the plurality of base stations is configured to sense a wireless spectrum to provide sensing information.

7. The method of claim 6, wherein the wireless spectrum is a license exempt (LE) spectrum.

8. The method of claim 5, wherein each of the plurality of base stations is selected from a group consisting of an enhanced Node-B (eNB), a home eNB (HeNB) and an access point (AP).

9. A method of spectrum coordination comprising:
   receiving, at a co-existence manager, a channel request from a requesting wireless network;
   determining, at the co-existence manager, channel usage information of associated secondary user wireless networks that use service of the co-existence manager from the secondary user wireless networks, the channel usage information indicating at least one characteristic of devices in the secondary user wireless networks;
   generating, at the co-existence manager, a ranked list of channels that are available to the requesting wireless network based at least on the channel usage information; and
   providing, to the requesting wireless network, the ranked list of the channels.

10. The method of claim 9, wherein the channel usage information comprises information of wireless networks that may cause coexistence issues.

11. The method of claim 9, further comprising ranking the available channels based on channel quality to provide the ranked list.

12. The method of claim 11, wherein the ranking the available channels based on channel quality includes ranking the available channels based on an interference level between the plurality of secondary user wireless networks.

13. The method of claim 9, wherein the channel request is a spectrum allocation request.

14. The method of claim 9, further comprising receiving selected usage parameters for use in future coexistence decisions.

15. The method of claim 14, wherein the selected usage parameters include a selected channel.

16. The method of claim 9, wherein the channels that are available for the requesting wireless network comprise white space channels.

17. The method of claim 9, wherein the receiving the channel request from the requesting wireless network includes receiving the channel request from a base station in the requesting wireless network.

18. The method of claim 17, wherein the base station comprises at least one of an enhanced Node-B (eNB), a home eNB (HeNB) and an access point (AP).

19. The method of claim 9, wherein the requesting wireless network is one of a cellular network or a wireless local area network (WLAN).

20. The method of claim 9, wherein the channel usage information of at least one of the associated secondary user wireless networks comprises a transmit power associated with the respective secondary user wireless network.

21. The method of claim 9, wherein the channel usage information of at least one of the associated secondary user wireless networks comprises an antenna height associated with the respective secondary user wireless network.

22. The method of claim 9, wherein the channel usage information of at least one of the associated secondary user wireless networks comprises:
   at least one license exempt channel occupied by the respective secondary user wireless network; and
   a time duration of the at least one license exempt channel occupied by the respective secondary user wireless network.

* * * * *